US012191099B2

(12) United States Patent
Darr et al.

(10) Patent No.: US 12,191,099 B2
(45) Date of Patent: Jan. 7, 2025

(54) ELECTRONICALLY CONTROLLED FUSIBLE SWITCHING DISCONNECT MODULES AND DEVICES

(71) Applicant: EATON INTELLIGENT POWER LIMITED, Dublin (IE)

(72) Inventors: Matthew Rain Darr, Edwardsville, IL (US); Hundi Panduranga Kamath, Los Altos, CA (US)

(73) Assignee: Eaton Intelligent Power Limited, Dublin (IE)

( * ) Notice: Subject to any disclaimer, the term of this patent is extended or adjusted under 35 U.S.C. 154(b) by 147 days.

(21) Appl. No.: 17/936,285

(22) Filed: Sep. 28, 2022

(65) Prior Publication Data

US 2023/0015826 A1 Jan. 19, 2023

Related U.S. Application Data

(63) Continuation of application No. 15/251,420, filed on Aug. 30, 2016, now Pat. No. 11,551,900, which is a (Continued)

(51) Int. Cl.
*H01H 71/20* (2006.01)
*H01H 1/20* (2006.01)
(Continued)

(52) U.S. Cl.
CPC .............. *H01H 71/20* (2013.01); *H01H 1/20* (2013.01); *H01H 9/10* (2013.01); *H01H 9/104* (2013.01); *H01H 9/282* (2013.01); *H01H 21/16* (2013.01); *H01H 71/04* (2013.01); *H01H 71/08* (2013.01); *H01H 71/123* (2013.01); *H01H 71/125* (2013.01); *H01H 83/12* (2013.01); *H01H 9/102* (2013.01); *H01H 2071/0278* (2013.01); *H01H 83/10* (2013.01); *H01H 85/0241* (2013.01)

(58) Field of Classification Search
CPC .......... H01H 9/10; H01H 9/104; H01H 21/16; H01H 71/123; H01H 71/125; H01H 71/04; H01H 1/20; H01H 9/102; H01H 9/282; H01H 2071/0278; H01H 71/08; H01H 83/10; H01H 83/12; H01H 85/0241; H01H 71/20
USPC ............................... 337/8, 80, 143, 186, 187
See application file for complete search history.

(56) References Cited

U.S. PATENT DOCUMENTS 1,966,716 A 7/1934 Green
2,416,169 A 2/1947 Freese
(Continued)

FOREIGN PATENT DOCUMENTS

EP 966749 5/2006

OTHER PUBLICATIONS

International Search Report and Written Opinion of PCT/US2012/020433; Apr. 20, 2012; 13 pages.
(Continued)

*Primary Examiner* — Anatoly Vortman
(74) *Attorney, Agent, or Firm* — Baker Botts L.L.P.

(57) ABSTRACT

A fusible switch disconnect device includes a housing adapted to receive at least one fuse therein, and a switchable contact for connecting the fuse to circuitry. A tripping mechanism and control circuitry are provided to move the switchable contact to an open position in response to a predetermined electrical condition.

40 Claims, 35 Drawing Sheets

Related U.S. Application Data continuation of application No. 13/008,940, filed on Jan. 19, 2011, now Pat. No. 11,217,413.

(51) Int. Cl.

| | |
|---|---|
| ***H01H 9/10*** | (2006.01) |
| ***H01H 9/28*** | (2006.01) |
| ***H01H 21/16*** | (2006.01) |
| ***H01H 71/04*** | (2006.01) |
| ***H01H 71/08*** | (2006.01) |
| ***H01H 71/12*** | (2006.01) |
| ***H01H 83/12*** | (2006.01) |
| *H01H 71/02* | (2006.01) |
| *H01H 83/10* | (2006.01) |
| *H01H 85/02* | (2006.01) |

(56) References Cited

U.S. PATENT DOCUMENTS

| | | | | |
|---|---|---|---|---|
| 2,811,604 | A | | 10/1957 | Cole et al. |
| 3,032,629 | A | | 5/1962 | Uecker |
| 3,070,728 | A | * | 12/1962 | Edmunds ................. H01H 9/10 337/44 |
| 3,077,525 | A | | 2/1963 | Dyer |
| 3,096,415 | A | | 7/1963 | Walters |
| 3,354,277 | A | | 11/1967 | Standback et al. |
| 3,379,842 | A | | 4/1968 | Downs et al. |
| 3,406,365 | A | | 10/1968 | Lameyre |
| 3,599,135 | A | * | 8/1971 | Gryctko ............. H01H 71/1081 337/6 |
| 3,614,697 | A | | 10/1971 | Dunham et al. |
| 3,638,157 | A | * | 1/1972 | Kruzic ................... H01H 89/06 337/6 |
| 3,688,237 | A | | 8/1972 | Orosz et al. |
| 3,718,878 | A | * | 2/1973 | Wilson ................. H01H 85/306 337/186 |
| 3,732,516 | A | | 5/1973 | Puetz |
| 3,944,953 | A | * | 3/1976 | Oster ..................... H01H 9/446 335/23 |
| 3,958,197 | A | | 5/1976 | Gryctko |
| 3,958,204 | A | | 5/1976 | Gryctko |
| 4,025,883 | A | | 5/1977 | Slade et al. |
| 4,245,318 | A | | 1/1981 | Eckart et al. |
| 4,351,012 | A | | 9/1982 | Elms et al. |
| 4,432,031 | A | * | 2/1984 | Premerlani ............ H02H 6/005 361/97 |
| 4,488,767 | A | | 12/1984 | Lehman et al. |
| 4,496,916 | A | | 1/1985 | Carpenter et al. |
| 4,649,455 | A | | 3/1987 | Scott |
| 4,660,009 | A | | 4/1987 | Wafer et al. |
| 4,680,562 | A | | 7/1987 | Bratkowski et al. |
| 4,743,875 | A | | 5/1988 | Murphy |
| 4,754,247 | A | | 6/1988 | Raymont et al. |
| 4,890,184 | A | | 12/1989 | Russell |
| 5,153,544 | A | | 10/1992 | Castonguay et al. |
| 5,162,766 | A | | 11/1992 | Morris et al. |
| D336,073 | S | | 6/1993 | Happ |
| D346,791 | S | | 5/1994 | Marach et al. |
| 5,311,392 | A | | 5/1994 | Kinney et al. |
| D348,048 | S | | 6/1994 | Marach et al. |
| 5,355,274 | A | | 10/1994 | Marach et al. |
| D353,364 | S | | 12/1994 | Marach |
| D353,365 | S | | 12/1994 | Marach |
| D355,642 | S | | 2/1995 | Marach et al. |
| D355,893 | S | | 2/1995 | Marach et al. |
| 5,402,299 | A | | 3/1995 | Bellei |
| 5,426,406 | A | | 6/1995 | Morris et al. |
| 5,457,292 | A | | 10/1995 | Harr |
| 5,473,495 | A | | 12/1995 | Bauer et al. |
| D367,041 | S | | 2/1996 | Alfaro et al. |
| D370,662 | S | | 6/1996 | Alfaro |
| 5,559,662 | A | | 9/1996 | Happ et al. |
| 5,627,716 | A | * | 5/1997 | Lagree ...................... G06J 1/00 361/96 |
| 5,726,852 | A | | 3/1998 | Trifiletti et al. |
| 5,841,337 | A | | 11/1998 | Douglass |
| 5,963,411 | A | | 10/1999 | Mollet et al. |
| 5,969,587 | A | | 10/1999 | Combas |
| 5,973,418 | A | | 10/1999 | Ciesielka et al. |
| D425,870 | S | | 5/2000 | Torrez |
| 6,252,365 | B1 | | 6/2001 | Morris et al. |
| 6,570,269 | B2 | | 5/2003 | McMillan et al. |
| 6,587,028 | B2 | | 7/2003 | Mollet et al. |
| 6,603,649 | B1 | * | 8/2003 | Muller ..................... H02H 7/30 361/93.3 |
| 6,696,969 | B2 | | 2/2004 | Torrez et al. |
| 6,710,988 | B1 | | 3/2004 | Yee |
| 6,717,505 | B1 | | 4/2004 | Bruchmann |
| 6,727,797 | B1 | | 4/2004 | Bruchmann |
| 6,771,477 | B2 | | 8/2004 | Milanczak |
| 6,781,809 | B2 | | 8/2004 | Milanczak |
| 6,784,783 | B2 | | 8/2004 | Scoggin et al. |
| 6,853,289 | B2 | | 2/2005 | Scoggin |
| 6,864,443 | B1 | | 3/2005 | Bruchmann |
| 6,988,183 | B1 | | 1/2006 | Wong |
| 6,998,954 | B2 | | 2/2006 | Milanczak |
| 7,049,973 | B2 | | 5/2006 | Torrez et al. |
| 7,115,829 | B2 | | 10/2006 | Schmid |
| 7,385,518 | B2 | | 6/2008 | Torrez et al. |
| 7,474,194 | B2 | | 1/2009 | Darr et al. |
| 7,495,540 | B2 | | 2/2009 | Darr et al. |
| 7,561,017 | B2 | | 7/2009 | Darr |
| 7,576,360 | B2 | | 8/2009 | Yamazaki |
| 7,576,630 | B2 | | 8/2009 | Darr et al. |
| 7,639,112 | B2 | | 12/2009 | Nicoletti |
| 7,800,874 | B2 | | 9/2010 | DiSalvo et al. |
| 7,855,873 | B2 | | 12/2010 | Darr et al. |
| 7,924,136 | B2 | | 4/2011 | Darr et al. |
| 8,031,455 | B2 | * | 10/2011 | Paik ...................... H03M 1/129 361/104 |
| 8,089,335 | B2 | | 1/2012 | Darr et al. |
| 8,310,333 | B2 | | 11/2012 | Ventura et al. |
| 8,614,618 | B2 | | 12/2013 | Darr et al. |
| 8,988,183 | B2 | | 3/2015 | Darr et al. |
| 2002/0047770 | A1 | | 4/2002 | Scoggin et al. |
| 2002/0067279 | A1 | | 6/2002 | Torrez et al. |
| 2002/0080005 | A1 | | 6/2002 | Mollet et al. |
| 2003/0011355 | A1 | | 1/2003 | Skerritt et al. |
| 2003/0020589 | A1 | | 1/2003 | Scoggin |
| 2004/0100387 | A1 | | 5/2004 | Torrez et al. |
| 2005/0103613 | A1 | | 5/2005 | Miller |
| 2006/0125596 | A1 | | 6/2006 | Darr et al. |
| 2007/0063808 | A1 | | 3/2007 | Darr et al. |

OTHER PUBLICATIONS

International Search Report and Written Opinion in International Application No. PCT/US2012/020612 mailed Mar. 30, 2012.

International Search Report and Written Opinion in International Application No. PCT/US2012/020453 mailed Mar. 30, 2012.

International Search Report and Written Opinion in International Application No. PCT/US2012/020621 mailed Mar. 30, 2012.

* cited by examiner

ELECTRONICALLY CONTROLLED FUSIBLE SWITCHING DISCONNECT MODULES AND DEVICES

CROSS REFERENCE TO RELATED APPLICATIONS

This application is a continuation application of U.S. patent application Ser. No. 15/251,420 filed Aug. 30, 2016 and entitled Electronically Controlled Fusible Switching Disconnect Modules and Devices, which is a continuation application of U.S. patent application Ser. No. 13/008,940 filed Jan. 19, 2011 and entitled Electronically Controlled Fusible Switching Disconnect Modules and Devices, the entire disclosure of which is hereby incorporated by reference in its entirety.

This application relates to subject matter disclosed in U.S. patent application Ser. No. 15/251,446 filed Aug. 30, 2016 and entitled Fusible Switching Disconnect Modules And Devices With Multi-Link Automatic Trip Mechanism; U.S. patent application Ser. No. 13/008,950 filed Jan. 19, 2011 and entitled Fusible Switching Disconnect Modules and Devices With In-Line Current Detection; U.S. patent application Ser. No. 13/008,988 filed Jan. 19, 2011 and entitled Fusible Switching Disconnect Modules and Devices with Tripping Coil; and U.S. patent application Ser. No. 13/009,012 filed Jan. 19, 2011 entitled Fusible Switching Disconnect Modules and Devices with Multi-Functional Trip Mechanism and now issued U.S. Pat. No. 8,614,618.

BACKGROUND OF THE INVENTION

This invention relates generally to fuses, and, more particularly, to fused disconnect switches.

Fuses are widely used as overcurrent protection devices to prevent costly damage to electrical circuits. Fuse terminals typically form an electrical connection between an electrical power source and an electrical component or a combination of components arranged in an electrical circuit. One or more fusible links or elements, or a fuse element assembly, is connected between the fuse terminals, so that when electrical current through the fuse exceeds a predetermined limit, the fusible elements melt and open one or more circuits through the fuse to prevent electrical component damage.

In some applications, fuses are employed not only to provide fused electrical connections but also for connection and disconnection, or switching, purposes to complete or break an electrical connection or connections. As such, an electrical circuit is completed or broken through conductive portions of the fuse, thereby energizing or de-energizing the associated circuitry. Typically, the fuse is housed in a fuse holder having terminals that are electrically coupled to desired circuitry. When conductive portions of the fuse, such as fuse blades, terminals, or ferrules, are engaged to the fuse holder terminals, an electrical circuit is completed through the fuse, and when conductive portions of the fuse are disengaged from the fuse holder terminals, the electrical circuit through the fuse is broken. Therefore, by inserting and removing the fuse to and from the fuse holder terminals, a fused disconnect switch is realized.

DETAILED DESCRIPTION OF THE INVENTION

Known fused disconnects are subject to a number of problems in use. For example, any attempt to remove the fuse while the fuses are energized and under load may result in hazardous conditions because dangerous arcing may occur between the fuses and the fuse holder terminals. Some fuseholders designed to accommodate, for example, UL (Underwriters Laboratories) Class CC fuses and IEC (International Electrotechnical Commission) 10×38 fuses that are commonly used in industrial control devices include permanently mounted auxiliary contacts and associated rotary cams and switches to provide early-break and late-make voltage and current connections through the fuses when the fuses are pulled from fuse clips in a protective housing. One or more fuses may be pulled from the fuse clips, for example, by removing a drawer from the protective housing. Early-break and late-make connections are commonly employed, for example, in motor control applications. While early-break and late-make connections may increase the safety of such devices to users when installing and removing fuses, such features increase costs, complicate assembly of the fuseholder, and are undesirable for switching purposes.

Structurally, the early-break and late-make connections can be intricate and may not withstand repeated use for switching purposes. In addition, when opening and closing the drawer to disconnect or reconnect circuitry, the drawer may be inadvertently left in a partly opened or partly closed position. In either case, the fuses in the drawer may not be completely engaged to the fuse terminals, thereby compromising the electrical connection and rendering the fuseholder susceptible to unintended opening and closing of the circuit. Especially in environments subject to vibration, the fuses may be jarred loose from the clips. Still further, a partially opened drawer protruding from the fuseholder may interfere with workspace around the fuseholder. Workers may unintentionally bump into the opened drawers, and perhaps unintentionally close the drawer and re-energize the circuit.

Additionally, in certain systems, such as industrial control systems, electrical equipment has become standardized in size and shape, and because known fused disconnect switches tend to vary in size and shape from the standard norms, they are not necessarily compatible with power distribution panels utilized with such equipment. For at least the above reasons, use of fused disconnect switches have not completely met the needs of certain end applications.

Figure 1:
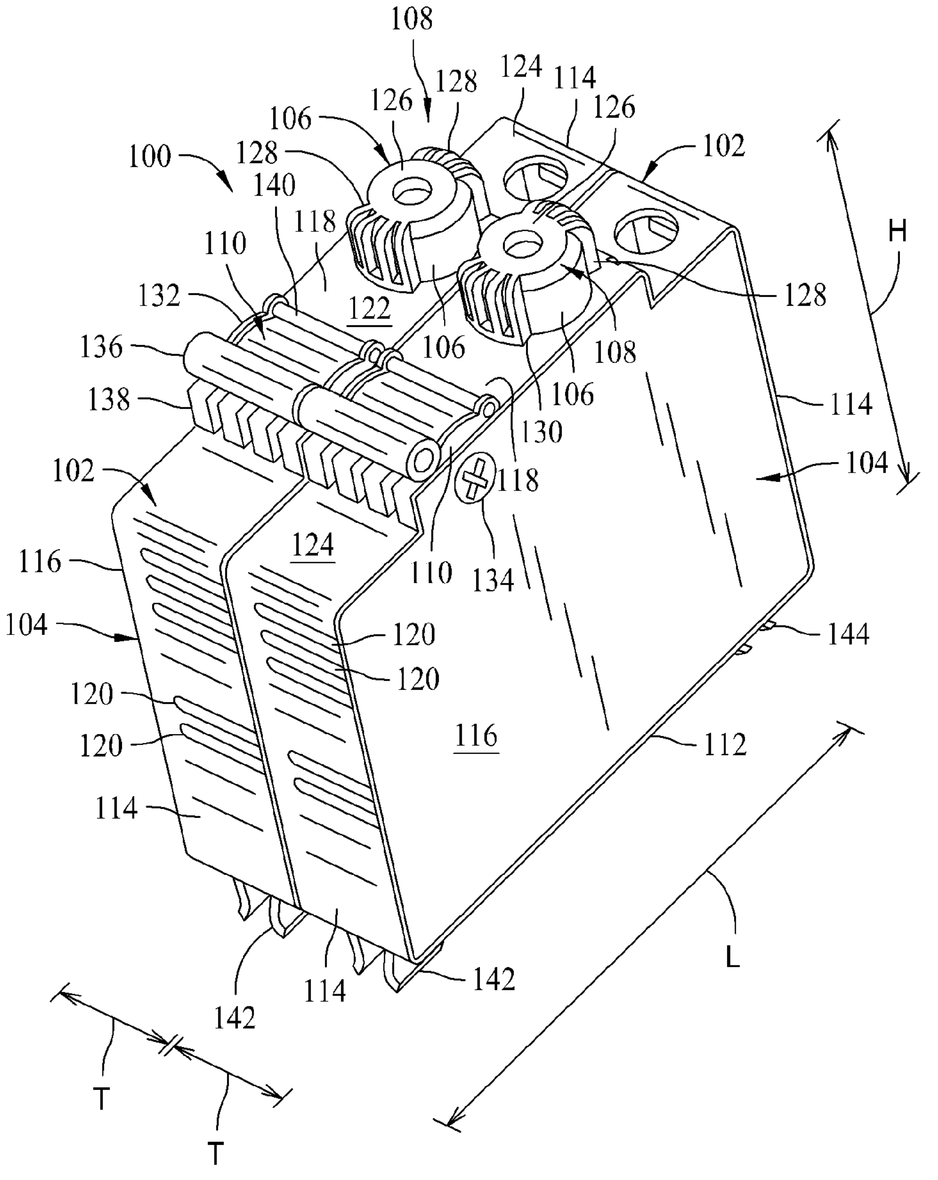
FIG. 1 is a perspective view of an exemplary fusible switching disconnect device.

FIG. 1 is a perspective view of an exemplary fusible switching disconnect device 100 that overcomes the aforementioned difficulties. The fusible switching disconnect device 100 may be conveniently switched on and off in a convenient and safe manner without interfering with workspace around the device 100. The disconnect device 100 may reliably switch a circuit on and off in a cost effective manner and may be used with standardized equipment in, for example, industrial control system applications. Further, the disconnect device 100 may be provided with various mounting and connection options for versatility in the field. Various embodiments will be described below to demonstrate the versatility of the disconnect device, and it is contemplated that the disconnect device 100 may be beneficial in a variety of electrical circuits and applications. The embodiments set forth below are therefore provided for illustrative purposes only, and the invention is not intended to be limited to any specific embodiment or to any specific application.

In the illustrative embodiment of FIG. 1, the disconnect device 100 may be a two pole device formed from two separate disconnect modules 102. Each module 102 may include an insulative housing 104, a fuse 106 loaded into the housing 104, a fuse cover or cap 108 attaching the fuse to the housing 104, and a switch actuator 110. The modules 102 are single pole modules, and the modules 102 may be coupled or ganged together to form the two pole disconnect device 100. It is contemplated, however, that a multi-pole device could be formed in a single housing rather than in the modular fashion of the exemplary embodiment shown in FIG. 1.

The housing 104 may be fabricated from an insulative or nonconductive material, such as plastic, according to known methods and techniques, including but not limited to injection molding techniques. In an exemplary embodiment, the housing 104 is formed into a generally rectangular size and shape which is complementary to and compatible with DIN and IEC standards applicable to standardized electrical equipment. In particular, for example, each housing 104 has lower edge 112, opposite side edges 114, side panels 116 extending between the side edges 114, and an upper surface 118 extending between the side edges 114 and the side panels 116. The lower edge 112 has a length L and the side edges 114 have a thickness T, such as 17.5 mm in one embodiment, and the length L and thickness T define an area or footprint on the lower edge 112 of the housing 104. The footprint allows the lower edge 112 to be inserted into a standardized opening having a complementary shape and dimension. Additionally, the side edges 114 of the housing 104 have a height H in accordance with known standards, and the side edges 114 include slots 120 extending therethrough for ventilating the housing 104. The upper surface 118 of the housing 104 may be contoured to include a raised central portion 122 and recessed end portions 124 extending to the side edges 114 of the housing 104.

The fuse 106 of each module 102 may be loaded vertically in the housing 104 through an opening in the upper surface 118 of the housing 104, and the fuse 106 may extend partly through the raised central portion 122 of the upper surface 118. The fuse cover 108 extends over the exposed portion of the fuse 106 extending from the housing 104, and the cover 108 secures the fuse 106 to the housing 104 in each module 102. In an exemplary embodiment, the cover 108 may be fabricated from a non-conductive material, such as plastic, and may be formed with a generally flat or planar end section 126 and elongated fingers 128 extending between the upper surface 118 of the raised central portion 122 of the housing 104 and the end of the fuse 106. Openings are provided in between adjacent fingers 128 to ventilate the end of the fuse 106.

In an exemplary embodiment, the cover 108 further includes rim sections 130 joining the fingers 128 opposite the end section 126 of the cover 108, and the rim sections 130 secure the cover 108 to the housing 104. In an exemplary embodiment, the rim sections 130 cooperate with grooves in the housing 104 such that the cover 108 may rotate a predetermined amount, such as 25 degrees, between a locked position and a release position. That is, once the fuse 106 is inserted into the housing 104, the fuse cover 108 may be installed over the end of the fuse 106 into the groove of the housing 104, and the cover 108 may be rotated 25 degrees to the locked position wherein the cover 108 will frustrate removal of the fuse 106 from the housing 104. The groove may also be ramped or inclined such that the cover 108 applies a slight downward force on the fuse 106 as the cover 108 is installed. To remove the fuse 106, the cover 108 may be rotated from the locked position to the open position wherein both the cover 108 and the fuse 106 may be removed from the housing 104.

The switch actuator 110 may be located in an aperture 132 of the raised upper surface 122 of the housing 104, and the switch actuator 110 may partly extend through the raised upper surface 122 of the housing 104. The switch actuator 110 may be rotatably mounted to the housing 104 on a shaft or axle 134 within the housing 104, and the switch actuator 110 may include a lever, handle or bar 136 extending radially from the actuator 110. By moving the lever 136 from a first edge 138 to a second edge 140 of the aperture 132, the shaft 134 rotates to an open position that electrically disconnects the fuse 106 in each module 102 as explained below. When the lever 136 is moved from the second edge 140 to the first edge 138, the shaft 134 rotates back to the closed position illustrated in FIG. 1 and electrically connects the fuse 106.

A line side terminal element may 142 extend from the lower edge 112 of the housing 104 in each module 102 for establishing line and load connections to circuitry. As shown in FIG. 1, the line side terminal element 142 is a bus bar clip configured or adapted to connect to a line input bus, although it is contemplated that other line side terminal elements could be employed in alternative embodiments. A panel mount clip 144 also extends from the lower edge 112 of the housing 104 to facilitate mounting of the disconnect device 100 on a panel.

Figure 2:
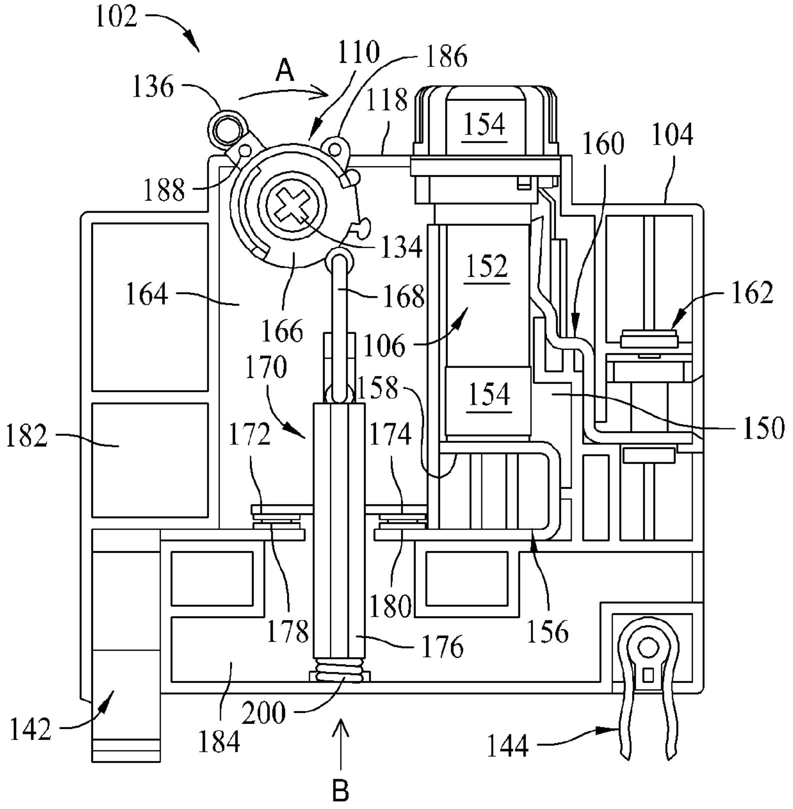
FIG. 2 is a side elevational view of a portion of the fusible switching disconnect device shown in FIG. 1 in a closed position.

FIG. 2 is a side elevational view of one of the disconnect modules 102 shown in FIG. 1 with the side panel 116 removed. The fuse 106 may be seen situated in a compartment 150 inside the housing 104. In an exemplary embodiment, the fuse 106 may be a cylindrical cartridge fuse including an insulative cylindrical body 152, conductive ferrules or end caps 154 coupled to each end of the body 152, and a fuse element or fuse element assembly extending within the body 152 and electrically connected to the end caps 154. In exemplary embodiments, the fuse 106 may be a UL Class CC fuse, a UL supplemental fuse, or an IEC 10×38 fuses which are commonly used in industrial control applications. These and other types of cartridge fuses suitable for use in the module 102 are commercially available from Eaton's Bussmann Business of St. Louis, Missouri. It is understood that other types of fuses may also be used in the module 102 as desired.

A lower conductive fuse terminal 156 may be located in a bottom portion of the fuse compartment 150 and may be U-shaped in one embodiment. One of the end caps 154 of the fuse 106 rests upon an upper leg 158 of the lower terminal 156, and the other end cap 154 of the fuse 106 is coupled to an upper terminal 160 located in the housing 104 adjacent the fuse compartment 150. The upper terminal 160 is, in turn, connected to a load side terminal 162 to accept a load side connection to the disconnect module 102 in a known manner. The load side terminal 162 in one embodiment is a known saddle screw terminal, although it is appreciated that other types of terminals could be employed for load side connections to the module 102. Additionally, the lower fuse terminal 156 may include fuse rejection features in a further embodiment which prevent installation of incorrect fuse types into the module 102.

The switch actuator 110 may be located in an actuator compartment 164 within the housing 104 and may include the shaft 134, a rounded body 166 extending generally radially from the shaft 134, the lever 136 extending from the body 166, and an actuator link 168 coupled to the actuator body 166. The actuator link 168 may be connected to a spring loaded contact assembly 170 including first and second movable or switchable contacts 172 and 174 coupled to a sliding bar 176. In the closed position illustrated in FIG. 2, the switchable contacts 172 and 174 are mechanically and electrically engaged to stationary contacts 178 and 180 mounted in the housing 104. One of the stationary contacts 178 may be mounted to an end of the terminal element 142, and the other of the stationary contacts 180 may be mounted to an end of the lower fuse terminal 156. When the switchable contacts 172 and 174 are engaged to the stationary contacts 178 and 180, a circuit is path completed through the fuse 106 from the line terminal 142 and the lower fuse terminal 156 to the upper fuse terminal 160 and the load terminal 162.

While in an exemplary embodiment the stationary contact 178 is mounted to a terminal 142 having a bus bar clip, another terminal element, such as a known box lug or clamp terminal could be provided in a compartment 182 in the housing 104 in lieu of the bus bar clip. Thus, the module 102 may be used with a hard-wired connection to line-side circuitry instead of a line input bus. Thus, the module 102 is readily convertible to different mounting options in the field.

When the switch actuator 110 is rotated about the shaft 134 in the direction of arrow A, the siding bar 176 may be moved linearly upward in the direction of arrow B to disengage the switchable contacts 172 and 174 from the stationary contacts 178 and 180. The lower fuse terminal 156 is then disconnected from the line-side terminal element while the fuse 106 remains electrically connected to the lower fuse terminal 156 and to the load side terminal 162. An arc chute compartment 184 may be formed in the housing 104 beneath the switchable contacts 172 and 174, and the arc chute may provide a space to contain and dissipate arcing energy as the switchable contacts 172 and 174 are disconnected. Arcing is broken at two locations at each of the contacts 172 and 174, thus reducing arc intensity, and arcing is contained within the lower portions of the housing 104 and away from the upper surface 118 and the hands of a user when manipulating the switch actuator 110 to disconnect the fuse 106 from the line side terminal 142.

Figure 3:
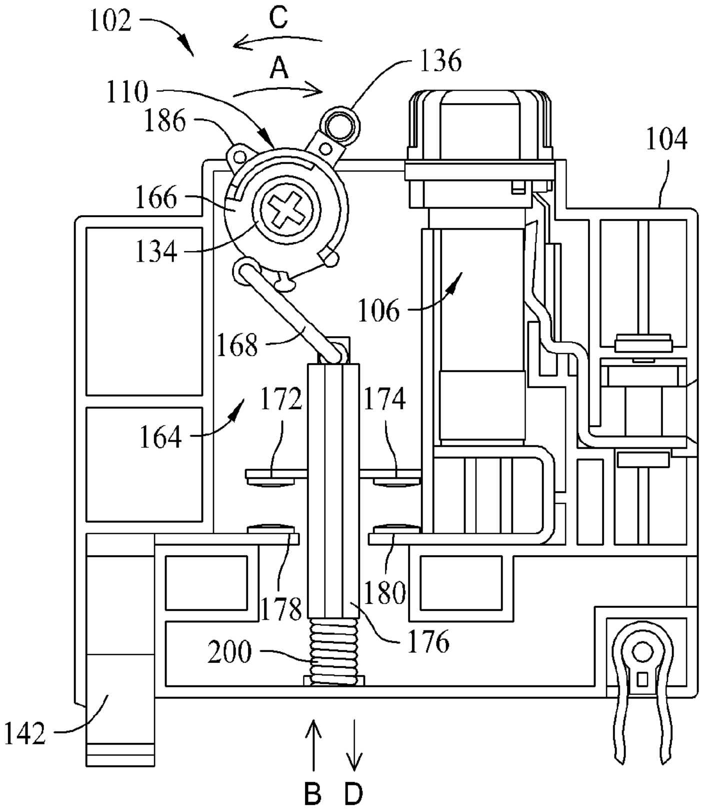
FIG. 3 is a side elevational view of a portion of the fusible switching disconnect device shown in FIG. 1 in an open position.

The housing 104 additionally may include a locking ring 186 which may be used cooperatively with a retention aperture 188 in the switch actuator body 166 to secure the switch actuator 110 in one of the closed position shown in FIG. 2 and the open position shown in FIG. 3. A locking pin for example, may be inserted through the locking ring 186 and the retention aperture 188 to restrain the switch actuator 110 in the corresponding open or closed position. Additionally, a fuse retaining arm could be provided in the switch actuator 110 to prevent removal of the fuses except when the switch actuator 110 is in the open position.

FIG. 3 illustrates the disconnect module 102 after the switch actuator has been moved in the direction of Arrow A to an open or switched position to disconnect the switchable contacts 172 and 174 from the stationary contacts 178 and 180. As the actuator is moved to the open position, the actuator body 166 rotates about the shaft 134 and the actuator link 168 is accordingly moved upward in the actuator compartment 164. As the link 168 moves upward, the link 168 pulls the sliding bar 176 upward in the direction of arrow B to separate the switchable contacts 172 and 174 from the stationary contacts 178 and 180.

A bias element 200 may be provided beneath the sliding bar 176 and may force the sliding bar 176 upward in the direction of arrow B to a fully opened position separating the contacts 172, 174 and 178, 180 from one another. Thus, as the actuator body 166 is rotated in the direction of arrow A, the link 168 is moved past a point of equilibrium and the bias element 200 assists in opening of the contacts 172, 174 and 178, 180. The bias element 200 therefore prevents partial opening of the contacts 172, 174 and 178, 180 and ensures a full separation of the contacts to securely break the circuit through the module 102.

Additionally, when the actuator lever 136 is pulled back in the direction of arrow C to the closed position shown in FIG. 2, the actuator link 168 is moved to position the sliding bar 176 downward in the direction of arrow D to engage and close the contacts 172, 174 and 178, 180 and reconnect the circuit through the fuse 106. The sliding bar 176 is moved downward against the bias of the bias element 200, and once in the closed position, the sliding bar 176, the actuator link 168 and the switch actuator are in static equilibrium so that the switch actuator 110 will remain in the closed position.

In one exemplary embodiment, and as illustrated in FIGS. 2 and 3, the bias element 200 may be a helical spring element which is loaded in compression in the closed position of the switch actuator 110. It is appreciated, however, that in an alternative embodiment a coil spring could be loaded in tension when the switch actuator 110 is closed. Additionally, other known bias elements could be provided to produce opening and/or closing forces to assist in proper operation of the disconnect module 102. Bias elements may also be utilized for dampening purposes when the contacts are opened.

The lever 136, when moved between the opened and closed positions of the switch actuator 110, does not interfere with workspace around the disconnect module 102, and the lever 136 is unlikely to be inadvertently returned to the closed position from the open position. In the closed position shown in FIG. 3, the lever 136 is located adjacent to an end of the fuse 106. The fuse 106 therefore partly shelters the lever 136 from inadvertent contact and unintentional actuation to the closed position. The bias element 200 further provides some resistance to movement of the lever 136 and closing of the contact mechanism. Additionally, the stationary contacts 178 and 180 are at all times protected by the housing 104 of the module 102, and any risk of electrical shock due to contact with line side terminal 142 and the stationary contacts 178 and 180 is avoided. The disconnect module 102 is therefore considered to be safer than many known fused disconnect devices.

When the modules 102 are ganged together to form a multi-pole device, such as the device 100, one lever 136 may be extended through and connect to multiple switch actuators 110 for different modules. Thus, all the connected modules 102 may be disconnected and reconnected by manipulating a single lever 136. That is, multiple poles in the device 100 may be switched simultaneously. Alternatively, the switch actuators 110 of each module 102 in the device 100 may be actuated independently with separate levers 136 for each module.

Figure 4:
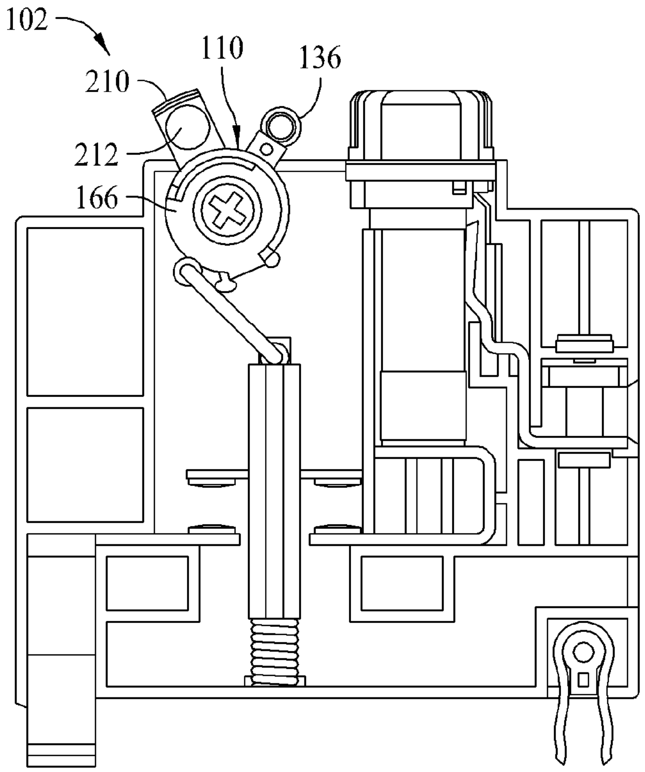
FIG. 4 is a side elevational view of a second embodiment of a fusible switching disconnect device.

FIG. 4 is a side elevational view of a further exemplary embodiment of a fusible switching disconnect module 102 including, for example, a retractable lockout tab 210 which may extend from the switch actuator 110 when the lever 136 is moved to the open position. The lockout tab 210 may be provided with a lock opening 212 therethrough, and a padlock or other element may be inserted through the lock opening 212 to ensure that the lever 136 may not be moved to the closed position. In different embodiments, the lockout tab 210 may be spring loaded and extended automatically, or may be manually extended from the switch actuator body 166. When the lever 136 is moved to closed position, the lockout tab 210 may be automatically or manually returned to retracted position wherein the switch actuator 110 may be rotated back to the closed position shown in FIG. 2.

Figure 5:
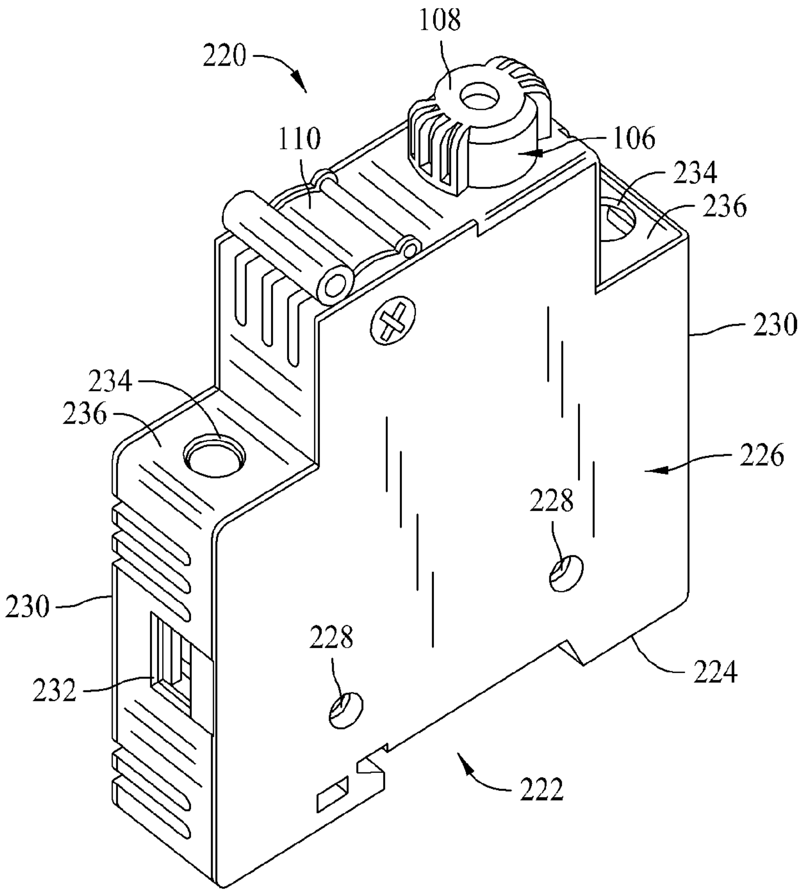
FIG. 5 is a perspective view of a third embodiment of a fusible switching disconnect device.

FIG. 5 is a perspective view of a third exemplary embodiment of a fusible switching disconnect module 220 similar to the module 102 described above but having, for example, a DIN rail mounting slot 222 formed in a lower edge 224 of a housing 226. The housing 226 may also include openings 228 which may be used to gang the module 220 to other disconnect modules. Side edges 230 of the housing 226 may include connection openings 232 for line side and load connections to box lugs or clamps within the housing 226. Access openings 234 may be provided in recessed upper surfaces 236 of the housing 226. A stripped wire, for example, may be extended through the connection openings 232 and a screwdriver may be inserted through the access openings 234 to connect line and load circuitry to the module 220.

Like the module 102, the module 220 may include the fuse 106, the fuse cover 108 and the switch actuator 110. Switching of the module 220 is accomplished with switchable contacts as described above in relation to the module 102.

Figure 6:
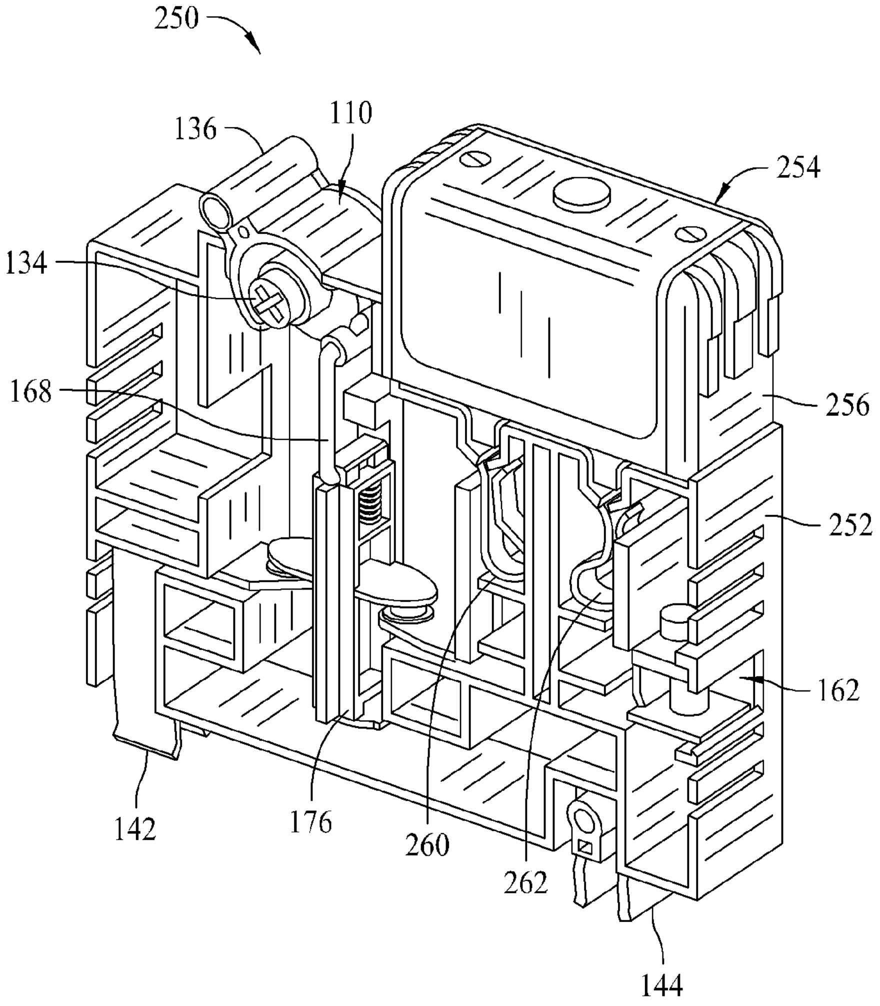
FIG. 6 is a perspective view of a fourth embodiment of a fusible switching disconnect device.
Figure 7:
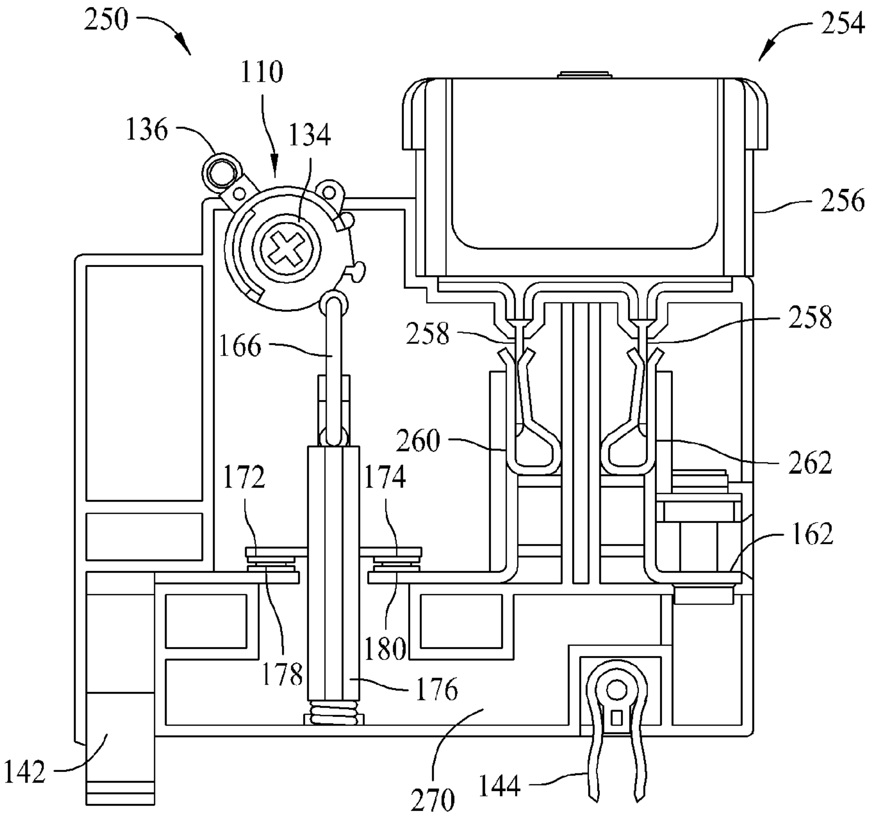
FIG. 7 is a side elevational view of the fusible switching disconnect device shown in FIG. 6.

FIGS. 6 and 7 are perspective views of a fourth exemplary embodiment of a fusible switching disconnect module 250 which, like the modules 102 and 220 described above, includes a switch actuator 110 rotatably mounted to the housing on a shaft 134, a lever 136 extending from the shaft 134, an actuator link 168, and a slider bar 176. The module 250 also includes, for example, a mounting clip 144 and a line side terminal element 142.

Unlike the modules 102 and 220, the module 250 may include a housing 252 configured or adapted to receive a rectangular fuse module 254 instead of a cartridge fuse 106. The fuse module 254 is a known assembly including a rectangular housing 256, and terminal blades 258 extending from the housing 256. A fuse element or fuse assembly may be located within the housing 256 and is electrically connected between the terminal blades 258. Such fuse modules 254 are known and in one embodiment are CUBEFuse modules commercially available from Eaton's Bussmann Business of St. Louis, Missouri.

A line side fuse clip 260 may be situated within the housing 252 and may receive one of the terminal blades 258 of the fuse module 254. A load side fuse clip 262 may also be situated within the housing 252 and may receive the other of the fuse terminal blades 258. The line side fuse clip 260 may be electrically connected to the stationary contact 180. The load side fuse clip 262 may be electrically connected to the load side terminal 162. The line side terminal 142 may include the stationary contact 178, and switching may be accomplished by rotating the switch actuator 110 to engage and disengage the switchable contacts 172 and 174 with the respective stationary contacts 178 and 180 as described above. While the line terminal 142 is illustrated as a bus bar clip, it is recognized that other line terminals may be utilized in other embodiments, and the load side terminal 162 may likewise be another type of terminal in lieu of the illustrated saddle screw terminal in another embodiment.

The fuse module 254 may be plugged into the fuse clips 260, 262 or extracted therefrom to install or remove the fuse module 254 from the housing 252. For switching purposes, however, the circuit is connected and disconnected at the contacts 172, 174 and 178 and 180 rather than at the fuse clips 260 and 262. Arcing between the disconnected contacts may therefore contained in an arc chute or compartment 270 at the lower portion of the compartment and away from the fuse clips 260 and 262. By opening the disconnect module 250 with the switch actuator 110 before installing or removing the fuse module 254, any risk posed by electrical arcing or energized metal at the fuse and housing interface is eliminated. The disconnect module 250 is therefore believed to be safer to use than many known fused disconnect switches.

A plurality of modules 250 may be ganged or otherwise connected together to form a multi-pole device. The poles of the device could be actuated with a single lever 136 or independently operable with different levers.

Figure 8:
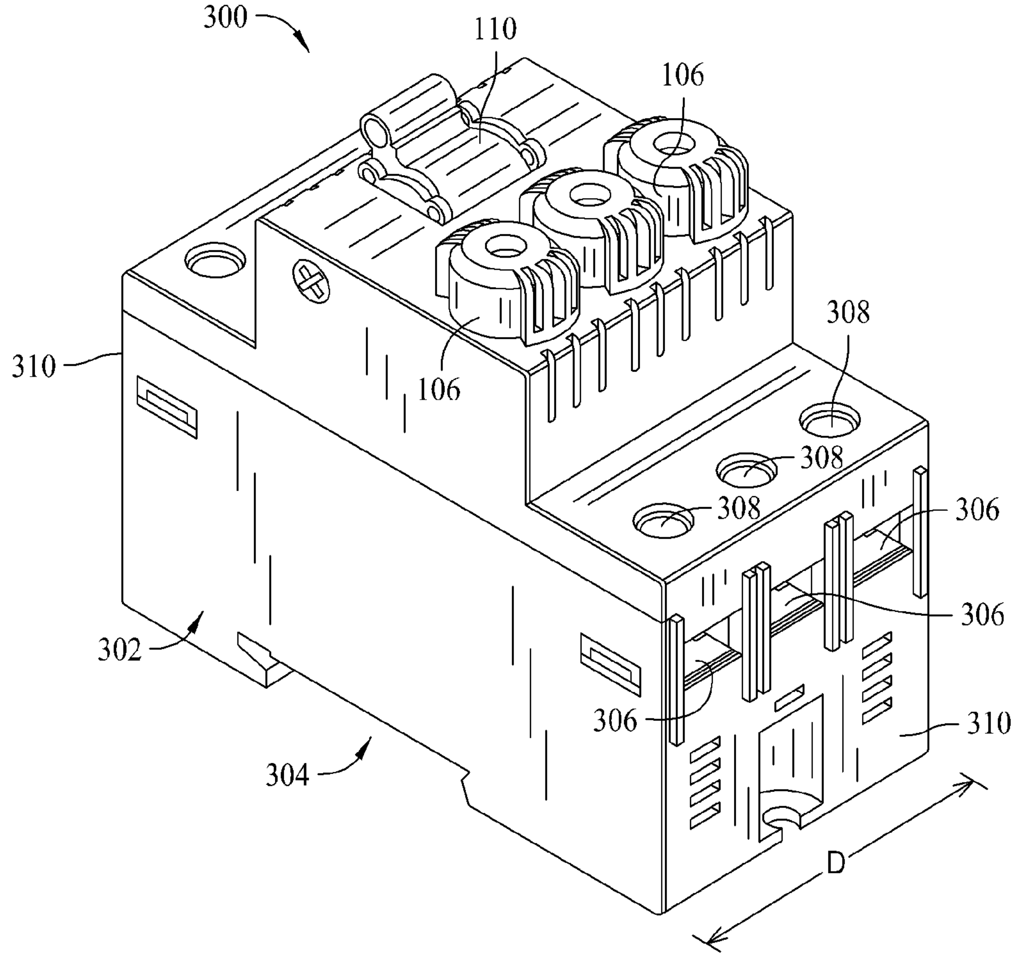
FIG. 8 is a perspective view of a fifth embodiment of a fusible switching disconnect device.

FIG. 8 is a perspective view of a fifth exemplary embodiment of a fusible switching disconnect device 300 which is, for example, a multi-pole device in an integrated housing 302.

The housing 302 may be constructed to accommodate three fuses 106 in an exemplary embodiment, and is therefore well suited for a three phase power application. The housing 302 may include a DIN rail slot 304 in the illustrated embodiment, although it is understood that other mounting options, mechanisms, and mounting schemes may be utilized in alternative embodiments. Additionally, in one embodiment the housing 302 may have a width dimension D of about 45 mm in accordance with IEC industry standards for contactors, relays, manual motor protectors, and integral starters that are also commonly used in industrial control system applications. The benefits of the invention, however, accrue equally to devices having different dimensions and devices for different applications.

The housing 302 may also include connection openings 306 and access openings 308 in each side edge 310 which may receive a wire connection and a tool, respectively, to establish line and load connections to the fuses 106. A single switch actuator 110 may be rotated to connect and disconnect the circuit through the fuses between line and load terminals of the disconnect device 300.

Figure 9:
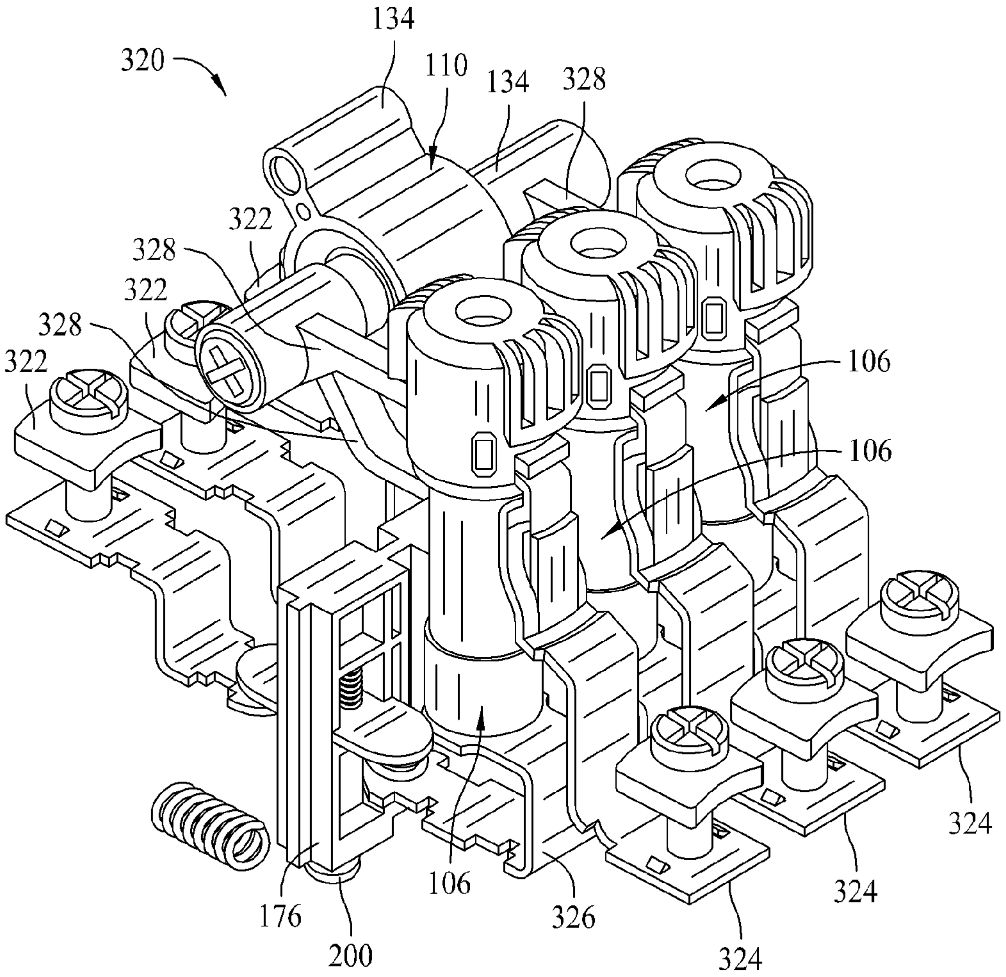
FIG. 9 is a perspective view of a portion of the fusible switching disconnect device shown in FIG. 8.

FIG. 9 is a perspective view of an exemplary switching assembly 320 for the device 300. The switching assembly 320 may be accommodated in the housing 302 and in an exemplary embodiment may include a set of line terminals 322, a set of load terminals 324, a set of lower fuse terminals 326 associated with each respective fuse 106, and a set of slider bars 176 having switchable contacts mounted thereon for engaging and disengaging stationary contacts mounted to the ends of the line terminals 322 and the lower fuse terminals 324. An actuator link (not visible in FIG. 9) may be mounted to an actuator shaft 134, such that when the lever 136 is rotated, the slider bar 176 may be moved to disconnect the switchable contacts from the stationary contacts. Bias elements 200 may be provided beneath each of the slider bars 176 and assist operation of the switch actuator 110 as described above. As with the foregoing embodiments of modules, a variety of line side and load side terminal structures may be used in various embodiments of the switching assembly.

Retention bars 328 may also be provided on the shaft 134 which extend to the fuses 106 and engage the fuses in an interlocking manner to prevent the fuses 106 from being removed from the device 300 except when the switch actuator 110 is in the open position. In the open position, the retention bars 328 may be angled away from the fuses 106 and the fuses 106 may be freely removed. In the closed position, as shown in FIG. 9, the retention arms or bars 328 lock the fuses 106 in place. In an exemplary embodiment, distal ends of the bars or arms 328 may be received in slots or detents in the fuses 106, although the fuses 106 could be locked in another manner as desired.

Figure 10:
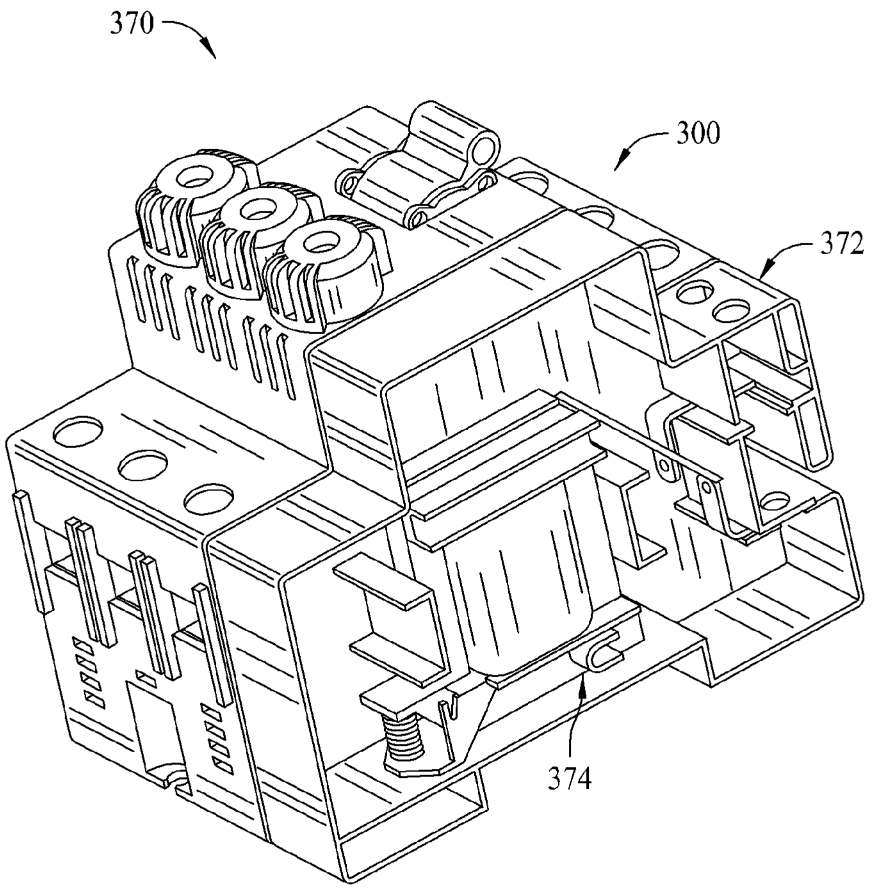
FIG. 10 is a perspective view of a sixth embodiment of a fusible switching disconnect device.

FIG. 10 is a perspective view of a sixth exemplary embodiment of a fusible switching disconnect device 370 including the disconnect module 300 described above and, for example, an under voltage module 372 mounted to one side of the module 300 and mechanically linked to the switch mechanism in the module 300. In an exemplary embodiment, the under voltage module 372 may include an electromagnetic coil 374 calibrated to a predetermined voltage range. When the voltage drops below the range, the electromagnetic coil 374 causes the switch contacts in the module 300 to open. A similar module 372 could be employed in an alternative embodiment to open the switch contacts when the voltage experienced by the electromagnetic coil 374 exceeds a predetermined voltage range, and may therefore serve as an overvoltage module. In such a manner, the switch contact in the module 300 could be opened with module 372 and the coil 374 as undervoltage or overvoltage conditions occur.

Figure 11:
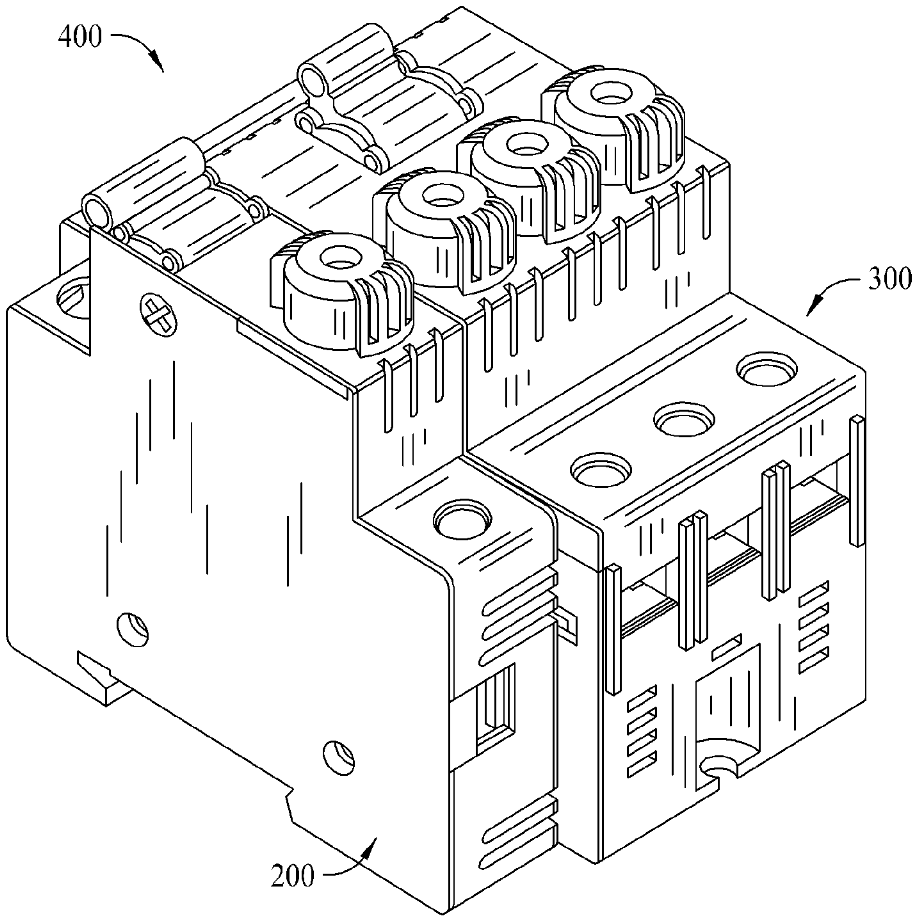
FIG. 11 is a perspective view of a seventh embodiment of a fusible switching disconnect device.

FIG. 11 is a perspective view of a seventh exemplary embodiment of a fusible switching disconnect device 400 which is essentially the disconnect device 300 and a disconnect device 220 coupled together. The disconnect device 300 provides three poles for an AC power circuit and the device 220 provides an additional pole for other purposes.

Figure 12:
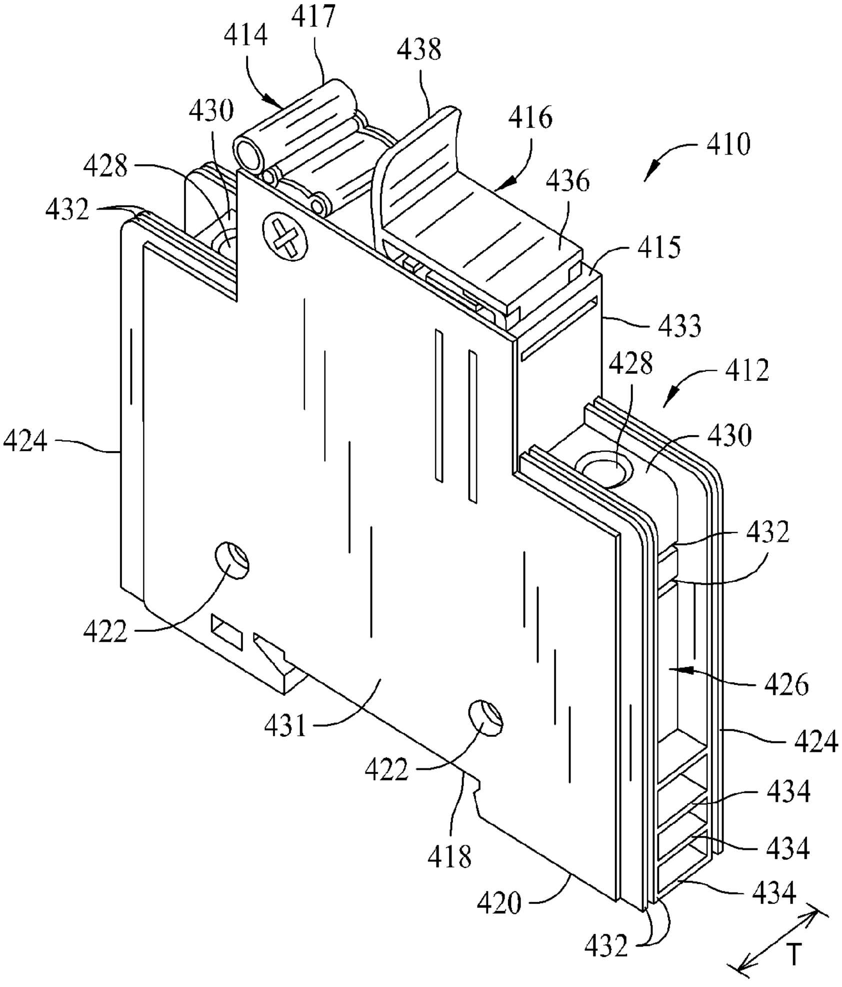
FIG. 12 is a perspective view of an eighth embodiment of a fusible switching disconnect device in a closed position.

FIG. 12 is a perspective view of an eighth embodiment of a fusible switching disconnect module 410 that, like the foregoing embodiments, includes a nonconductive housing 412, a switch actuator 414 extending through a raised upper surface 415 of the housing 412, and a cover 416 that provides access to a fuse receptacle (not shown in FIG. 12) within the housing 412 for installation and replacement of an overcurrent protection fuse (also not shown in FIG. 12). Like the foregoing embodiments, the housing 412 includes switchable and stationary contacts (not shown in FIG. 12) that complete or break an electrical connection through the fuse in the housing 412 via movement of an actuator lever 417.

A DIN rail mounting slot 418 may be formed in a lower edge 420 of the housing 412, and the DIN rail mounting slot 418 may be dimensioned, for example, for snap-fit engagement and disengagement with a 35 mm DIN rail by hand and without a need of tools. The housing 412 may also include openings 422 that may be used to gang the module 410 to other disconnect modules as explained below. Side edges 424 of the housing 412 may be open ended to provide access to wire lug terminals 426 to establish line and load-side electrical connections external circuitry. Terminal access openings 428 may be provided in recessed upper surfaces 430 of the housing 412. A stripped wire, for example, may be extended through the sides of the wire lug terminals 426 and a screwdriver may be inserted through the access openings 428 to tighten a terminal screw to clamp the wires to the terminals 426 and connect line and load circuitry to the module 410. While wire lug terminals 426 are included in one embodiment, it is recognized that a variety of alternative terminal configurations or types may be utilized in other embodiments to establish line and load side electrical connections to the module 410 via wires, cables, bus bars etc.

Like the foregoing embodiments, the housing 412 is sized and dimensioned complementary to and compatible with DIN and IEC standards, and the housing 412 defines an area or footprint on the lower edge 420 for use with standardized openings having a complementary shape and dimension. By way of example only, the housing 412 of the single pole module 410 may have a thickness T of about 17.5 mm for a breaking capacity of up to 32 A; 26 mm for a breaking capacity of up to 50 A, 34 mm for a breaking capacity of up to 125 A; and 40 mm for a breaking capacity of up to 150 A per DIN Standard 43 880. Likewise, it is understood that the module 410 could be fabricated as a multiple pole device such as a three pole device having a dimension T of about 45 mm for a breaking capacity of up to 32 A; 55 mm for a breaking capacity of up to 50 A, and 75 mm for a breaking capacity of up to 125 A. While exemplary dimensions are provided, it is understood that other dimensions of greater or lesser values may likewise be employed in alternative embodiments of the invention.

Additionally, and as illustrated in FIG. 12, the side edges 424 of the housing 412 may include opposed pairs of vertically oriented flanges 432 spaced from one another and projecting away from the wire lug terminals 426 adjacent the housing upper surface 430 and the sides of the wire lug terminals 426. The flanges 432, sometimes referred to as wings, provide an increased surface area of the housing 412 in a horizontal plane extending between the between the wire lug terminals 426 on the opposing side edges 424 of the housing 412 than would otherwise occur if the flanges 432 were not present. That is, a peripheral outer surface area path length extending in a plane parallel to the lower surface 420 of the housing 412 includes the sum of the exterior surface dimensions of one of the pairs of flanges 432 extending from one of the terminals 426, the exterior dimensions of the respective front or rear panel 431, 433 of the housing, and the exterior surface dimensions of the opposing flanges 432 extending to the opposite terminal 426.

Additionally, the housing 412 may also include horizontally extending ribs or shelves 434 spaced from one another and interconnecting the innermost flanges 432 in a lower portion of the housing side edges 424. The ribs or shelves 434 increase a surface area path length between the terminals 426 in a vertical plane of the housing 412 to meet external requirements for spacing between the terminals 426. The flanges 432 and ribs 434 result in serpentine-shaped surface areas in horizontal and vertical planes of the housing 412 that permit greater voltage ratings of the device without increasing the footprint of the module 410 in comparison, for example, to the previously described embodiments of FIGS. 1-11. For example, the flanges 432 and the ribs 434, facilitate a voltage rating of 600 VAC while meeting applicable internal and external spacing requirements between the terminals 426 under applicable UL standards.

The cover 416, unlike the above-described embodiments, may include a substantially flat cover portion 436, and an upstanding finger grip portion 438 projecting upwardly and outwardly from one end of the flat cover portion 436 and facing the switch actuator 414. The cover 416 may be fabricated from a nonconductive material or insulative material such as plastic according to known techniques, and a the flat cover portion 436 may be hinged at an end thereof opposite the finger grip portion 438 so that the cover portion 436 is pivotal about the hinge. By virtue of the hinge, the finger grip portion 438 is movable away from the switch actuator 414 along an arcuate path as further explained below. As illustrated in FIG. 12, the cover 416 is in a closed position concealing the fuse within the housing 412, and as explained below, the cover 416 is movable to an open position providing access to the fuse in the disconnect module 410.

Figure 13:
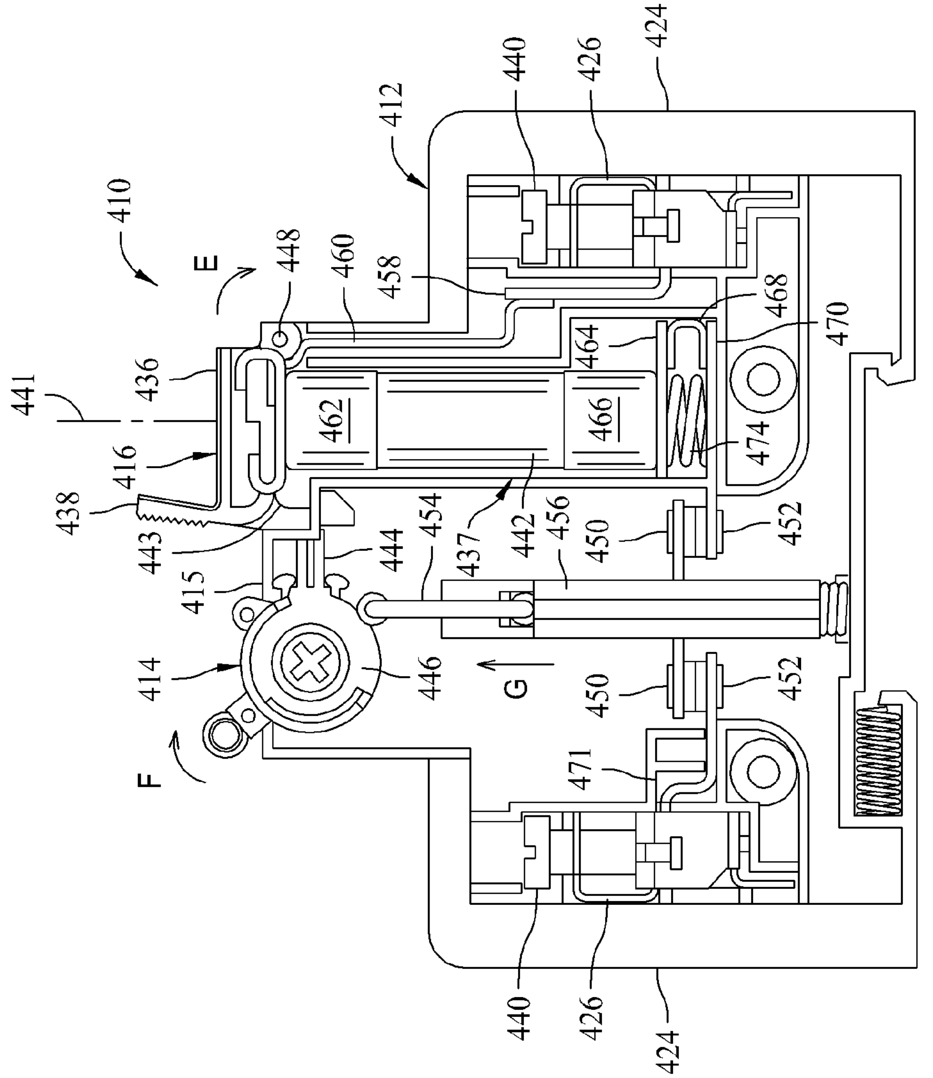
FIG. 13 is a side elevational view of a portion of the fusible switching disconnect device shown in FIG. 12.

FIG. 13 is a side elevational view of the module 410 with the front panel 431 (FIG. 12) removed so that internal components and features may be seen. The wire lug terminals 426 and terminal screws 440 are positioned adjacent the side edges 424 of the housing 412. A fuse 442 is loaded or inserted into the module 410 in a direction substantially perpendicular to the housing upper surface 415, and as illustrated in FIG. 13, a longitudinal axis 441 of the fuse 442 extends vertically, as opposed to horizontally, within the housing 412. The fuse 442 is contained within the housing 412 beneath the cover 416, and more specifically beneath the flat cover portion 436. The fuse 442 is situated longitudinally in a fuse receptacle 437 integrally formed in the housing 412. That is, the fuse receptacle 437 is not movable relative to the housing 402 for loading and unloading of the fuse 442. The fuse 442 is received in the receptacle 437 with one end of the fuse 442 positioned adjacent and beneath the cover 416 and the module top surface 415 and the other end of the fuse 442 spaced from the cover 416 and the module top surface 415 by a distance equal to the length of the fuse 442. An actuator interlock 443 is formed with the cover 416 and extends downwardly into the housing 412 adjacent and alongside the fuse receptacle 437. The actuator interlock 443 of the cover 416 extends opposite and away from the cover finger grip portion 438.

A cover lockout tab 444 extends radially outwardly from a cylindrical body 446 of the switch actuator 414, and when the switch actuator 414 is in the closed position illustrated in FIG. 13 completing an electrical connection through the fuse 442, the cover lockout tab 444 is extended generally perpendicular to the actuator interlock 443 of the cover 416 and a distal end of the cover lockout tab 444 is positioned adjacent the actuator interlock 443 of the cover 416. The cover lockout tab 444 therefore directly opposes movement of the actuator interlock 443 and resists any attempt by a user to rotate the cover 416 about the cover hinge 448 in the direction of arrow E to open the cover 416. In such a manner, the fuse 442 cannot be accessed without first rotating the switch actuator 414 in the direction of arrow F to move the pair of switchable contacts 450 away from the stationary contacts 452 via the actuator link 454 and sliding bar 456 carrying the switchable contacts 450 in a similar manner to the foregoing embodiments. Inadvertent contact with energized portions of the fuse 442 is therefore prevented, as the cover 416 can only be opened to access the fuse 442 after the circuit through the fuse 442 is disconnected via the switchable contacts 450, thereby providing a degree of safety to human operators of the module 410. Additionally, and because the cover 416 conceals the fuse 442 when the switchable contacts 450 are closed, the outer surfaces of the housing 412 and the cover 416 are touch safe.

A conductive path through the housing 412 and fuse 442 is established as follows. A rigid terminal member 458 is extended from the load side terminal terminal 426 closest to the fuse 442 on one side of the housing 412. A flexible contact member 460, such as a wire may be connected to the terminal member 458 at one end and attached to an inner surface of the cover 416 at the opposite end. When the cover 416 is closed, the contact member 460 is brought into mechanical and electrical engagement with an upper ferrule or end cap 462 of the fuse 442. A movable lower fuse terminal 464 is mechanically and electrically connected to the lower fuse ferrule or end cap 466, and a flexible contact member 468 interconnects the movable lower fuse terminal 464 to a stationary terminal 470 that carries one of the stationary contacts 452. The switchable contacts 450 interconnect the stationary contacts 452 when the switch actuator 414 is closed as shown in FIG. 13. A rigid terminal member 472 completes the circuit path to the line side terminal 426 on the opposing side of the housing 412. In use, current flows through the circuit path from the line side terminal 426 and the terminal member 472, through the switch contacts 450 and 452 to the terminal member 470. From the terminal member 470, current flows through the contact member 468 to the lower fuse terminal 464 and through the fuse 442. After flowing through the fuse 442, current flows to the contact member 460 to the terminal member 458 and to the line side terminal 426.

The fuse 442 in different exemplary embodiments may be a commercially available 10×38 Midget fuse of Eaton's Bussmann Business of St. Louis, Missouri; an IEC 10×38 fuse; a class CC fuse; or a D/DO European style fuse. Additionally, and as desired, optional fuse rejection features may be formed in the lower fuse terminal 464 or elsewhere in the module, and cooperate with fuse rejection features of the fuses so that only certain types of fuses may be properly installed in the module 410. While certain examples of fuses are herein described, it is understood that other types and configurations of fuses may also be employed in alternative embodiments, including but not limited to various types of cylindrical or cartridge fuses and rectangular fuse modules.

Figure 14:
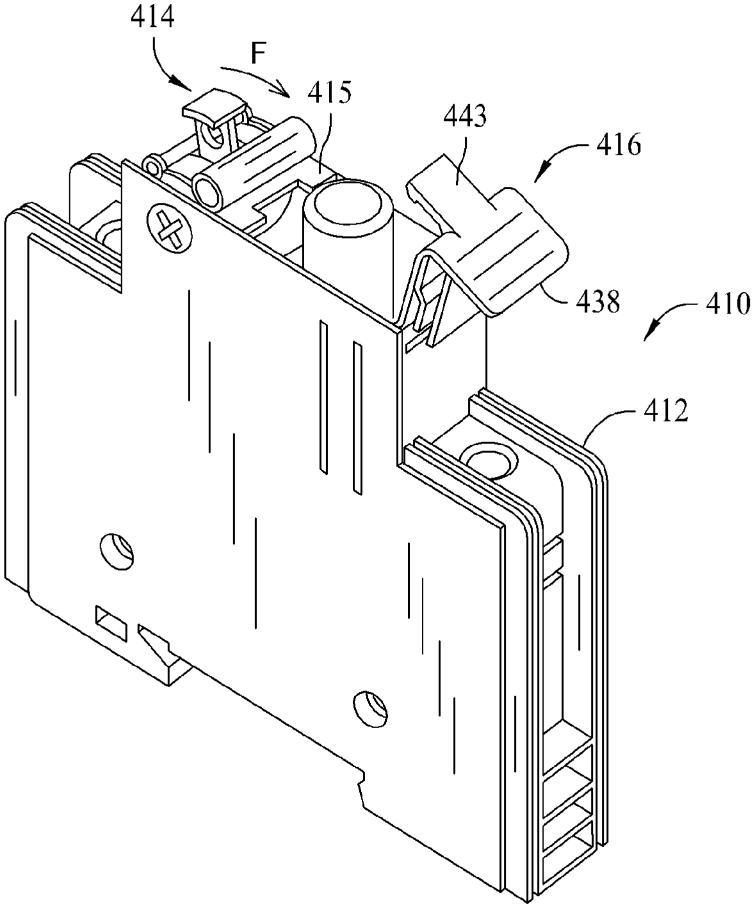
FIG. 14 is a perspective view of the fusible switching disconnect device shown in FIGS. 12 and 13 in an opened position.

A biasing element 474 may be provided between the movable lower fuse terminal 464 and the stationary terminal 470. The bias element 474 may be for example, a helical coil spring that is compressed to provide an upward biasing force in the direction of arrow G to ensure mechanical and electrical engagement of the movable lower fuse terminal 464 to the lower fuse ferrule 466 and mechanical and electrical engagement between the upper fuse ferrule 462 and the flexible contact member 460. When the cover 416 is opened in the direction of arrow E to the open position, the bias element 474 forces the fuse upward along its axis 441 in the direction of arrow G as shown in FIG. 14, exposing the fuse 442 through the raised upper surface 415 of the housing 412 for easy retrieval by an operator for replacement. That is, the fuse 442, by virtue of the bias element 474, is automatically lifted and ejected from the housing 412 when the cover 416 is rotated about the hinge 448 in the direction of arrow E after the switch actuator 414 is rotated in the direction of arrow F.

Figure 15:
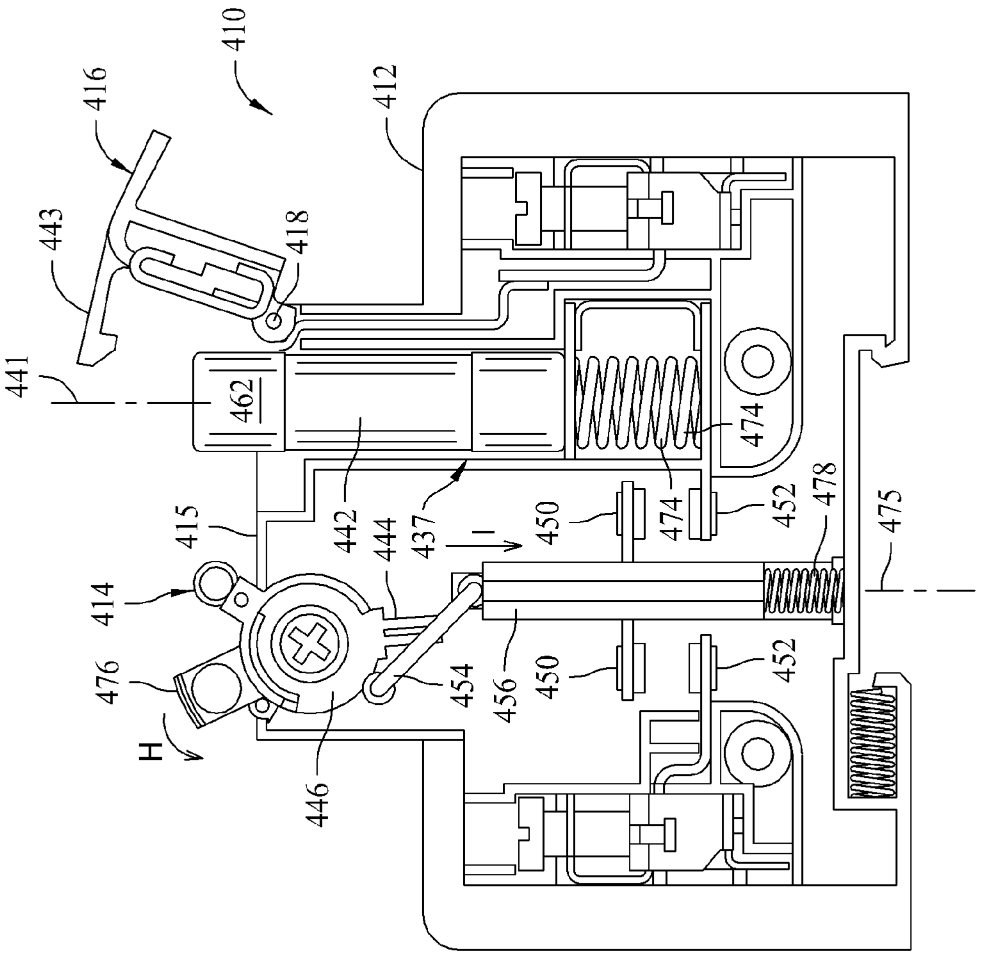
FIG. 15 is a side elevational view of a portion of the fusible switching disconnect device shown in FIG. 14.

FIG. 15 is a side elevational view of the module 410 with the cover 416 pivoted about the hinge 448 and the switch actuator 414 in the open position. The switchable contacts 450 are moved upwardly by rotation of the actuator 414 and the displacement of the actuator link 454 causes the sliding bar 456 to move along a linear axis 475 substantially parallel to the axis 441 of the fuse 442, physically separating the switchable contacts 450 from the stationary contacts 452 within the housing 412 and disconnecting the conductive path through the fuse 442. Additionally, and because of the pair of switchable contacts 450, electrical arcing is distributed among more than one location as described above.

The bias element 474 deflects when the cover 416 is opened after the actuator 414 is moved to the open position, and the bias element 474 lifts the fuse 442 from the housing 412 so that the upper fuse ferrule 462 is extended above the top surface 415 of the housing. In such a position, the fuse 442 may be easily grasped and pulled out of or extracted from the module 410 along the axis 441. Fuses may therefore be easily removed from the module 410 for replacement.

Also when the actuator 414 is moved to the open position, an actuator lockout tab 476 extends radially outwardly from the switch actuator body 446 and may accept for example, a padlock to prevent inadvertent closure of the actuator 414 in the direction of arrow H that would otherwise cause the slider bar 456 to move downward in the direction of arrow I along the axis 475 and engage the switchable contacts 450 to the stationary contacts 452, again completing the electrical connection to the fuse 442 and presenting a safety hazard to operators. When desired, the cover 416 may be rotated back about the hinge 448 to the closed position shown in FIGS. 12 and 13, and the switch actuator 414 may be rotated in the direction of arrow H to move the cover interlock tab 444 into engagement with the actuator interlock 443 of the cover 416 to maintain each of the cover 416 and the actuator 414 in static equilibrium in a closed and locked position. Closure of the cover 416 requires some force to overcome the resistance of the bias spring 474 in the fuse receptacle 437, and movement of the actuator to the closed position requires some force to overcome the resistance of a bias element 478 associated with the sliding bar 456, making inadvertent closure of the contacts and completion of the circuit through the module 410 much less likely.

Figure 16:
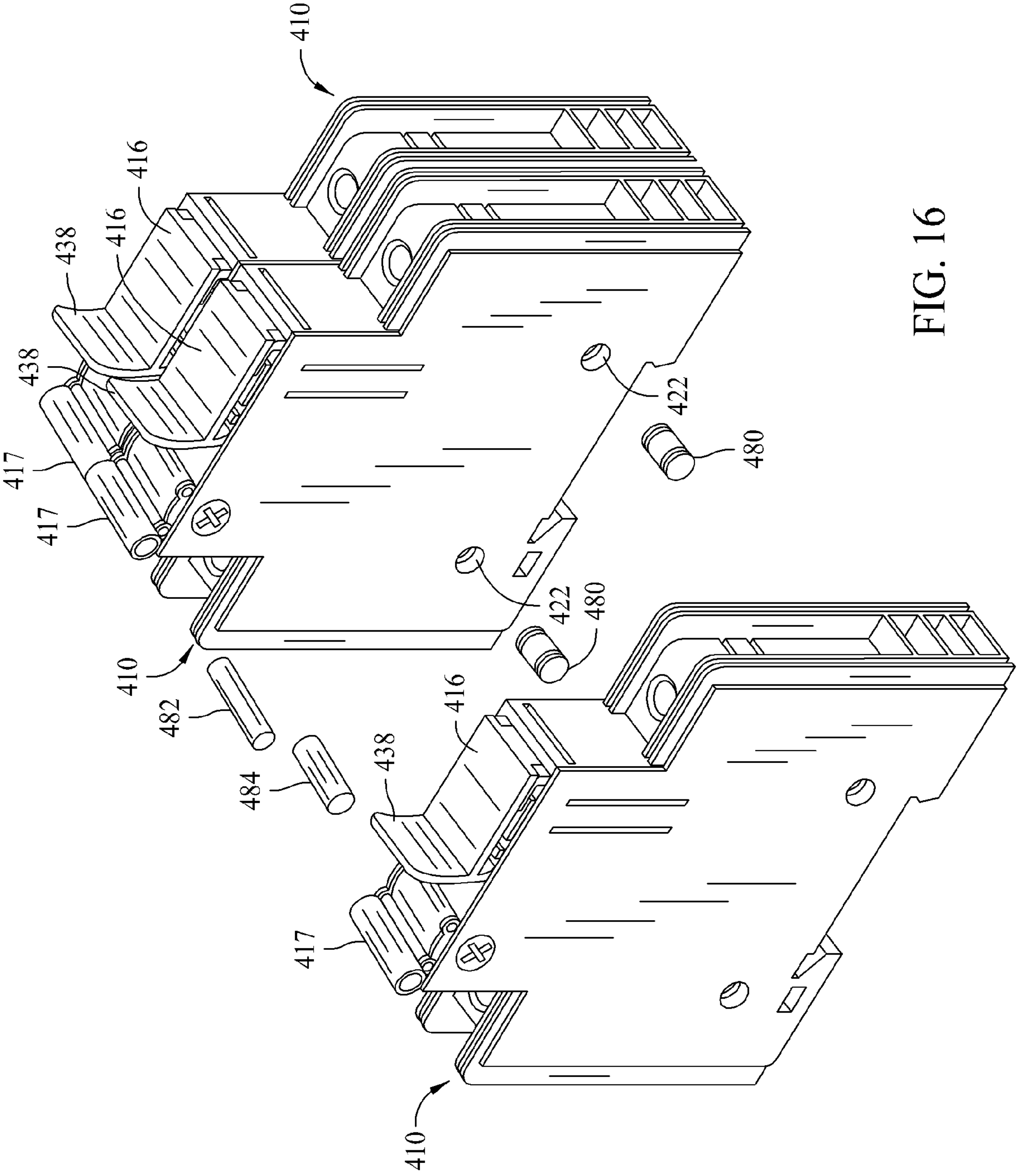
FIG. 16 is a perspective view of a ganged arrangement of fusible switching devices shown in FIGS. 12-15.

FIG. 16 is a perspective view of a ganged arrangement of fusible switching disconnect modules 410. Connector pieces 480 may be fabricated from plastic, for example, and may be used with the openings 422 in the housing panels to retain modules 410 in a side-by-side relation to one another with, for example, snap fit engagement. Pins 482 and/or shims 484, for example, may be utilized to join or tie the actuator levers 417 and cover finger grip portions 438 of each module 410 to one another so that all of the actuator levers 417 and/or of all of the covers 416 of the combined modules 410 are simultaneously moved with one another. Simultaneous movement of the covers 416 and levers 417 may be especially advantageous for breaking three phase current or, as another example, when switching power to related equipment, such as motor and a cooling fan for the motor so that one does not run without the other.

While single pole modules 410 ganged to one another to form multiple pole devices has been described, it is understood that a multiple pole device having the features of the module 410 could be constructed in a single housing with appropriate modification of the embodiment shown in FIGS. 8 and 9, for example.

Figure 17:
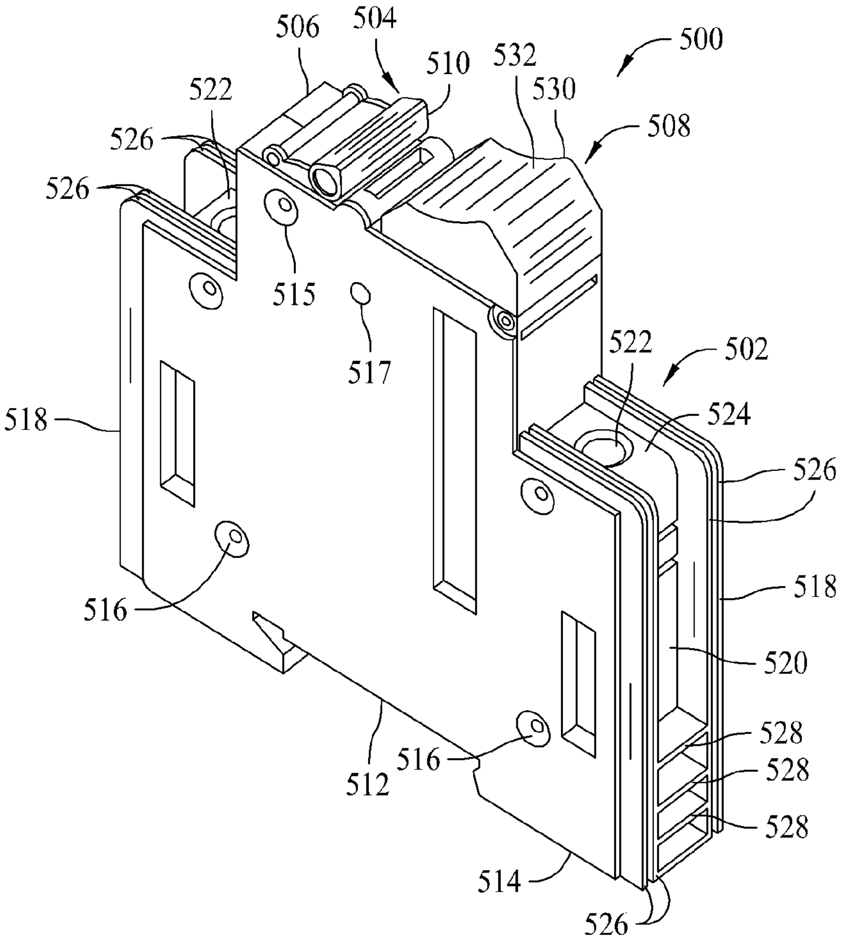
FIG. 17 is a perspective view of a ninth embodiment of a fusible switching disconnect device in a closed position.

FIG. 17 is a perspective view of a ninth embodiment of a fusible switching disconnect module 500 that, like the foregoing embodiments, includes a single pole housing 502, a switch actuator 504 extending through a raised upper surface 506 of the housing 502, and a cover 508 that provides access to a fuse receptacle (not shown in FIG. 17) within the housing 502 for installation and replacement of an overcurrent protection fuse (also not shown in FIG. 17). Like the foregoing embodiments, the housing 502 includes switchable and stationary contacts (not shown in FIG. 17) that connect or disconnect an electrical connection through the fuse in the housing 502 via movement of an actuator lever 510.

Similar to the module 410, the module 500 may include a DIN rail mounting slot 512 formed in a lower edge 514 of the housing 502 for mounting of the housing 502 without a need of tools. The housing 502 may also include an actuator opening 515 providing access to the body of the switch actuator 504 so that the actuator 504 may be rotated between the open and closed positions in an automated manner and facilitate remote control of the module 500. Openings 516 are also provided that may be used to gang the module 500 to other disconnect modules. A curved or arcuate tripping guide slot 517 is also formed in a front panel of the housing 502. A slidable tripping mechanism, described below, is selectively positionable within the slot 517 to trip the module 500 and disconnect the current path therethrough upon an occurrence of predetermined circuit conditions. The slot 517 also provides access to the tripping mechanism for manual tripping of the mechanism with a tool, or to facilitate remote tripping capability.

Side edges 518 of the housing 502 may be open ended to provide access to line and load side wire lug terminals 520 to establish line and load-side electrical connections to the module 500, although it is understood that other types of terminals may be used. Terminal access openings 522 may be provided in recessed upper surfaces 524 of the housing 502 to receive a stripped wire or other conductor extended through the sides of the wire lug terminals 520, and a screwdriver may be inserted through the access openings 522 to connect line and load circuitry to the module 500. Like the foregoing embodiments, the housing 502 is sized and dimensioned complementary to and compatible with DIN and IEC standards, and the housing 502 defines an area or footprint on the lower surface 514 of the housing for use with standardized openings having a complementary shape and dimension.

Like the module 410 described above, the side edges 518 of the housing 502 may include opposed pairs of vertically oriented flanges or wings 526 spaced from one another and projecting away from the wire lug terminals 520 adjacent the housing upper surface 524 and the sides of the wire lug terminals 520. The housing 502 may also include horizontally extending ribs or shelves 528 spaced from one another and interconnecting the innermost flanges 526 in a lower portion of the housing side edges 518. The flanges 526 and ribs 528 result in serpentine-shaped surface areas in horizontal and vertical planes of the housing 502 that permit greater voltage ratings of the device without increasing the footprint of the module 500 as explained above.

The cover 508, unlike the above-described embodiments, may include a contoured outer surface defining a peak 530 and a concave section 532 sloping downwardly from the peak 530 and facing the switch actuator 504. The peak 530 and the concave section 532 form a finger cradle area on the surface of the cover 508 and is suitable for example, to serve as a thumb rest for an operator to open or close the cover 508. The cover 508 may be hinged at an end thereof closest to the peak 530 so that the cover 508 is pivotal about the hinge and the cover 508 is movable away from the switch actuator 504 along an arcuate path. As illustrated in FIG. 17, the cover 508 is in a closed touch safe position concealing the fuse within the housing 502, and as explained below, the cover 508 is movable to an open position providing access to the fuse.

Figure 18:
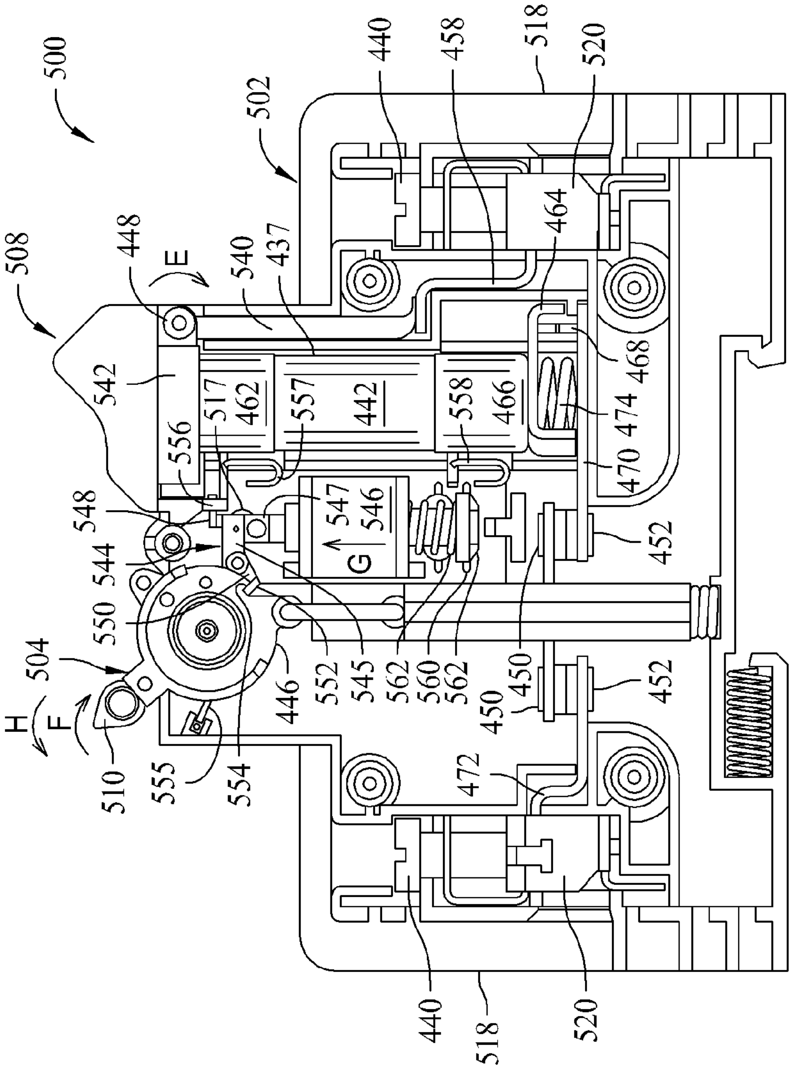
FIG. 18 is a side elevational view of a portion of the fusible switching disconnect device shown in FIG. 17.

FIG. 18 is a side elevational view of a portion of the fusible switching disconnect module 500 with a front panel thereof removed so that internal components and features may be seen. In some aspects the module 500 is similar to the module 410 described above in its internal components, and for brevity like features of the modules 500 and 410 are indicated with like reference characters in FIG. 18.

The wire lug terminals 520 and terminal screws 440 are positioned adjacent the side edges 518 of the housing 502. The fuse 442 is vertically loaded into the housing 502 beneath the cover 508, and the fuse 442 is situated in the non-movable fuse receptacle 437 formed in the housing 502. The cover 508 may be formed with a conductive contact member that may be, for example, cup-shaped to receive the upper fuse ferrule 462 when the cover 508 is closed.

A conductive circuit path is established from the line side terminal 520 and the terminal member 472, through the switch contacts 450 and 452 to the terminal member 470. From the terminal member 470, current flows through the contact member 468 to the lower fuse terminal 464 and through the fuse 442. After flowing through the fuse 442, current flows from the conductive contact member 542 of the cover 508 to the contact member 460 connected to the conductive contact member 542, and from the contact member 460 to the terminal member 458 and to the line side terminal 426.

A biasing element 474 may be provided between the movable lower fuse terminal 464 and the stationary terminal 470 as described above to ensure mechanical and electrical connection between the cover contact member 542 and the upper fuse ferrule 462 and between the lower fuse terminal 464 and the lower fuse ferrule 466. Also, the bias element 474 automatically ejects the fuse 442 from the housing 502 as described above when the cover 508 is rotated about the hinge 448 in the direction of arrow E after the switch actuator 504 is rotated in the direction of arrow F.

Unlike the module 410, the module 500 may further include a tripping mechanism 544 in the form of a slidably mounted trip bar 545 and a solenoid 546 connected in parallel across the fuse 442. The trip bar 545 is slidably mounted to the tripping guide slot 517 formed in the housing 502, and in an exemplary embodiment the trip bar 545 may include a solenoid arm 547, a cover interlock arm 548 extending substantially perpendicular to the solenoid arm 547, and a support arm 550 extending obliquely to each of the solenoid arm 547 and cover interlock arm 548. The support arm 550 may include a latch tab 552 on a distal end thereof. The body 446 of the switch actuator 504 may be formed with a ledge 554 that cooperates with the latch tab 552 to maintain the trip bar 545 and the actuator 504 in static equilibrium with the solenoid arm 547 resting on an upper surface of the solenoid 546.

A torsion spring 555 is connected to the housing 502 one end and the actuator body 446 on the other end, and the torsion spring 555 biases the switch actuator 504 in the direction of arrow F to the open position. That is, the torsion spring 555 is resistant to movement of the actuator 504 in the direction of arrow H and tends to force the actuator body 446 to rotate in the direction of arrow F to the open position. Thus, the actuator 504 is failsafe by virtue of the torsion spring 555. If the switch actuator 504 is not completely closed, the torsion spring 555 will force it to the open position and prevent inadvertent closure of the actuator switchable contacts 450, together with safety and reliability issues associated with incomplete closure of the switchable contacts 450 relative to the stationary contacts 452.

In normal operating conditions when the actuator 504 is in the closed position, the tendency of the torsion spring 555 to move the actuator to the open position is counteracted by the support arm 550 of the trip bar 545 as shown in FIG. 18. The latch tab 552 of the support arm 550 engages the ledge 554 of the actuator body 446 and holds the actuator 504 stably in static equilibrium in a closed and locked position. Once the latch tab 552 is released from the ledge 554 of the actuator body 446, however, the torsion spring 555 forces the actuator 504 to the open position.

An actuator interlock 556 is formed with the cover 508 and extends downwardly into the housing 502 adjacent the fuse receptacle 437. The cover interlock arm 548 of the trip arm 545 is received in the actuator interlock 556 of the cover 508 and prevents the cover 508 from being opened unless the switch actuator 504 is rotated in the direction of arrow F as explained below to move the trip bar 545 and release the cover interlock arm 548 of the trip bar 545 from the actuator interlock 556 of the cover 508. Deliberate rotation of the actuator 504 in the direction of arrow F causes the latch tab 552 of the support arm 550 of the trip bar 545 to be pivoted away from the actuator and causes the solenoid arm 547 to become inclined or angled relative to the solenoid 546. Inclination of the trip bar 545 results in an unstable position and the torsion spring 555 forces the actuator 504 to rotate and further pivot the trip bar 545 to the point of release.

Absent deliberate movement of the actuator to the open position in the direction of arrow F, the trip bar 545, via the interlock arm 548, directly opposes movement of the cover 508 and resists any attempt by a user to rotate the cover 508 about the cover hinge 448 in the direction of arrow E to open the cover 508 while the switch actuator 504 is closed and the switchable contacts 450 are engaged to the stationary contacts 452 to complete a circuit path through the fuse 442. Inadvertent contact with energized portions of the fuse 442 is therefore prevented, as the fuse can only be accessed when the circuit through the fuse is broken via the switchable contacts 450, thereby providing a degree of safety to human operators of the module 500.

Upper and lower solenoid contact members 557, 558 are provided and establish electrical contact with the respective upper and lower ferrules 462, 466 of the fuse 442 when the cover 508 is closed over the fuse 442. The contact members 557, 558 establish, in turn, electrical contact to a circuit board 560. Resistors 562 are connected to the circuit board 560 and define a high resistance parallel circuit path across the ferrules 462, 466 of the fuse 442, and the solenoid 546 is connected to this parallel circuit path on the circuit board 560. In an exemplary embodiment, the resistance is selected so that, in normal operation, substantially all of the current flow passes through the fuse 442 between the fuse ferrules 462, 466 instead of through the upper and lower solenoid contact members 557, 558 and the circuit board 560. The coil of the solenoid 546 is calibrated so that when the solenoid 546 experiences a predetermined voltage, the solenoid generates an upward force in the direction of arrow G that causes the trip bar 545 to be displaced in the tripping guide slot 517 along an arcuate path defined by the slot 517.

As those in the art may appreciate, the coil of the solenoid 546 may be calibrated to be responsive to a predetermined undervoltage condition or a predetermined overvoltage condition as desired. Additionally, the circuit board 560 may include circuitry to actively control operation of the solenoid 546 in response to circuit conditions. Contacts may further be provided on the circuit board 560 to facilitate remote control tripping of the solenoid 546. Thus, in response to abnormal circuit conditions that are predetermined by the calibration of the solenoid coil or control circuitry on the board 560, the solenoid 546 activates to displace the trip bar 545. Depending on the configuration of the solenoid 546 and/or the board 560, opening of the fuse 442 may or may not trigger an abnormal circuit condition causing the solenoid 546 to activate and displace the trip bar 545.

As the trip bar 545 traverses the arcuate path in the guide slot 517 when the solenoid 546 operates, the solenoid arm 547 is pivoted and becomes inclined or angled relative to the solenoid 546. Inclination of the solenoid arm 547 causes the trip bar 545 to become unstable and susceptible to force of the torsion spring 555 acting on the trip arm latch tab 552 via the ledge 554 in the actuator body 446. As the torsion spring 555 begins to rotate the actuator 504, the trip bar 545 is further pivoted due to engagement of the trip arm latch tab 552 and the actuator ledge 554 and becomes even more unstable and subject to the force of the torsion spring. The trip bar 545 is further moved and pivoted by the combined action of the guide slot 517 and the actuator 504 until the trip arm latch tab 552 is released from the actuator ledge 554, and the interlock arm 548 of the trip bar 545 is released from the actuator interlock 556. At this point, each of the actuator 504 and the cover 508 are freely rotatable.

Figure 19:
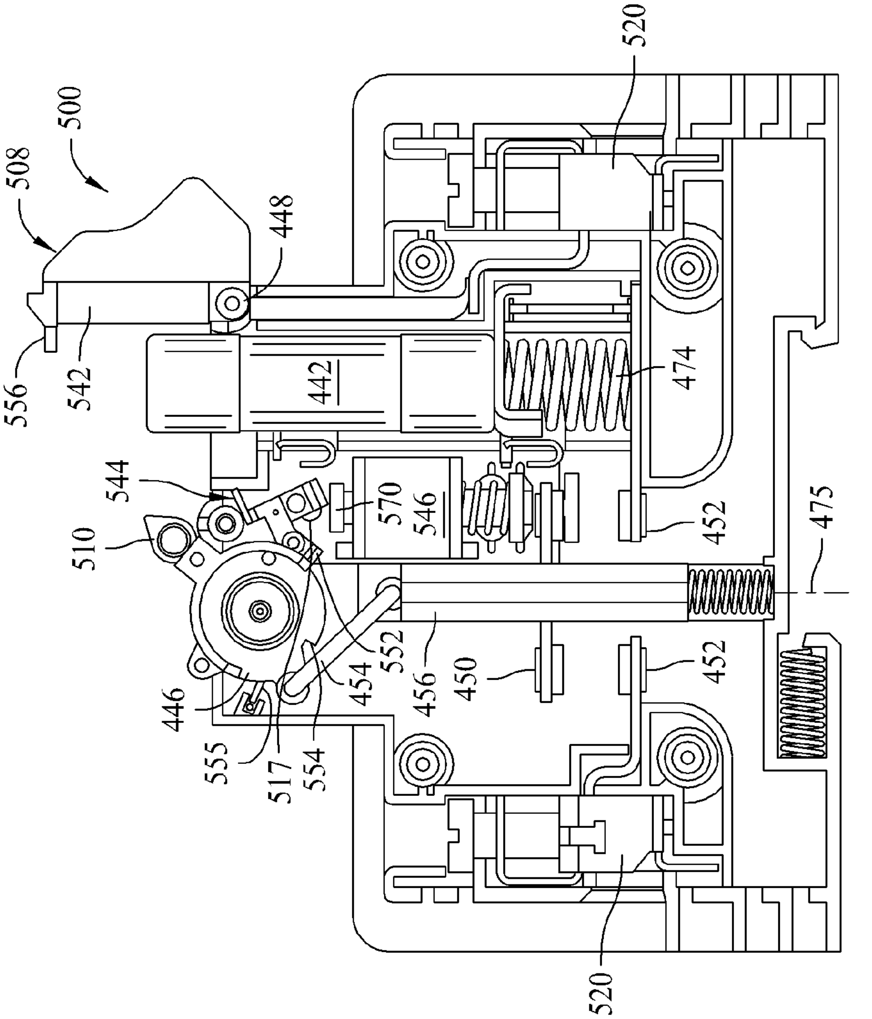
FIG. 19 is a side elevational view of the fusible switching disconnect device shown in FIG. 17 in an opened position.

FIG. 19 is a side elevational view of the fusible switching disconnect module 500 illustrating the solenoid 546 in a tripped position wherein a solenoid plunger 570 is displaced upwardly and engages the trip bar 545, causing the trip bar 545 to move along the curved guide slot 517 and become inclined and unstable relative to the plunger. As the trip bar 545 is displaced and pivoted to become unstable, the torsion spring 555 assists in causing the trip bar 545 to become more unstable as described above, until the ledge 554 of the actuator body 446 is released from the latch tab 552 of the trip bar 545, and the torsion spring 555 forces the actuator 504 to rotate completely to the open position shown in FIG. 19. As the actuator 504 rotates to the open position, the actuator link 454 pulls the sliding bar 456 upward along the linear axis 475 and separates the switchable contacts 450 from the stationary contacts 452 to open or disconnect the circuit path between the housing terminals 520. Additionally, the pivoting of the trip bar 545 releases the actuator interlock 556 of the cover 508, allowing the bias element 474 to force the fuse upwardly from the housing 502 and causing the cover 508 to pivot about the hinge 448 so that the fuse 442 is exposed for easy removal and replacement.

Figure 20:
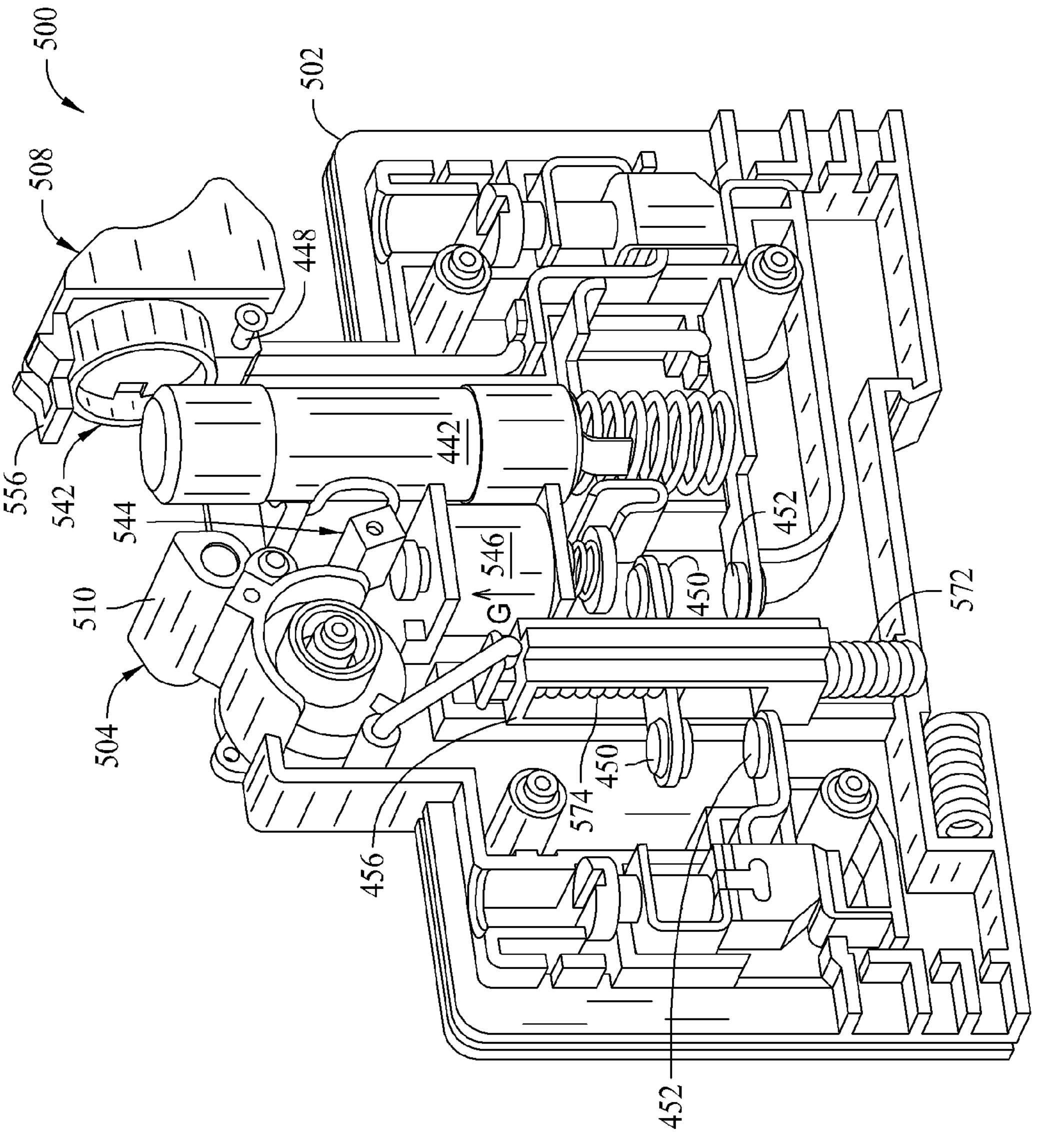
FIG. 20 is a perspective view of the fusible switching disconnect device shown in FIG. 19.

FIG. 20 is a perspective view of the fusible switching disconnect module 500 in the tripped position and the relative positions of the actuator 504, the trip bar 545 and the cover 508. As also shown in FIG. 20, the sliding bar 456 carrying the switchable contacts 450 may be assisted to the open position by a first bias element 572 external to the sliding bar 456 and a second bias element 574 internal to the sliding bar 456. The bias elements 572, 574 may be axially aligned with one another but oppositely loaded in one embodiment. The bias elements 572, 574 may be for example, helical coil spring elements, and the first bias element 572 may be loaded in compression, for example, while the second bias element 574 is loaded in tension. Therefore, the first bias element 572 exerts an upwardly directed pushing force on the sliding bar 456 while the second bias element 574 exerts an upwardly directed pulling force on the sliding bar 456. The combined forces of the bias elements 572, 574 force the sliding bar in an upward direction indicated by arrow G when the actuator is rotated to the open position as shown in FIG. 20. The double spring action of the bias elements 572, 574, together with the torsion spring 555 (FIGS. 18 and 19) acting on the actuator 504 ensures a rapid, automatic, and complete separation of the switchable contacts 450 from the fixed contacts 452 in a reliable manner. Additionally, the double spring action of the bias elements 572, 574 effectively prevents and/or compensates for contact bounce when the module 500 is operated.

Figure 21:
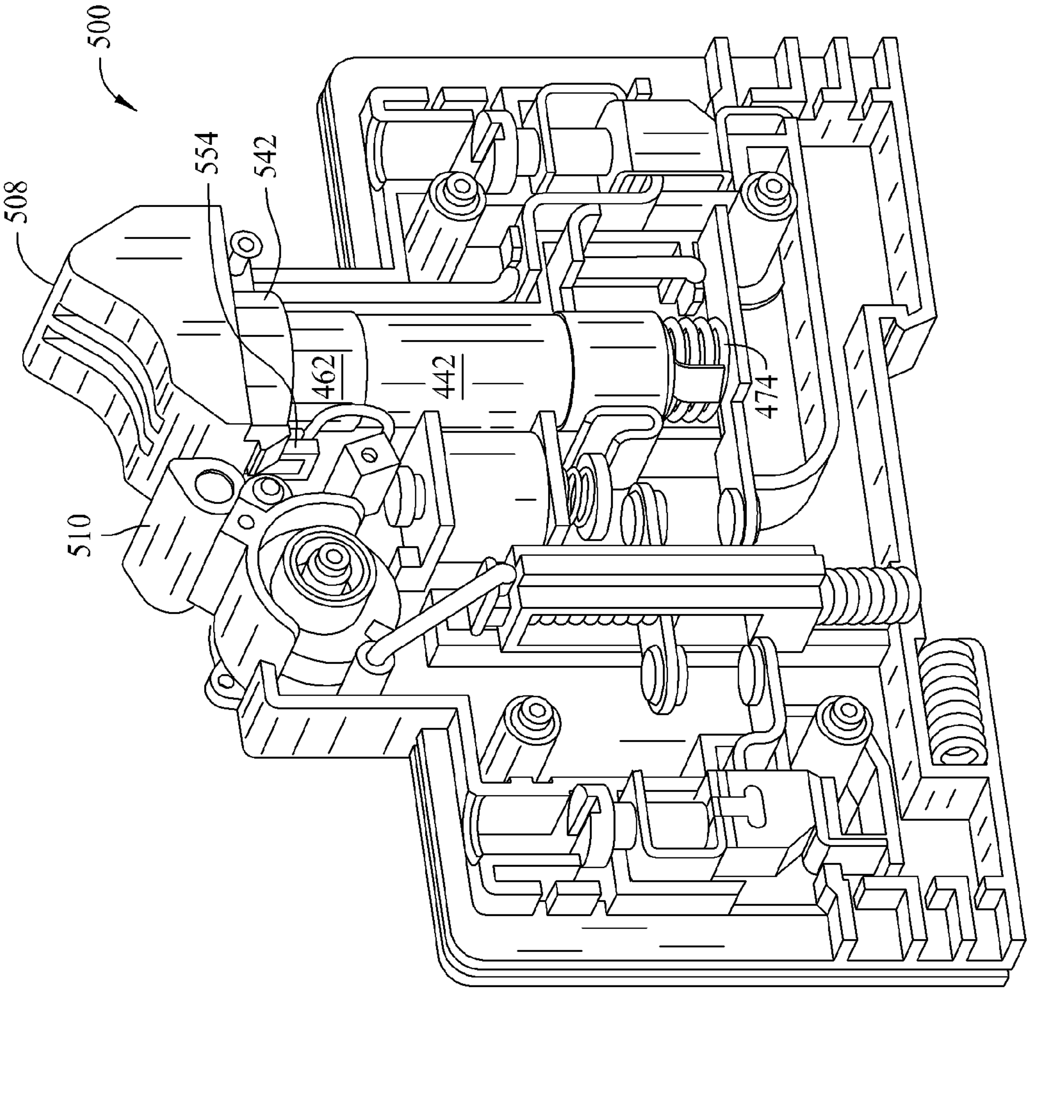
FIG. 21 is a perspective view of the fusible switching disconnect device shown in FIG. 20 in a closed position.
Figure 22:
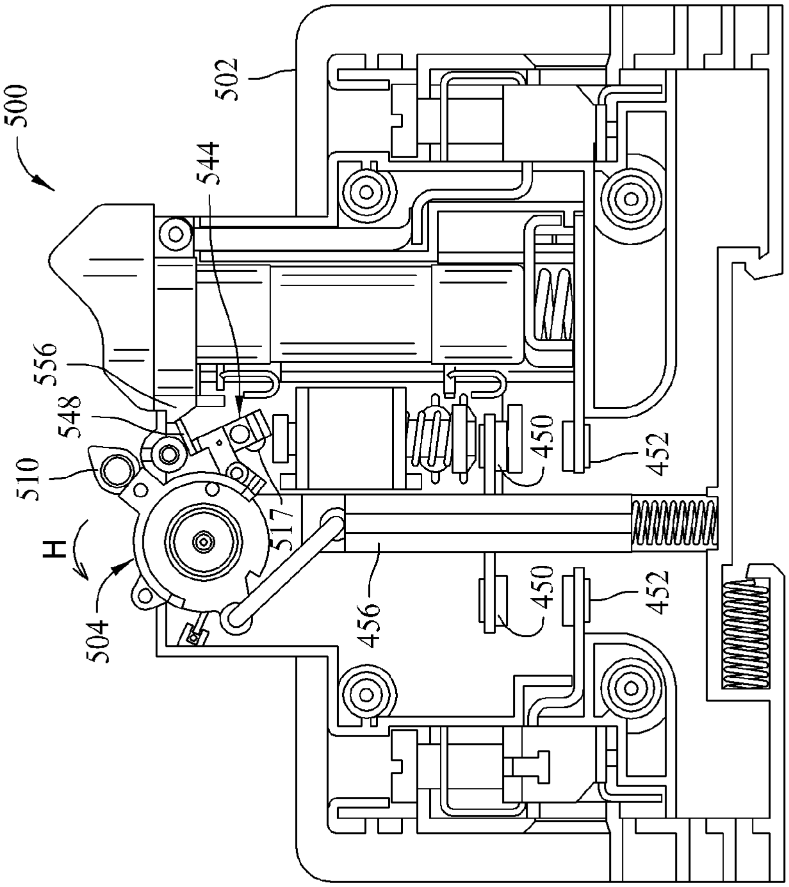
FIG. 22 is a side elevational view of the fusible switching device shown in FIG. 21.

As FIG. 20 also illustrates, the actuator interlock 556 of the cover 508 is substantially U-shaped in an exemplary embodiment. As seen in FIG. 21 the interlock 556 extends downwardly into the housing 502 when the cover 508 is in the closed position over the fuse 442, loading the bias element 474 in compression. FIG. 22 illustrates the cover interlock arm 548 of the trip bar 545 aligned with the actuator interlock 556 of the cover 508 when the cover 508 is in the closed position. In such a position, the actuator 504 may be rotated back in the direction of arrow H to move the sliding bar 456 downward in the direction of arrow I to engage the switchable contacts 450 to the stationary contacts 452 of the housing 502. As the actuator 504 is rotated in the direction of arrow H, the trip bar 545 is pivoted back to the position shown in FIG. 18, stably maintaining the actuator 504 in the closed position in an interlocked arrangement with the cover 508. The trip bar 545 may be spring loaded to further assist the tripping action of the module 500 and/or the return of the trip bar 545 to the stable position, or still further to bias the trip bar 545 to a predetermined position with respect to the tripping guide slot 517.

Figure 23:
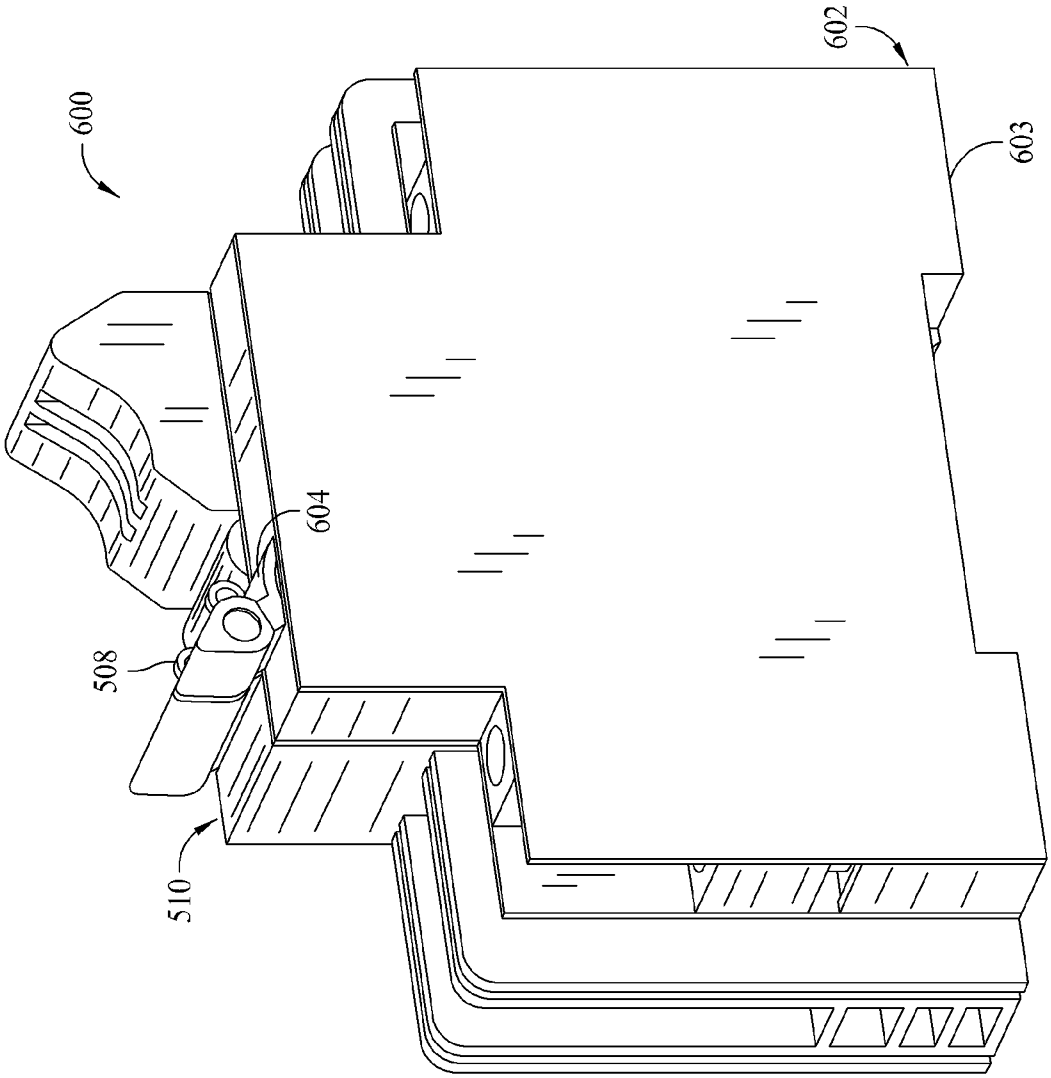
FIG. 23 is a perspective view of a tenth embodiment of a fusible switching disconnect device.
Figure 24:
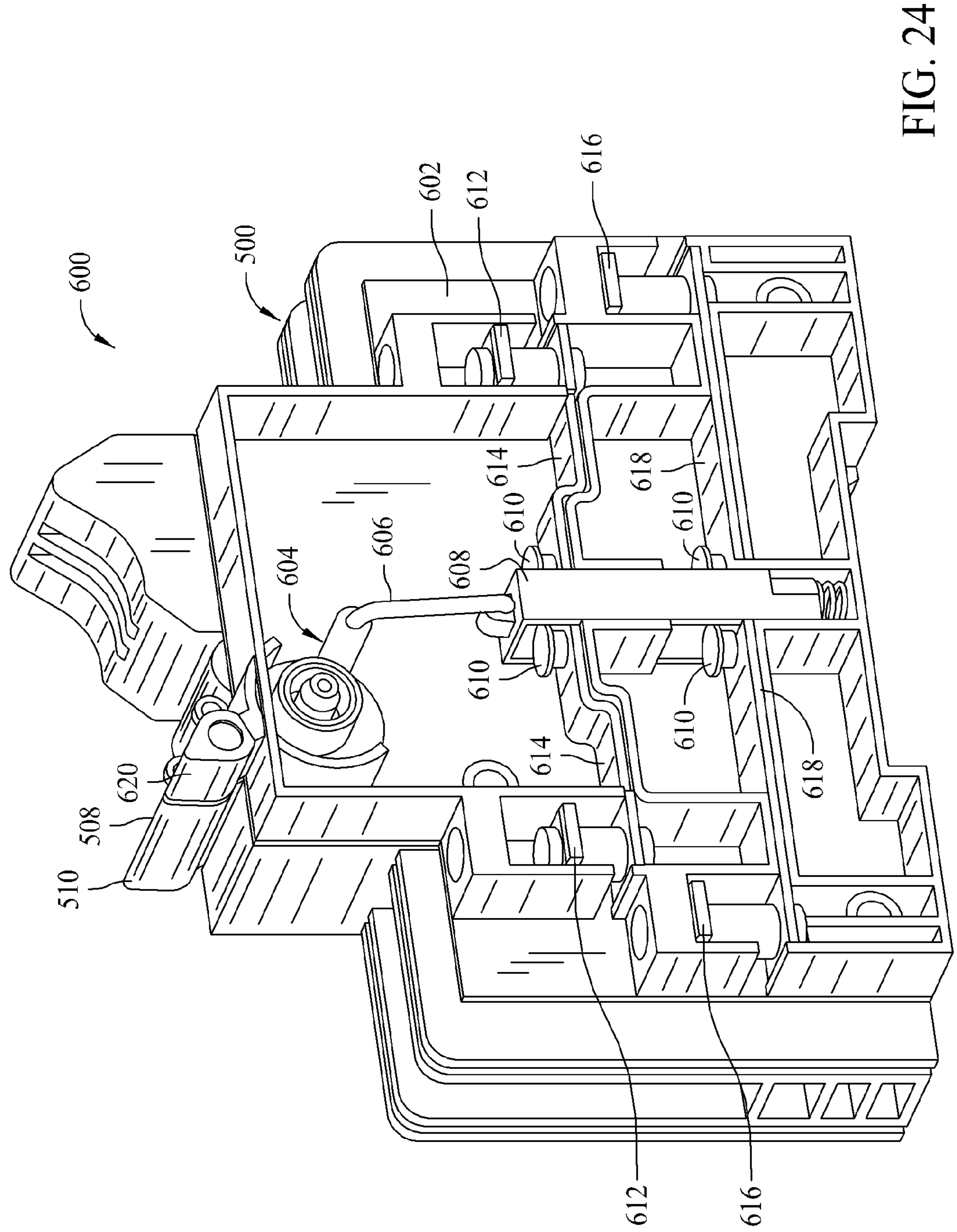
FIG. 24 is a perspective view of a portion of the fusible switching disconnect device shown in FIG. 23.

FIGS. 23 and 24 illustrate a tenth embodiment of a fusible switching disconnect device 600 including a disconnect module 500 and an auxiliary contact module 602 coupled or ganged to the housing 502 in a side-by-side relation to the module 500 via the openings 516 (FIG. 17) in the module 500.

The auxiliary contact module 602 may include a housing 603 generally complementary in shape to the housing 502 of the module 500, and may include an actuator 604 similar to the actuator 508 of the module 500. An actuator link 606 may interconnect the actuator 604 and a sliding bar 608. The sliding bar 608 may carry, for example, two pairs of switchable contacts 610 spaced from another. One of the pairs of switchable contacts 610 connects and disconnects a circuit path between a first set of auxiliary terminals 612 and rigid terminal members 614 extending from the respective terminals 612 and each carrying a respective stationary contact for engagement and disengagement with the first set of switchable contacts 610. The other pair of switchable contacts 610 connects and disconnects a circuit path between a second set of auxiliary terminals 616 and rigid terminal members 618 extending from the respective terminals 616 and each carrying a respective stationary contact for engagement and disengagement with the second set of switchable contacts 610.

By joining or tying the actuator lever 620 of the auxiliary contact module 602 to the actuator lever 510 of the disconnect module 500 with a pin or a shim, for example, the actuator 604 of the auxiliary contact module 602 may be moved or tripped simultaneously with the actuator 508 of the disconnect module 500. Thus, auxiliary connections may be connected and disconnected together with a primary connection established through the disconnect module 500. For example, when the primary connection established through the module 500 powers an electric motor, an auxiliary connection to a cooling fan may be made to the auxiliary contact module via one of the sets of terminals 612 and 616 so that the fan and motor will be powered on and off simultaneously by the device 600. As another example, one of the auxiliary connections through the terminals 612 and 616 of the auxiliary contact module 602 may be used for remote indication purposes to signal a remote device of the status of the device as being opened or closed to connect or disconnect circuits through the device 600.

While the auxiliary contact features have been described in the context of an add-on module 602, it is understood that the components of the module 602 could be integrated into the module 500 if desired. Single pole or multiple pole versions of such a device could likewise be provided.

Figure 25:
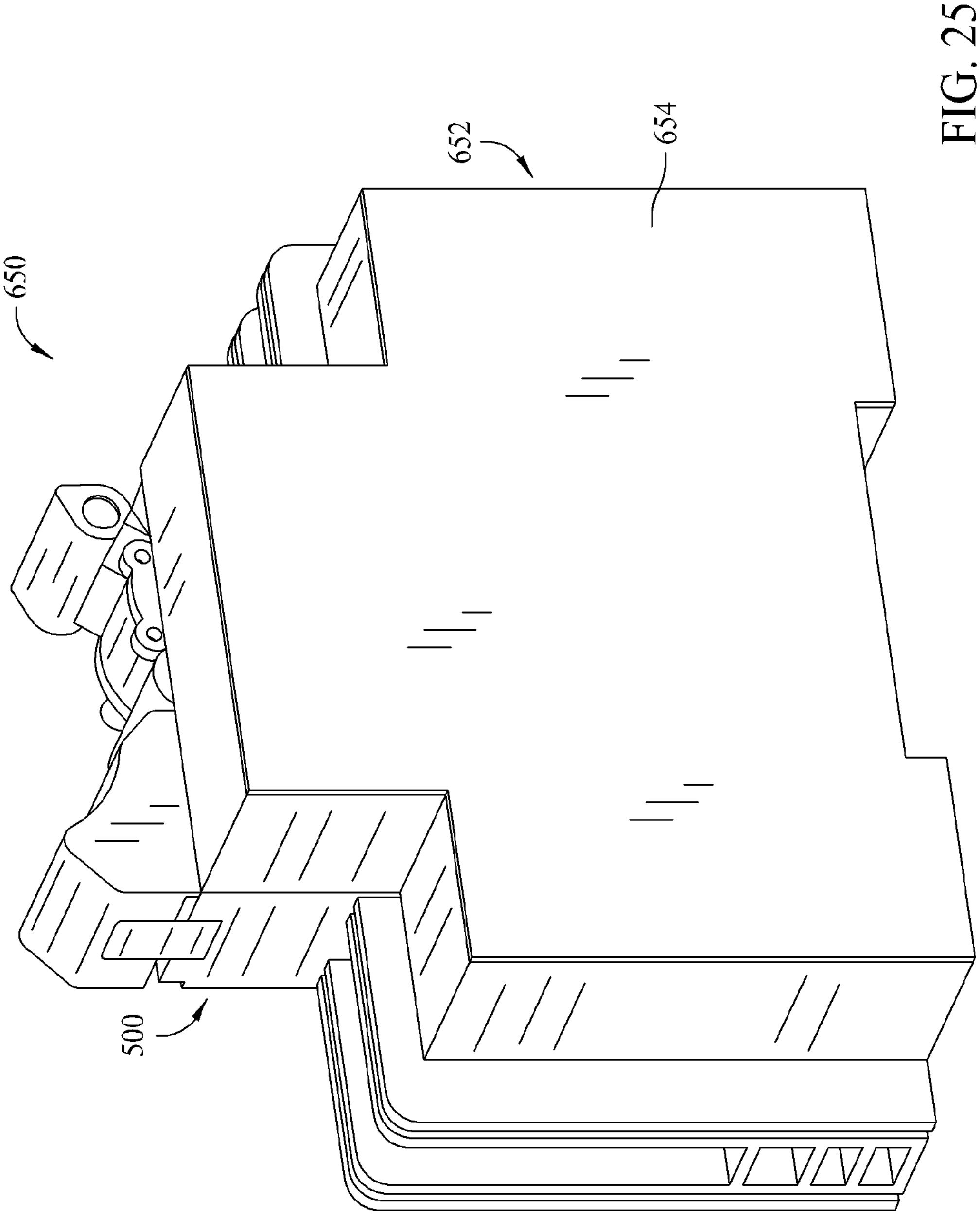
FIG. 25 is a perspective view of an eleventh embodiment of a fusible switching disconnect device.
Figure 26:
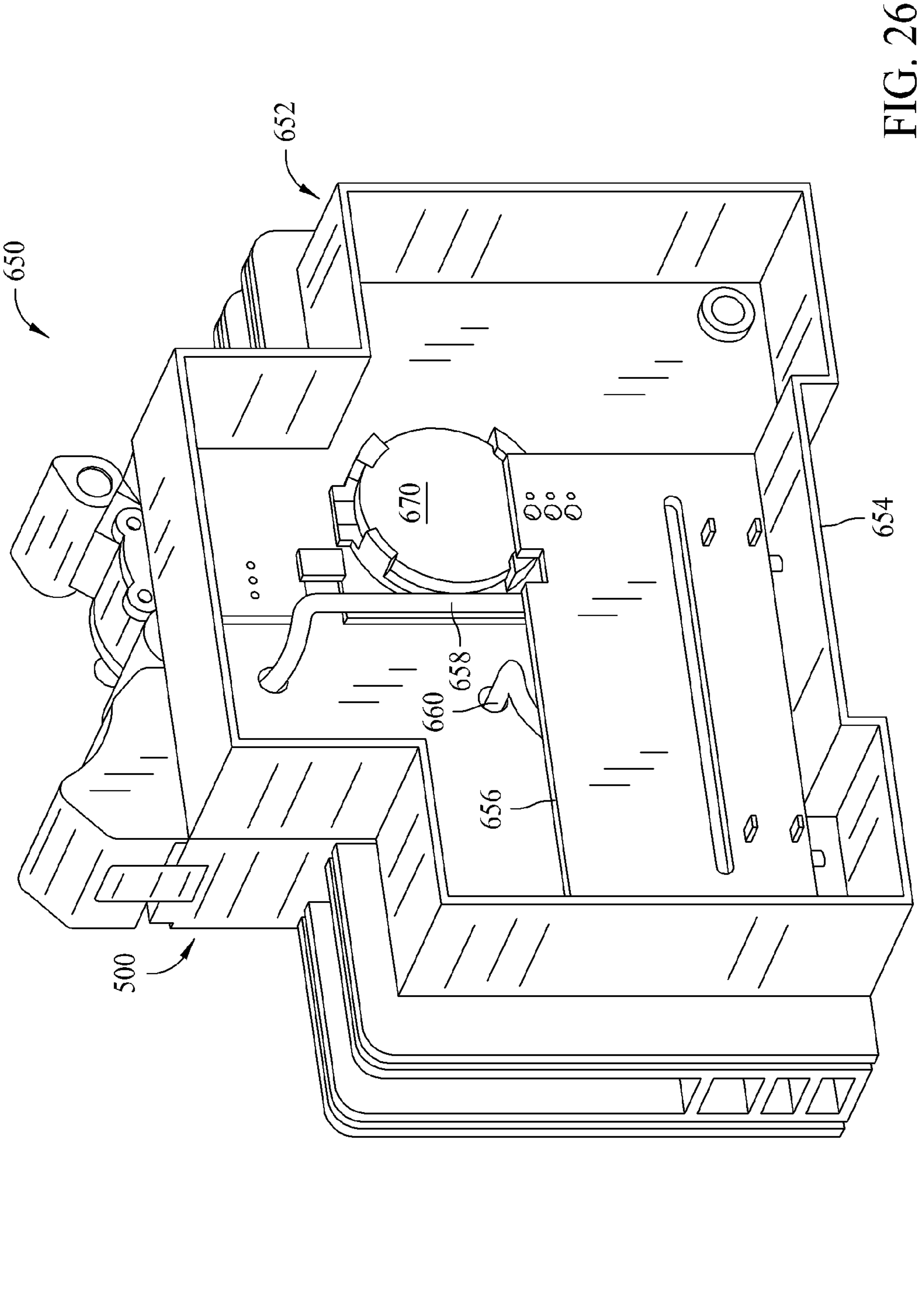
FIG. 26 is a perspective view of a portion of the fusible switching disconnect device shown in FIG. 25.
Figure 27:
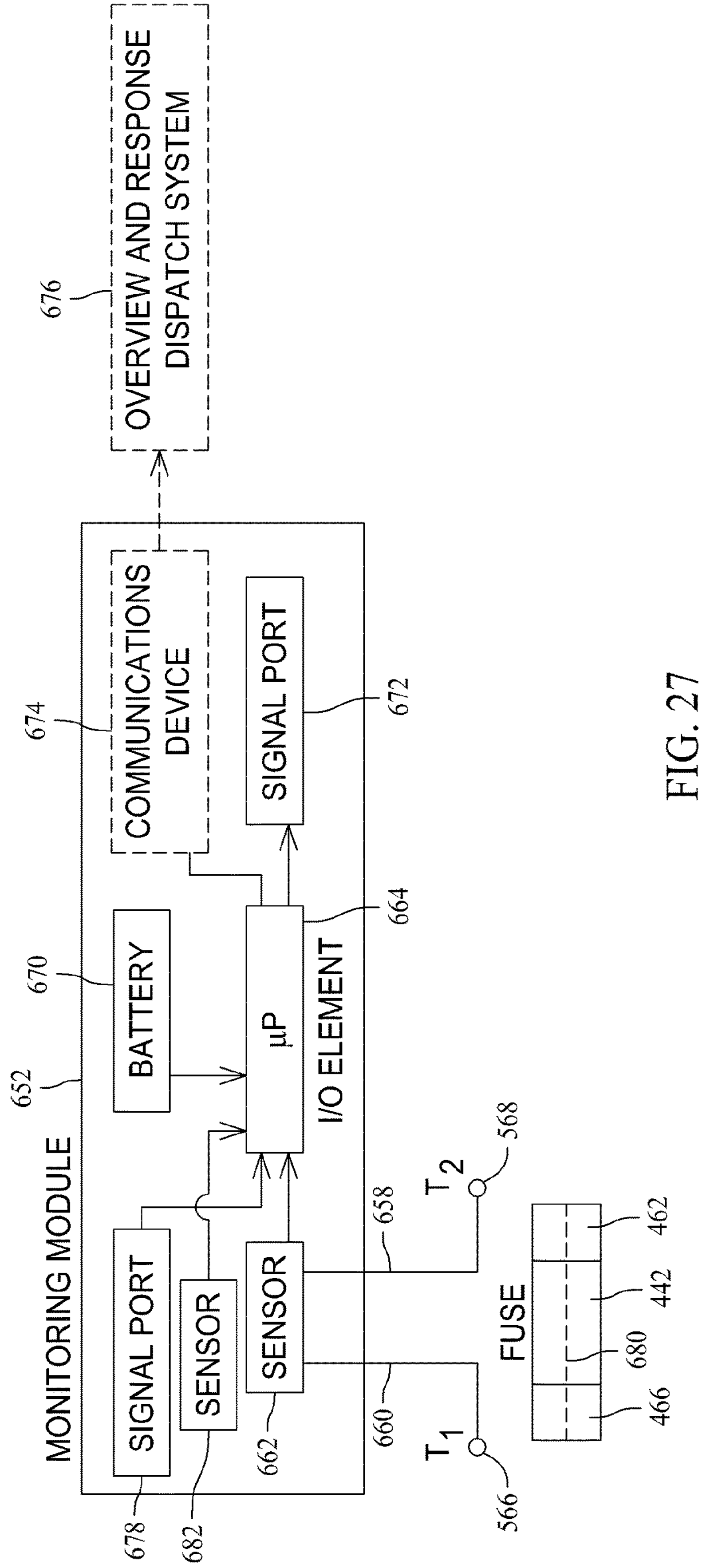
FIG. 27 is a schematic diagram of the fusible switching disconnect device shown in FIG. 26.

FIGS. 25-27 illustrate an eleventh embodiment of a fusible switching disconnect device 650 including a disconnect module 500 and a monitoring module 652 coupled or ganged to the housing 502 of the module 500 via the openings 516 (FIG. 17) in the module 500.

The monitoring module 652 may include a housing 654 generally complementary in shape to the housing 502 of the module 500. A sensor board 656 is located in the housing 652, and flexible contact members 658, 660 are respectively connected to each of the ferrules 462, 466 (FIG. 18) of the fuse 442 (FIG. 1) in the disconnect module 500 via, for example, the upper and lower solenoid contact members 557, 558 (FIG. 18) that establish a parallel circuit path across the fuse ferrules 462, 466. The sensor board 656 includes a sensor 662 that monitors operating conditions of the contact members 566, 568 and outputs a signal to an input/output element 664 powered by an onboard power supply such as a battery 670. When predetermined operating conditions are detected with the sensor 662, the input/output element 664 outputs a signal to a output signal port 672 or alternatively to a communications device 674 that wirelessly communicates with a remotely located overview and response dispatch system 676 that alerts, notifies, and summons maintenance personnel or responsible technicians to respond to tripping and opened fuse conditions to restore or re-energize associated circuitry with minimal downtime.

Optionally, an input signal port 678 may be included in the monitoring module 652. The input signal port 678 may be interconnected with an output signal port 672 of another monitoring module, such that signals from multiple monitoring modules may be daisy chained together to a single communications device 674 for transmission to the remote system 676. Interface plugs (not shown) may be used to interconnect one monitoring module to another in an electrical system.

In one embodiment, the sensor 662 is a voltage sensing latch circuit having first and second portions optically isolated from one another. When the primary fuse element 680 of the fuse 442 opens to interrupt the current path through the fuse, the sensor 662 detects the voltage drop across the terminal elements $T_1$ and $T_2$ (the solenoid contact members 557 and 558) associated with the fuse 442. The voltage drop causes one of the circuit portions, for example, to latch high and provide an input signal to the input/output element 664. Acceptable sensing technology for the sensor 662 is available from, for example, SymCom, Inc. of Rapid City, South Dakota.

While in the exemplary embodiment, the sensor 662 is a voltage sensor, it is understood that other types of sensing could be used in alternative embodiments to monitor and sense an operating state of the fuse 442, including but not limited to current sensors and temperature sensors that could be used to determine whether the primary fuse element 680 has been interrupted in an overcurrent condition to isolate or disconnect a portion of the associated electrical system.

In a further embodiment, one or more additional sensors or transducers 682 may be provided, internal or external to the monitoring module 652, to collect data of interest with respect to the electrical system and the load connected to the fuse 442. For example, sensors or transducers 682 may be adapted to monitor and sense vibration and displacement conditions, mechanical stress and strain conditions, acoustical emissions and noise conditions, thermal imagery and thermalography states, electrical resistance, pressure conditions, and humidity conditions in the vicinity of the fuse 442 and connected loads. The sensors or transducers 682 may be coupled to the input/output device 664 as signal inputs.

Video imaging and surveillance devices (not shown) may also be provided to supply video data and inputs to the input/output element 664.

In an exemplary embodiment, the input/output element 664 may be a microcontroller having a microprocessor or equivalent electronic package that receives the input signal from the sensor 662 when the fuse 442 has operated to interrupt the current path through the fuse 442. The input/output element 664, in response to the input signal from the sensor 662, generates a data packet in a predetermined message protocol and outputs the data packet to the signal port 672 or the communications device 674. The data packet may be formatted in any desirable protocol, but in an exemplary embodiment includes at least a fuse identification code, a fault code, and a location or address code in the data packet so that the operated fuse may be readily identified and its status confirmed, together with its location in the electrical system by the remote system 676. Of course, the data packet could contain other information and codes of interest, including but not limited to system test codes, data collection codes, security codes and the like that is desirable or advantageous in the communications protocol.

Additionally, signal inputs from the sensor or transducer 682 may be input the input/output element 664, and the input/output element 664 may generate a data packet in a predetermined message protocol and output the data packet to the signal port 672 or the communications device 674. The data packet may include, for example, codes relating to vibration and displacement conditions, mechanical stress and strain conditions, acoustical emissions and noise conditions, thermal imagery and thermalography states, electrical resistance, pressure conditions, and humidity conditions in the vicinity of the fuse 442 and connected loads. Video and imaging data, supplied by the imaging and surveillance devices 682 may also be provided in the data packet. Such data may be utilized for troubleshooting, diagnostic, and event history logging for detailed analysis to optimize the larger electrical system.

The transmitted data packet from the communications device 674, in addition to the data packet codes described above, also includes a unique transmitter identifier code so that the overview and response dispatch system 676 may identify the particular monitoring module 652 that is sending a data packet in a larger electrical system having a large number of monitoring modules 652 associated with a number of fuses. As such, the precise location of the affected disconnect module 500 in an electrical system may be identified by the overview and response dispatch system 676 and communicated to responding personnel, together with other information and instruction to quickly reset affected circuitry when one or more of the modules 500 operates to disconnect a portion of the electrical system.

In one embodiment, the communications device 674 is a low power radio frequency (RF) signal transmitter that digitally transmits the data packet in a wireless manner. Point-to-point wiring in the electrical system for fuse monitoring purposes is therefore avoided, although it is understood that point-to-point wiring could be utilized in some embodiments of the invention. Additionally, while a low power digital radio frequency transmitter has been specifically described, it is understood that other known communication schemes and equivalents could alternatively be used if desired.

Status indicators and the like such as light emitting diodes (LED's) may be provided in the monitoring module 652 to locally indicate an operated fuse 442 or a tripped disconnect condition. Thus, when maintenance personnel arrives at the location of the disconnect module 500 containing the fuse 442, the status indicators may provide local state identification of the fuses associated with the module 500.

Further details of such monitoring technology, communication with the remote system 676, and response and operation of the system 676 are disclosed in commonly owned U.S. patent application Ser. No. 11/223,385 filed Sep. 9, 2005 and entitled Circuit Protector Monitoring Assembly, Kit and Method.

While the monitoring features have been described in the context of an add-on module 652, it is understood that the components of the module 652 could be integrated into the module 500 if desired. Single pole or multiple pole versions of such a device could likewise be provided. Additionally, the monitoring module 652 and the auxiliary contact module could each be used with a single disconnect module 500 if desired, or alternatively could be combined in an integrated device with single pole or multiple pole capability.

Figure 28:
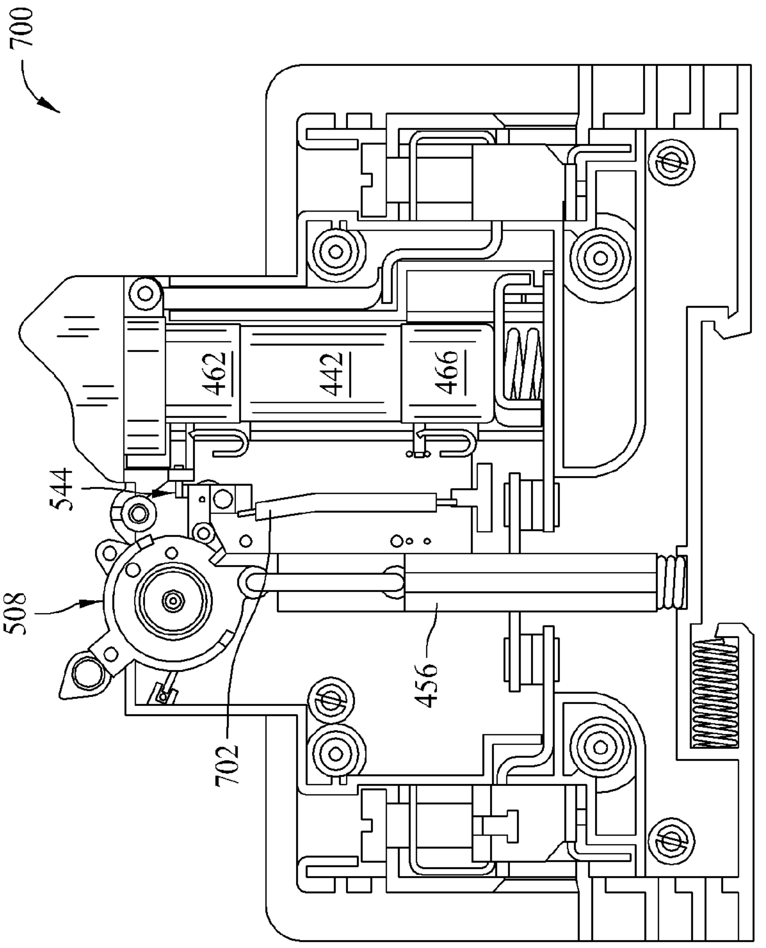
FIG. 28 is a side elevational view of a portion of a twelfth embodiment of a fusible switching disconnect device.

FIG. 28 is a side elevational view of a portion of a twelfth embodiment of a fusible switching disconnect module 700 that is constructed similarly to the disconnect module 500 described above but includes a bimetallic overload element 702 in lieu of the solenoid described previously. The overload element 702 is fabricated from strips of two different types of metallic or conductive materials having different coefficients of thermal expansion joined to one another, and a resistance alloy joined to the metallic elements. The resistance alloy may be electrically isolated from the metallic strips with insulative material, such as a double cotton coating in an exemplary embodiment.

In use, the resistance alloy strip is joined to the contact members 557 and 558 and defines a high resistance parallel connection across the ferrules 462 and 466 of the fuse 442. The resistance alloy is heated by current flowing through the resistance alloy and the resistance alloy, in turn heats the bimetal strip. When a predetermined current condition is approached, the differing rates of coefficients of thermal expansion in the bimetal strip cause the overload element 702 to bend and displace the trip bar 545 to the point of release where the spring loaded actuator 504 and sliding bar 456 move to the opened positions to disconnect the circuit through the fuse 442.

The module 700 may be used in combination with other modules 500 or 700, auxiliary contact modules 602, and monitoring modules 652. Single pole and multiple pole versions of the module 700 may also be provided.

Figure 29:
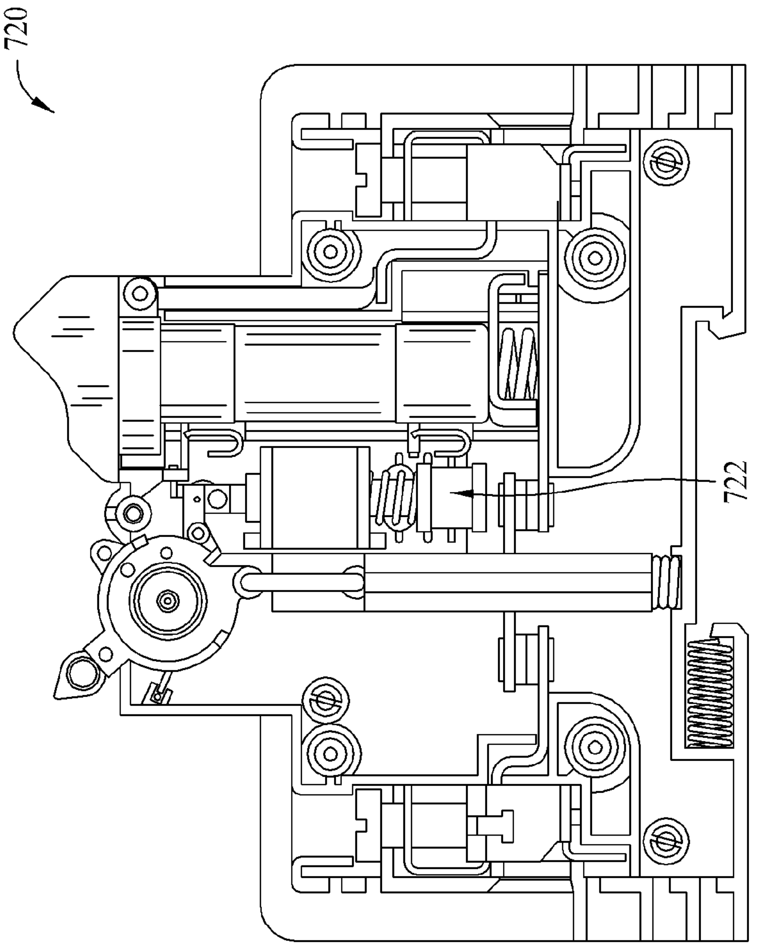
FIG. 29 is a side elevational view of a portion of a thirteenth embodiment of a fusible switching disconnect device.

FIG. 29 is a side elevational view of a portion of a thirteenth embodiment of a fusible switching disconnect module 720 that is constructed similarly to the disconnect module 500 described above but includes an electronic overload element 722 that monitors current flow through the fuse by virtue of the contact members 557 and 558. When the current reaches a predetermined level, the electronic overload element 722 energizes a circuit to power the solenoid and trip the module 720 as described above. The electronic overload element 722 may likewise be used to reset the module after a tripping event.

The module 702 may be used in combination with other modules 500 or 700, auxiliary contact modules 602, and monitoring modules 652. Single pole and multiple pole versions of the module 700 may also be provided.

Embodiments of fusible disconnect devices are therefore described herein that may be conveniently switched on and off in a convenient and safe manner without interfering with workspace around the device. The disconnect devices may be reliably switch a circuit on and off in a cost effective manner and may be used with standardized equipment in, for example, industrial control applications. Further, the disconnect modules and devices may be provided with various mounting and connection options for versatility in the field. Auxiliary contact and overload and underload tripping capability is provided, together with remote monitoring and control capability.

Figure 30:
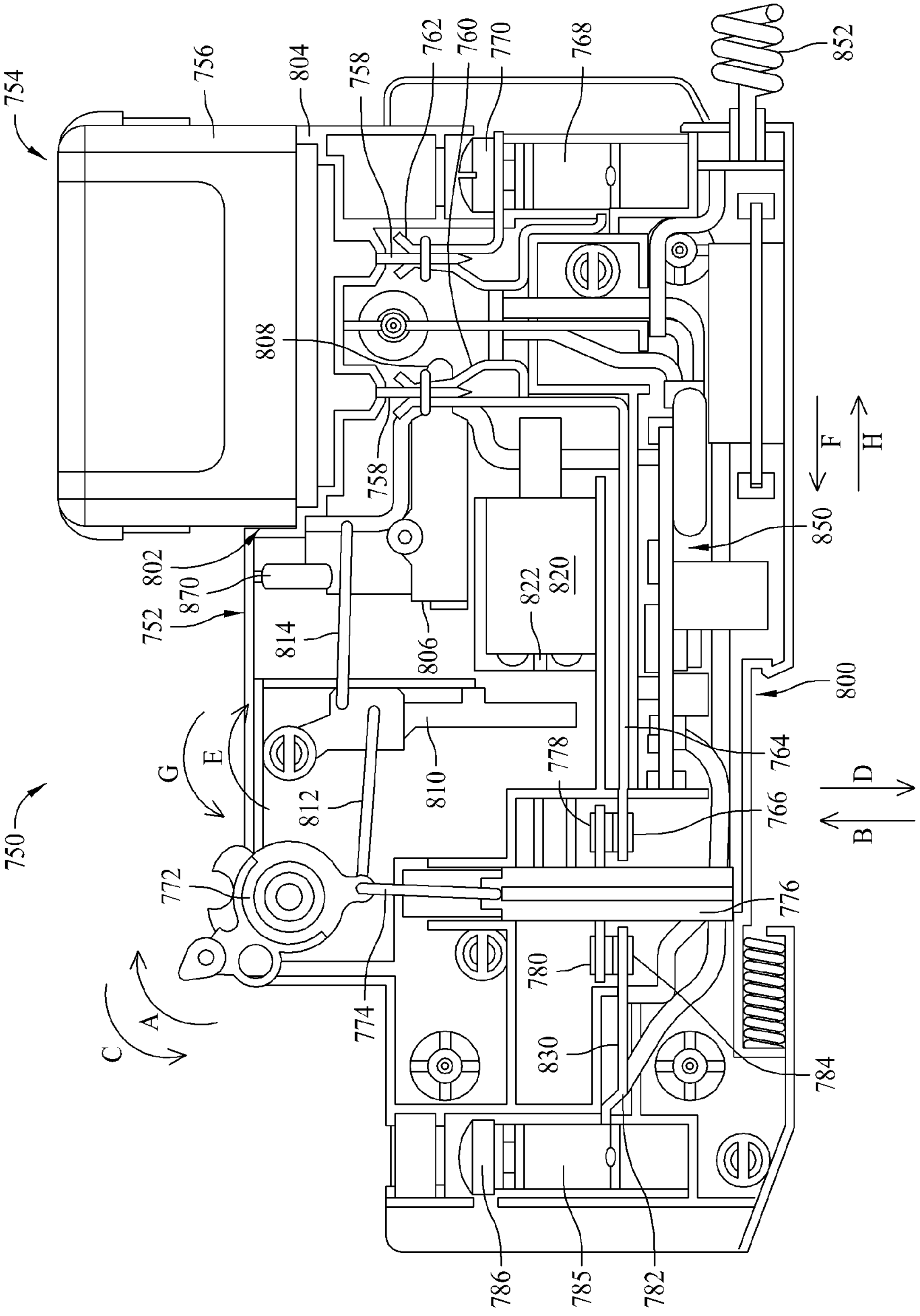
FIG. 30 is a side elevational view of a portion of a fourteenth embodiment of a fusible switching disconnect device.

FIG. 30 is a side elevational view of a portion of a fourteenth embodiment of a fusible switching disconnect device 750 providing numerous additional benefits and advantages apart from those discussed above. Method aspects implementing advantageous features will be in part apparent and in part explicitly discussed in the description below.

The device 750 includes a disconnect housing 752 fabricated from an electrically nonconductive or insulative material such as plastic, and the fuse module housing 752 is configured or adapted to receive a retractable rectangular fuse module 754. While a rectangular fuse module 754 is shown in the exemplary embodiment illustrated, it is recognized that the disconnect housing 754 may alternatively be configured to receive and engage another type of fuse, such as cylindrical or cartridge fuses familiar to those in the art and as described above. The disconnect housing 752 and its internal components described below, are sometimes referred to as a base assembly that receives the retractable fuse module 754.

The fuse module 754 in the exemplary embodiment shown includes a rectangular housing 756 fabricated from an electrically nonconductive or insulative material such as plastic, and conductive terminal elements in the form of terminal blades 758 extending from the housing 756. A primary fuse element or fuse assembly is located within the housing 756 and is electrically connected between the terminal blades 758 to provide a current path therebetween. Such fuse modules 754 are known and in one embodiment the rectangular fuse module is a CUBEFuse™ power fuse module commercially available from Eaton's Bussmann Business of St. Louis, Missouri. The fuse module 754 provides overcurrent protection via the primary fuse element therein that is configured to melt, disintegrate or otherwise fail and permanently open the current path through the fuse element between the terminal blades 758 in response to predetermined current conditions flowing through the fuse element in use. When the fuse element opens in such a manner, the fuse module 754 must be removed and replaced to restore affected circuitry.

A variety of different types of fuse elements, or fuse element assemblies, are known and may be utilized in the fuse module 754 with considerable performance variations in use. Also, the fuse module 754 may include fuse state indication features, a variety of which are known in the art, to identify the permanent opening of the primary fuse element such that the fuse module 754 can be quickly identified for replacement via a visual change in appearance when viewed from the exterior of the fuse module housing 756. Such fuse state indication features may involve secondary fuse links or elements electrically connected in parallel with the primary fuse element in the fuse module 754.

A conductive line side fuse clip 760 may be situated within the disconnect housing 752 and may receive one of the terminal blades 758 of the fuse module 754. A conductive load side fuse clip 762 may also be situated within the disconnect housing 752 and may receive the other of the fuse terminal blades 758. The line side fuse clip 760 may be electrically connected to a first line side terminal 764 provided in the disconnect housing 752, and the first line side terminal 764 may include a stationary switch contact 766. The load side fuse clip 762 may be electrically connected to a load side connection terminal 768. In the example shown, the load side connection terminal 768 is a box lug terminal operable with a screw 770 to clamp or release an end of a connecting wire to establish electrical connection with load side electrical circuitry. Other types of load side connection terminals are known, however, and may be provided in alternative embodiments.

A rotary switch actuator 772 is further provided in the disconnect housing 752, and is mechanically coupled to an actuator link 774 that, in turn, is coupled to a sliding actuator bar 776. The actuator bar 776 carries a pair of switch contacts 778 and 780. In an exemplary embodiment, the switch actuator 772, the link 774 and the actuator bar 778 may be fabricated from nonconductive materials such as plastic. A second conductive line side terminal 782 including a stationary contact 784 is also provided, and a line side connecting terminal 785 is also provided in the disconnect housing 752. In the example shown, the line side connection terminal 785 is a box lug terminal operable with a screw 786 to clamp or release an end of a connecting wire to establish electrical connection with line side electrical circuitry. Other types of line side connection terminals are known, however, and may be provided in alternative embodiments. While in the illustrated embodiment the line side connecting terminal 785 and the load side connecting terminal 768 are of the same type (i.e., both are box lug terminals), it is contemplated that different types of connection terminals could be provided on the line and load sides of the disconnect housing 752 if desired.

Electrical connection of the device 750 to power supply circuitry, sometimes referred to as the line side, may be accomplished in a known manner using the line side connecting terminal 785. Likewise, electrical connection to load side circuitry may be accomplished in a known manner using the load side connecting terminal 768. As mentioned previously, a variety of connecting techniques are known (e.g., spring clamp terminals and the like) and may alternatively be utilized to provide a number of different options to make the electrical connections in the field. The configuration of the connecting terminals 785 and 768 accordingly are exemplary only.

In the position shown in FIG. 30, the disconnect device 750 is shown in the closed position with the switch contacts 780 and 778 mechanically and electrically engaged to the stationary contacts 784 and 766, respectively. As such, and as further shown in FIG. 33 when the device 750 is connected to line side circuitry 790 with a first connecting wire 792 via the line side connecting terminal 785, and also when the load side terminal 768 is connected to load side circuitry 794 with a connecting wire 796, a circuit path is completed through conductive elements in the disconnect housing 752 and the fuse module 754 when the fuse module 754 is installed and when the primary fuse element therein is a non-opened, current carrying state.

Figure 33:
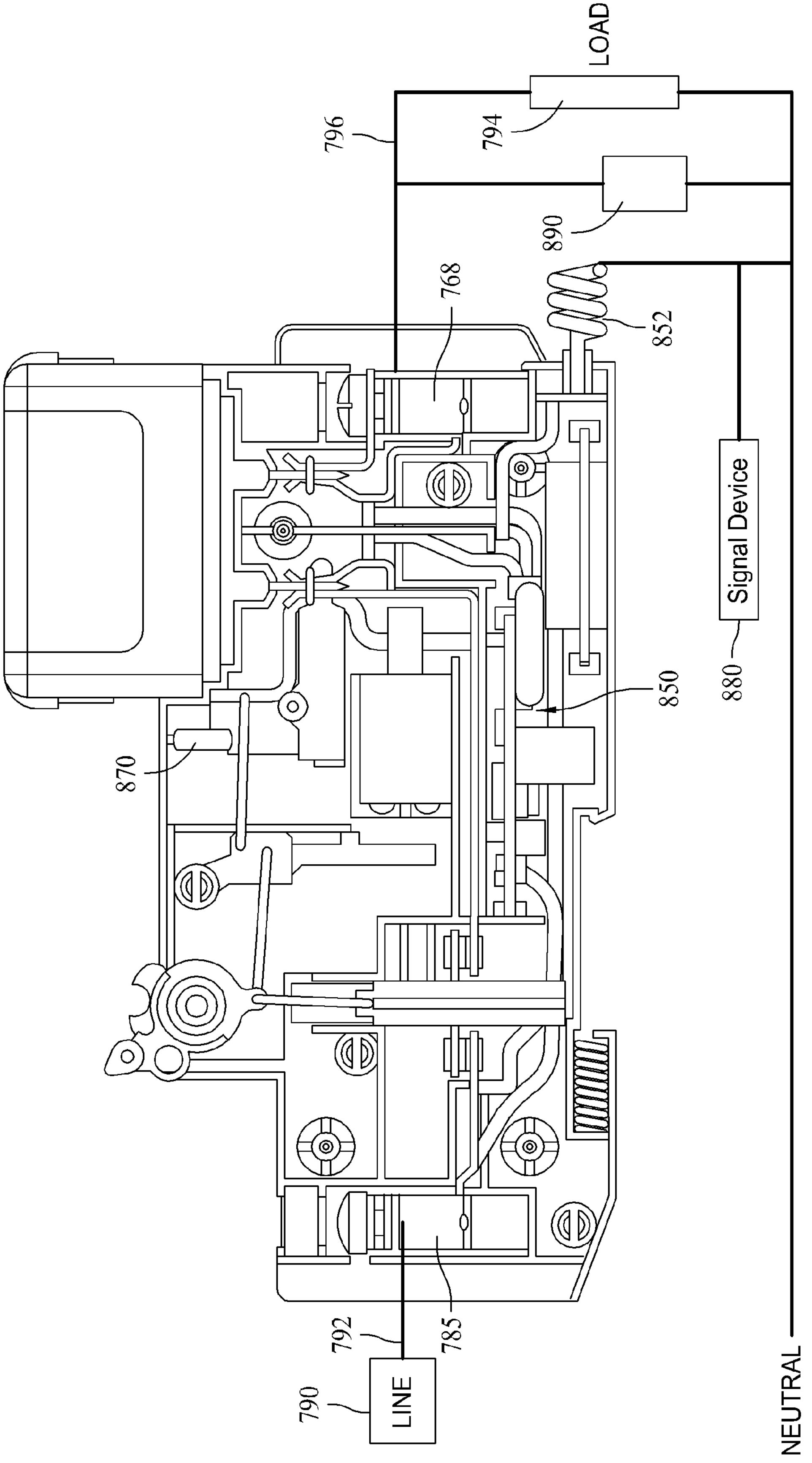
FIG. 33 illustrates a schematic of the device shown in FIG. 30 connected to electrical circuitry.

Specifically, and referring again to FIGS. 30 and 33, electrical current flow through the device 750 is as follows when the switch contacts 778 and 780 are closed, when the device 750 is connected to line and load side circuitry as shown in FIG. 33, and when the fuse module 754 is installed. Electrical current flows from the line side circuitry 790 through the line side connecting wire 792, and from the wire 792 to and through the line side connecting terminal 785. From the line side connecting terminal 785 current then flows to and through the second line terminal 782 and to the stationary contact 784. From the stationary contact 784 current flows to and through the switch contact 780, and from the switch contact 780 current flows to and through the switch contact 778. From the switch contact 778 current flows to and through the stationary contact 766, and from the stationary contact 766 current flows to and through the first line side terminal 764. From the first line side terminal 764 current flows to and through the line side fuse clip 762, and from the line side fuse clip 762 current flows to and through the first mating fuse terminal blade 758. From the first terminal blade 758 current flows to and through the primary fuse element in the fuse module 754, and from the primary fuse element to and through the second fuse terminal blade 758. From the second terminal blade 758 current flows to and through the load side fuse clip 762, and from the load side fuse clip 762 to and through the load side connecting terminal 768. Finally, from the connecting terminal 768 current flows to the load side circuitry 794 via the wire 796 (FIG. 33). As such, a circuit path or current path is established through the device 750 that includes the fuse element of the fuse module 754.

Disconnect switching to temporarily open the current path in the device 750 may be accomplished in multiple ways. First, and as shown in FIG. 30, a portion of the switch actuator 772 projects through an upper surface of the disconnect housing 752 and is therefore accessible to be grasped for manual manipulation by a person. Specifically, the switch actuator 772 may be rotated from a closed position as shown in FIG. 30 to an open position in the direction of arrow A, causing the actuator link 774 to move the sliding bar 776 linearly in the direction of arrow B and moving the switch contacts 780 and 778 away from the stationary contacts 784 and 766. Eventually, the switch contacts 780 and 778 become mechanically and electrically disengaged from the stationary contacts 784 and 766 and the circuit path between the first and second line terminals 764 and 782, which includes the primary fusible element of the fuse module 754, may be opened via the separation of the switch contacts 780 and 778 when the fuse terminal blades 758 are received in the line and load side fuse clips 760 and 762.

When the circuit path in the device 750 is opened in such a manner via rotational displacement of the switch actuator 772, the fuse module 754 becomes electrically disconnected from the first line side terminal 764 and the associated line side connecting terminal 785. In other words, an open circuit is established between the line side connecting terminal 785 and the first terminal blade 758 of the fuse module 754 that is received in the line side fuse clip 760. The operation of switch actuator 772 and the displacement of the sliding bar 776 to separate the contacts 780 and 778 from the stationary contacts 784 and 766 may be assisted with bias elements such as the springs described in embodiments above with similar benefits. Particularly, the sliding bar 776 may be biased toward the open position wherein the switch contacts 780 and 778 are separated from the contacts 784 and 786 by a predetermined distance. The dual switch contacts 784 and 766 mitigate electrical arcing concerns as the switch contacts 784 and 766 are engaged and disengaged.

Once the switch actuator 772 of the disconnect device 750 is switched open to interrupt the current path in the device 750 and disconnect the fuse module 754, the current path in the device 750 may be closed to once again complete the circuit path through the fuse module 754 by rotating the switch actuator 772 in the opposite direction indicated by arrow C in FIG. 30. As the switch actuator 772 rotates in the direction of arrow C, the actuator link 774 causes the sliding bar 776 to move linearly in the direction of arrow D and bring the switch contacts 780 and 778 toward the stationary contacts 784 and 766 to close the circuit path through the first and second line terminals 764 and 782. As such, by moving the actuator 772 to a desired position, the fuse module 754 and associated load side circuitry 794 (FIG. 33) may be connected and disconnected from the line side circuitry 790 (FIG. 33) while the line side circuitry 790 remains "live" in an energized, full power condition. Alternatively stated, by rotating the switch actuator 772 to separate or join the switch contacts, the load side circuitry 794 may be electrically isolated from the line side circuitry 790 (FIG. 33), or electrically connected to the line side circuitry 794 on demand.

Additionally, the fuse module 754 may be simply plugged into the fuse clips 760, 762 or extracted therefrom to install or remove the fuse module 754 from the disconnect housing 752. The fuse housing 756 projects from the disconnect housing 752 and is open and accessible from an exterior of the disconnect housing 752 so that a person simply can grasp the fuse housing 756 by hand and pull or lift the fuse module 754 in the direction of arrow B to disengage the fuse terminal blades 758 from the line and load side fuse clips 760 and 762 until the fuse module 754 is completely released from the disconnect housing 752. An open circuit is established between the line and load side fuse clips 760 and 762 when the terminal blades 758 of the fuse module 754 are removed as the fuse module 754 is released, and the circuit path between the fuse clips 760 and 762 is completed when the fuse terminal blades 758 are engaged in the fuse clips 760 and 762 when the fuse module 754 is installed. Thus, via insertion and removal of the fuse module 754, the circuit path through the device 750 can be opened or closed apart from the position of the switch contacts as described above.

Of course, the primary fuse element in the fuse module 754 provides still another mode of opening the current path through the device 750 when the fuse module is installed in response to actual current conditions flowing through the fuse element. As noted above, however, if the primary fuse element in the fuse module 754 opens, it does so permanently and the only way to restore the complete current path through the device 750 is to replace the fuse module 754 with another one having a non-opened fuse element. As such, and for discussion purposes, the opening of the fuse element in the fuse module 754 is permanent in the sense that the fuse module 750 cannot be reset to once again complete the current path through the device. Mere removal of the fuse module 754, and also displacement of the switch actuator 772 as described, are in contrast considered to be temporary events and are resettable to easily complete the current path and restore full operation of the affected circuitry by once again installing the fuse module 754 and/or closing the switch contacts.

The fuse module 754, or a replacement fuse module, can be conveniently and safely grasped by hand via the fuse module housing 756 and moved toward the switch housing 752 to engage the fuse terminal blades 758 to the line and load side fuse clips 760 and 762. The fuse terminal blades 758 are extendable through openings in the disconnect housing 752 to connect the fuse terminal blades 758 to the fuse clips 760 and 762. To remove the fuse module 754, the fuse module housing 756 can be grasped by hand and pulled from the disconnect housing 752 until the fuse module 754 is completely released. As such, the fuse module 754 having the terminal blades 758 may be rather simply and easily plugged into the disconnect housing 752 and the fuse clips 760, 762, or unplugged as desired.

Such plug-in connection and removal of the fuse module 754 advantageously facilitates quick and convenient installation and removal of the fuse module 754 without requiring separately supplied fuse carrier elements and without requiring tools or fasteners common to other known fusible disconnect devices. Also, the fuse terminal blades 758 extend through and outwardly project from a common side of the fuse module body 756, and in the example shown the terminal blades 758 each extend outwardly from a lower side of the fuse housing 756 that faces the disconnect housing 752 as the fuse module 754 is mated to the disconnect housing 752.

In the exemplary embodiment shown, the fuse terminal blades 758 extending from the fuse module body 756 are generally aligned with one another and extend in respective spaced-apart parallel planes. It is recognized, however, that the terminal blades 758 in various other embodiments may be staggered or offset from one another, need not extend in parallel planes, and can be differently dimensioned or shaped. The shape, dimension, and relative orientation of the terminal blades 758, and the receiving fuse clips 760 and 762 in the disconnect housing 752 may serve as fuse rejection features that only allow compatible fuses to be used with the disconnect housing 752. In any event, because the terminal blades 758 project away from the lower side of the fuse housing 756, a person's hand when handling the fuse module housing 756 for plug in installation (or removal) is physically isolated from the terminal blades 758 and the conductive line and load side fuse clips 760 and 762 that receive the terminal blades 758 as mechanical and electrical connections therebetween are made and broken. The fuse module 754 is therefore touch safe (i.e., may be safely handled by hand to install and remove the fuse module 754 without risk of electrical shock).

The disconnect device 750 is rather compact and occupies a reduced amount of space in an electrical power distribution system including the line side circuitry 790 and the load side circuitry 794 than other known fusible disconnect devices and arrangements providing similar effect. In the embodiment illustrated in FIG. 30 the disconnect housing 752 is provided with a DIN rail slot 800 that may be used to securely mount the disconnect housing 752 in place with snap-on installation to a DIN rail by hand and without tools. The DIN rail may be located in a cabinet or supported by other structure, and because of the smaller size of the device 750, a greater number of devices 750 may be mounted to the DIN rail in comparison to conventional fusible disconnect devices.

In another embodiment, the device 750 may be configured for panel mounting by replacing the line side terminal 785, for example, with a panel mounting clip. When so provided, the device 750 can easily occupy less space in a fusible panelboard assembly, for example, than conventional in-line fuse and circuit breaker combinations. In particular, CUBE-Fuse™ power fuse modules occupy a smaller area, sometimes referred to as a footprint, in the panel assembly than non-rectangular fuses having comparable ratings and interruption capabilities. Reductions in the size of panelboards are therefore possible, with increased interruption capabilities.

In ordinary use, the circuit path or current path through the device 750 is preferably connected and disconnected at the switch contacts 784, 780, 778, 766 rather than at the fuse clips 760 and 762. By doing so, electrical arcing that may occur when connecting/disconnecting the circuit path may be contained at a location away from the fuse clips 760 and 762 to provide additional safety for persons installing, removing, or replacing fuses. By opening the switch contacts with the switch actuator 772 before installing or removing the fuse module 754, any risk posed by electrical arcing or energized conductors at the fuse and disconnect housing interface is eliminated. The disconnect device 750 is accordingly believed to be safer to use than many known fused disconnect switches.

The disconnect switching device 750 includes still further features, however, that improve the safety of the device 750 in the event that a person attempts to remove the fuse module 754 without first operating the actuator 772 to disconnect the circuit through the fuse module 754, and also to ensure that the fuse module 754 is compatible with the remainder of the device 750. That is, features are provided to ensure that the rating of the fuse module 754 is compatible with the rating of the conductive components in the disconnect housing 752.

As shown in FIG. 30, the disconnect housing 752 in one example includes an open ended receptacle or cavity 802 on an upper edge thereof that accepts a portion of the fuse housing 756 when the fuse module 754 is installed with the fuse terminal blades 758 engaged to the fuse clips 760, 762. The receptacle 802 is shallow in the embodiment depicted, such that a relatively small portion of the fuse housing 756 is received when the terminal blades 758 are plugged into the disconnect housing 752. A remainder of the fuse housing 756, however, generally projects outwardly from the disconnect housing 752 allowing the fuse module housing 756 to be easily accessed and grasped with a user's hand and facilitating a finger safe handling of the fuse module 754 for installation and removal without requiring tools. It is understood, however, that in other embodiments the fuse housing 756 need not project as greatly from the switch housing receptacle when installed as in the embodiment depicted, and indeed could even be substantially entirely contained within the switch housing 752 if desired.

In the exemplary embodiment shown in FIG. 30, the fuse housing 756 includes a recessed guide rim 804 having a slightly smaller outer perimeter than a remainder of the fuse housing 756, and the guide rim 804 is seated in the switch housing receptacle 802 when the fuse module 754 is installed. It is understood, however, that the guide rim 804 may be considered entirely optional in another embodiment and need not be provided. The guide rim 804 may in whole or in part serve as a fuse rejection feature that would prevent someone from installing a fuse module 754 having a rating that is incompatible with the conductive components in the disconnect housing 752. Fuse rejection features could further be provided by modifying the terminal blades 758 in shape, orientation, or relative position to ensure that a fuse module having an incompatible rating cannot be installed.

In contemplated embodiments, the base of the device 750 (i.e., the disconnect housing 752 and the conductive components therein) has a rating that is ½ of the rating of the fuse module 754. Thus, for example, a base having a current rating of 20 A may preferably be used with a fuse module 754 having a rating of 40 A. Ideally, however, fuse rejection features such as those described above would prevent a fuse module of a higher rating, such as 60 A, from being installed in the base. The fuse rejection features in the disconnect housing 752 and/or the fuse module 754 can be strategically coordinated to allow a fuse of a lower rating (e.g., a fuse module having a current rating of 20 A) to be installed, but to reject fuses having higher current ratings (e.g., 60 A and above in the example being discussed). It can therefore be practically ensured that problematic combinations of fuse modules and bases will not occur. While exemplary ratings are discussed above, they are provided for the sake of illustration rather than limitation. A variety of fuse ratings and base ratings are possible, and the base rating and the fuse module rating may vary in different embodiments and in some embodiments the base rating and the fuse module rating may be the same.

As a further enhancement, the disconnect housing 752 includes an interlock element 806 that frustrates any effort to remove the fuse module 754 while the circuit path through the first and second line terminals 782 and 764 via the switch contacts 784, 780, 778, 766 is closed. The exemplary interlock element 806 shown includes an interlock shaft 808 at a leading edge thereof, and in the locked position shown in FIG. 30 the interlock shaft 808 extends through a hole in the first fuse terminal blade 758 that is received in the line side fuse clip 760. Thus, as long as the projecting interlock shaft 808 is extended through the opening in the terminal blade 758, the fuse module 754 cannot be pulled from the fuse clip 762 if a person attempts to pull or lift the fuse module housing 756 in the direction of arrow B. As a result, and because of the interlock element 806, the fuse terminal blades 758 cannot be removed from the fuse clips 760 and 762 while the switch contacts are closed 778, 780 are closed and potential electrical arcing at the interface of the fuse clips 760 and 762 and the fuse terminal blades 758 is avoided. Such an interlock element 806 is believed to be beneficial for the reasons stated but could be considered optional in certain embodiments and need not be utilized.

The interlock element 806 is coordinated with the switch actuator 772 so that the interlock element 806 is moved to an unlocked position wherein the first fuse terminal blade 758 is released for removal from the fuse clip 760 as the switch actuator 772 is manipulated to open the device 750. More specifically, a pivotally mounted actuator arm 810 is provided in the disconnect housing 752 at a distance from the switch actuator 772, and a first generally linear mechanical link 812 interconnects the switch actuator 772 with the arm 810. The pivot points of the switch actuator 772 and the arm 810 are nearly aligned in the example shown in FIG. 30, and as the switch actuator 772 is rotated in the direction of arrow A, the link 812 carried on the switch actuator 772 simultaneously rotates and causes the arm 810 to rotate similarly in the direction of arrow E. As such, the switch actuator 772 and the arm 810 are rotated in the same rotational direction at approximately the same rate.

A second generally linear mechanical link 814 is also provided that interconnects the pivot arm 810 and a portion of the interlock element 806. As the arm 810 is rotated in the direction of arrow E, the link 814 is simultaneously displaced and pulls the interlock element 806 in the direction of arrow F, causing the projecting shaft 808 to become disengaged from the first terminal blade 758 and unlocking the interlock element 806. When so unlocked, the fuse module 754 can then be freely removed from the fuse clips 760 and 762 by lifting on the fuse module housing 756 in the direction of arrow B. The fuse module 754, or perhaps a replacement fuse module 754, can accordingly be freely installed by plugging the terminal blades 758 into the respective fuse clips 760 and 762.

As the switch actuator 772 is moved back in the direction of arrow C to close the disconnect device 750, the first link 812 causes the pivot arm 810 to rotate in the direction of arrow G, causing the second link 814 to push the interlock element 806 in the direction of arrow H until the projecting shaft 808 of the interlock element 806 again passes through the opening of the first terminal blade 758 and assumes a locked position with the first terminal blade 758. As such, and because of the arrangement of the arm 810 and the links 812 and 814, the interlock element 806 is slidably movable within the disconnect housing 752 between locked and unlocked positions. This slidable movement of the interlock element 806 occurs in a substantially linear and axial direction within the disconnect housing 752 in the directions of arrow F and H in FIG. 30.

In the example shown, the axial sliding movement of the interlock element 806 is generally perpendicular to the axial sliding movement of the actuator bar 766 that carries the switchable contacts 778 and 780. In the plane of FIG. 30, the movement of the interlock element 806 occurs along a substantially horizontal axis, while the movement of the sliding bar 776 occurs along a substantially vertical axis. The vertical and horizontal actuation of the sliding bar 776 and the interlock element 806, respectively, contributes to the compact size of the resultant device 750, although it is contemplated that other arrangements are possible and could be utilized to mechanically move and coordinate positions of the switch actuator 772, the switch sliding bar 776 and the interlock element 806. Also, the interlock element 806 may be biased to assist in moving the interlock element to the locked or unlocked position as desired, as well as to resist movement of the switch actuator 772, the sliding bar 776 and the interlock element 806 from one position to another. For example, by biasing the switch actuator 772 to the opened position to separate the switch contacts, either directly or indirectly via bias elements acting upon the sliding bar 776 or the interlock element 806, inadvertent closure of the switch actuator 772 to close the switch contacts and complete the current path may be largely, if not entirely frustrated, because once the switch contacts are opened a person must apply a sufficient force to overcome the bias force and move the switch actuator 772 back to the closed position shown in FIG. 30 to reset the device 750 and again complete the circuit path. If sufficient bias force is present, it can be practically ensured that the switch actuator 772 will not be moved to close the switch via accidental or inadvertent touching of the switch actuator 772.

The interlock element 806 may be fabricated from a nonconductive material such as plastic according to known techniques, and may be formed into various shapes, including but not limited to the shape depicted in FIG. 30. Rails and the like may be formed in the disconnect housing 752 to facilitate the sliding movement of the interlock element 806 between the locked and unlocked positions.

The pivot arm 810 is further coordinated with a tripping element 820 for automatic operation of the device 750 to open the switch contacts 778, 780. That is, the pivot arm 810, in combination a tripping element actuator described below, and also in combination with the linkage 774, 812, and 814 define a tripping mechanism to force the switch contacts 778, 780 to open independently from the action of any person. Operation of the tripping mechanism is fully automatic, as described below, in response to actual circuit conditions, as opposed to the manual operation of the switch actuator 772 described above. Further, the tripping mechanism is multifunctional as described below to not only open the switch contacts, but to also to displace the switch actuator 772 and the interlock element 806 to their opened and unlocked positions, respectively. The pivot arm 810 and associated linkage may be fabricated from relatively lightweight nonconductive materials such as plastic.

In the example shown in FIG. 30, the tripping element actuator 820 is an electromagnetic coil such as a solenoid having a cylinder or pin 822, sometimes referred to as a plunger, that is extendable or retractable in the direction of arrow F and H along an axis of the coil. The coil when energized generates a magnetic field that causes the cylinder or pin 822 to be displaced. The direction of the displacement depends on the orientation of the magnetic field generated so as to push or pull the plunger cylinder or pin 822 along the axis of the coil. The plunger cylinder or pin 822 may assume various shapes (e.g., may be rounded, rectangular or have other geometric shape in outer profile) and may be dimensioned to perform as hereinafter described.

In the example shown in FIG. 30, when the plunger cylinder or pin 822 is extended in the direction of arrow F, it mechanically contacts a portion of the pivot arm 810 and causes rotation thereof in the direction of arrow E. As the pivot arm 810 rotates, the link 812 is simultaneously moved and causes the switch actuator 772 to rotate in the direction of arrow A, which in turn pulls the link 774 and moves the sliding bar 776 to open the switch contacts 778, 780. Likewise, rotation of the pivot arm 810 in the direction of arrow E simultaneously causes the link 814 to move the interlock element 806 in the direction of arrow F to the unlocked position.

It is therefore seen that a single pivot arm 810 and the linkage 812 and 814 mechanically couples the switch actuator 772 and the interlock element 806 during normal operation of the device, and also mechanically couples the switch actuator 772 and the interlock element 806 to the tripping element 820 for automatic operation of the device. In the exemplary embodiment shown, an end of the link 774 connecting the switch actuator 772 and the sliding bar 776 that carries the switch contacts 778, 780 is coupled to the switch actuator 772 at approximately a common location as the end of the link 812, thereby ensuring that when the tripping element 820 operates to pivot the arm 810, the link 812 provides a dynamic force to the switch actuator 772 and the link 774 to ensure an efficient separation of the contacts 778 and 780 with a reduced amount of mechanical force than may otherwise be necessary. The tripping element actuator 820 engages the pivot arm 810 at a good distance from the pivot point of the arm 810 when mounted, and the resultant mechanical leverage provides sufficient mechanical force to overcome the static equilibrium of the mechanism when the switch contacts are in the opened or closed position. A compact and economical, yet highly effective tripping mechanism is therefore provided. Once the tripping mechanism operates, it may be quickly and easily reset by moving the switch actuator 772 back to the closed position that closes the switch contacts.

Suitable solenoids are commercially available for use as the tripping actuator element 820. Exemplary solenoids include LEDEX® Box Frame Solenoid Size B17M of Johnson Electric Group (www.ledex.com) and ZHO-0520L/S Open Frame Solenoids of Zohnen Electric Appliances (www.zonhen.com). In different embodiments, the solenoid 820 may be configured to push the arm 810 and cause it to rotate, or to pull the contact arm 810 and cause it to rotate. That is, the tripping mechanism can be operated to cause the switch contacts to open with a pushing action on the pivot arm 810 as described above, or with a pulling action on the pivot arm 810. Likewise, the solenoid could operate on elements other than the pivot arm 810 if desired, and more than one solenoid could be provided to achieve different effects.

In still other embodiments, it is contemplated that actuator elements other than a solenoid may suitably serve as a tripping element actuator to achieve similar effects with the same or different mechanical linkage to provide comparable tripping mechanisms with similar benefits to varying degrees. Further, while simultaneous actuation of the components described is beneficial, simultaneous activation of the interlock element 806 and the sliding bar 776 carrying the switch contacts 778, 780 may be considered optional in some embodiments and these components could accordingly be independently actuated and separately operable if desired. Different types of actuation could be provided for different elements.

Moreover, while in the embodiment shown, the trip mechanism is entirely contained within the disconnect housing 752 while still providing a relatively small package size. It is recognized, however, that in other embodiments the tripping mechanism may in whole or in part reside outside the disconnect housing 752, such as in separately provided modules that may be joined to the disconnect housing 752. As such, in some embodiments, the trip mechanism could be, at least in part, considered an optional add-on feature provided in a module to be used with the disconnect housing 752. Specifically, the trip element actuator and linkage in a separately provided module may be mechanically linked to the switch actuator 772, the pivot arm 810 and/or the sliding bar 776 of the disconnect housing 752 to provide comparable functionality to that described above, albeit at greater cost and with a larger overall package size.

The tripping element 820 and associated mechanism may further be coordinated with a detection element and control circuitry, described further below, to automatically move the switch contacts 778, 780 to the opened position when predetermined electrical conditions occur. In one exemplary embodiment, the second line terminal 782 is provided with an in-line detection element 830 that is monitored by control circuitry 850 described below. As such, actual electrical conditions can be detected and monitored in real time and the tripping element 820 can be intelligently operated to open the circuit path in a proactive manner independent of operation of the fuse module 754 itself and/or any manual displacement of the switch actuator 772. That is, by sensing, detecting and monitoring electrical conditions in the line terminal 782 with the detection element 830, the switch contacts 778, 780 can be automatically opened with the tripping element 820 in response to predetermined electrical conditions that are potentially problematic for either of the fuse module 754 or the base assembly (i.e., the disconnect housing 752 and its components).

In particular, the control circuitry 850 may open the switch contacts in response to conditions that may otherwise, if allowed to continue, cause the primary fuse element in the fuse module 754 to permanently open and interrupt the electrical circuit path between the fuse terminals 758. Such monitoring and control may effectively prevent the fuse module 754 from opening altogether in certain conditions, and accordingly save it from having to be replaced, as well as providing notification to electrical system operators of potential problems in the electrical power distribution system. Beneficially, if permanent opening of the fuse is avoided via proactive management of the tripping mechanism, the device 750 becomes, for practical purposes, a generally resettable device that may in many instances avoid any need to locate a replacement fuse module, which may or may not be readily available if needed, and allow a much quicker restoration of the circuitry than may otherwise be possible if the fuse module 754 has to be replaced. It is recognized, however, that if certain circuit conditions were to occur, permanent opening of the fuse 754 may be unavoidable.

Figure 31:
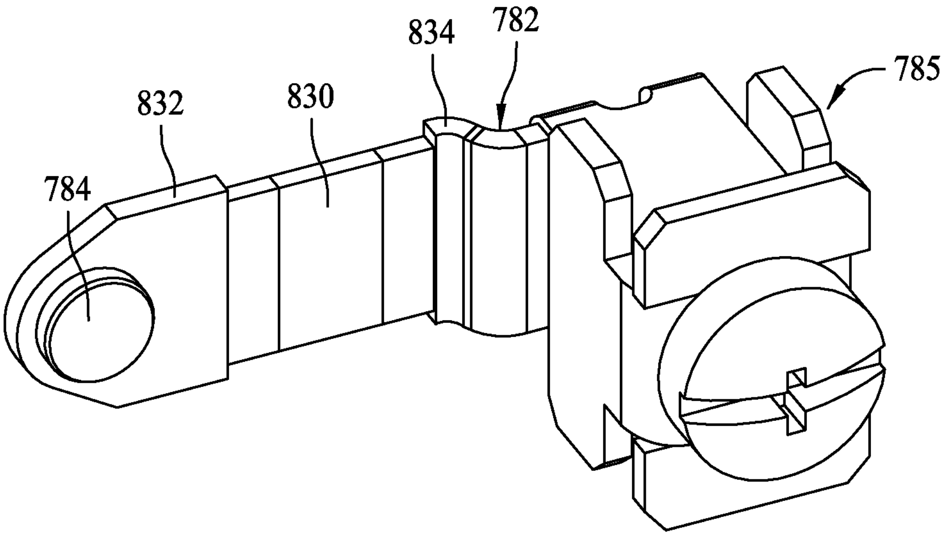
FIG. 31 illustrates a first terminal for the device shown in FIG. 30 including a switch contact.

As shown in FIG. 31, the detecting element 830 may be provided in the form of a low resistance shunt 830 that facilitates current sensing and measurement. The shunt 830 may be integrally provided in the line terminal 782 and provided for assembly of the disconnect device 750 as a single piece. In the example shown, the shunt 830 may be welded to a distal end 832 and a proximal end 834 of the terminal 782. The connecting terminal 785 may likewise be integrally provided with the terminal 782 or may alternatively be separately attached. In exemplary embodiments, the shunt 830 may be a 100 or 200 micro Ohm shunt element. The shunt element is placed in-line (i.e. is electrically connected in series) with the current path in the line terminal 782, rather than in a parallel current path (i.e., a path electrically connected in parallel with the circuit path established through the device 750). In another embodiment, however, current may be detected along a parallel current path if desired, and used for control purposes in a similar manner to that described below.

Figure 32:
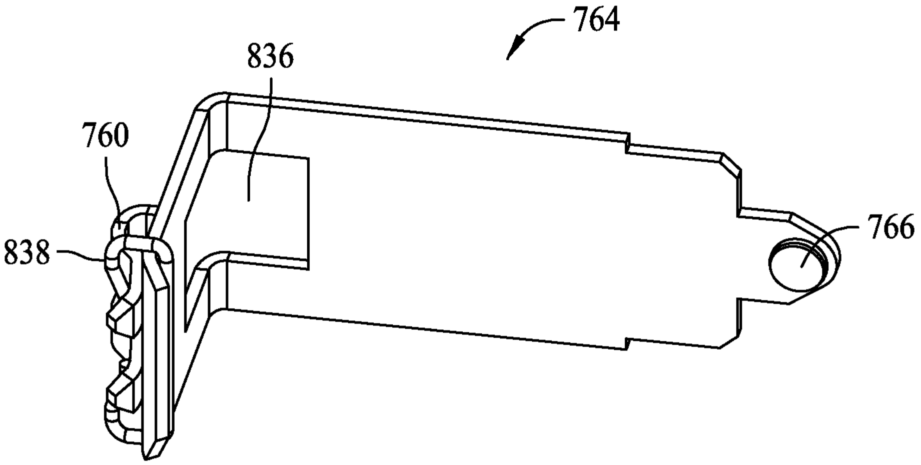
FIG. 32 illustrates a second terminal for the device shown in FIG. 30 including another switch contact.

FIG. 32 illustrates an exemplary first line terminal 764 for the device 750 shown in FIG. 30. As shown in FIG. 32, the first line terminal 764 includes the contact 766 at one end thereof, and an integrally formed fuse clip 762. The fuse clip 762 is cut from a section 836 and shaped or bent into the configuration shown. A spring element 838 is further provided on the fuse clip 762. While the integrally formed fuse clip 762 is beneficial from manufacturing and assembly perspectives, it is understood that the line side fuse clip 762 could alternatively be separately provided and attached to the remainder of the terminal if desired.

The terminals 782 and 764 shown in FIGS. 31 and 32 are examples only. Other terminal configurations are possible and may be used. It is understood that the shunt element 830 may be provided in the terminal 764 instead of the terminal 782, or perhaps elsewhere in the device 750, with similar effect.

Figure 34:
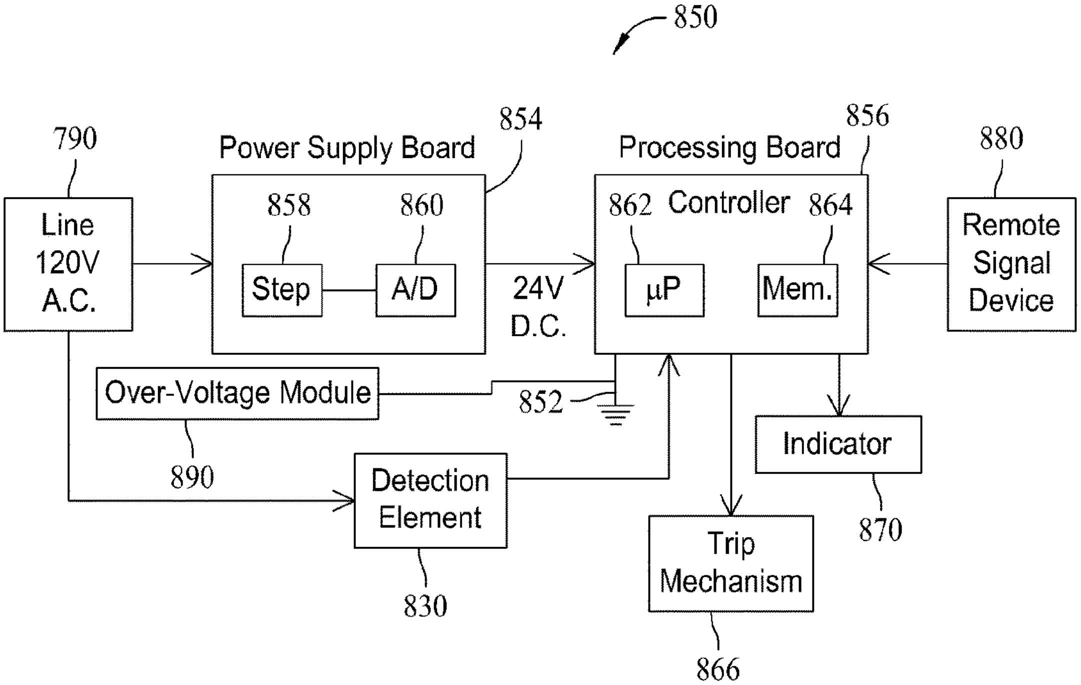
FIG. 34 is a block diagram of power supply and control circuitry for the device shown in FIG. 30.

As shown in FIGS. 30, 33 and 34 the device 750 further includes a neutral terminal or neutral connection 852 that facilitates operation of processor-based electronic control circuitry 850 for control purposes. As seen in FIG. 34, the line side circuitry 790 may be, for example, operating at 120 VAC. The control circuitry 850 may include, as shown in FIG. 34 a first circuit board 854 and a second circuit board 856. The first circuit board 854 includes step down components and circuitry 858 and analog to digital conversion components and circuitry 860 such that the first board 854 may supply direct current (DC) power to the second board 856 at reduced voltage, such as 24 VDC. The first board is accordingly sometimes referred to as a power supply board 854. Because the power supply board 854 draws power from the line side circuitry 790 operating at a higher voltage, the control circuitry 850 need not have an independent power supply, such as batteries and the like or a separately provided power line for the electronic circuitry that would otherwise be necessary. While exemplary input and output voltages for the power supply board are discussed, it is understood that other input and output voltages are possible and depend in part on specific applications of the device 750 in the field.

The second board 856 is sometimes referred to as a processing board. In the exemplary embodiment shown, the processing board 856 includes a processor-based microcontroller including a processor 862 and a memory storage 864 wherein executable instructions, commands, and control algorithms, as well as other data and information required to satisfactorily operate the disconnect device 750 are stored. The memory 864 of the processor-based device may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based" microcontroller shall refer not only to controller devices including a processor or microprocessor as shown, but also to other equivalent elements such as microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based".

While the circuitry 850 is shown in FIG. 33 as residing internally to the disconnect housing 752 and is entirely contained therein, it could alternatively be provided in whole or in part outside the disconnect housing 752, such as in separately provided modules that may be joined to the disconnect housing 752. The detecting element 830, while also shown as residing in the disconnect housing 752, could likewise be provided outside the housing in a separately provided module that may or may not include the control circuitry 850.

The detecting element 830 senses the line side current path in the first line terminal 830 and provides an input to the processing board 856. Thus, the control circuitry 850, by virtue of the detecting element 830, is provided with real time information regarding current passing through the line terminal 782. The detected current is then monitored and compared to a baseline current condition, such as a time-current curve as further explained below, that is programmed into the circuitry (e.g., stored in the memory 864). By comparing the detected current with the baseline current, decisions can be made by the processor 862, for example, to operate a trip mechanism 866 such as the tripping element actuator 820 and related linkage described above in response to predetermined electrical conditions as further described below.

As shown in FIGS. 30, 33 and 34 the disconnect device 750 may further include an indicator element 870 in the disconnect housing 752 to signify certain electrical conditions as they occur or different states of the disconnect device 750. The indicator 870 may be, for example, a light emitting diode (LED), although other types of indicators are known and may be used. In one embodiment, the LED indicator 870 is operable in more than one mode to distinctly indicate different electrical events. For example, a flashing or intermittent illumination of the indicator 870 may indicate an overcurrent condition in the circuitry that has not yet opened the primary fuse element of the fuse module 754, while a solid or continuous non-intermittent illumination may indicate a trip event wherein the tripping mechanism 866 has caused the switch contacts 778, 780 to open or to indicate an open fuse condition. Of course, other indication schemes are possible using one or more indicator elements, whether or not LEDs.

As also shown in FIG. 34, a remote signal device 880 may be further connected as an input to the circuitry 850, and may serve as an override element to cause the tripping mechanism 866 to operate independently of any detected condition by the element 830. In one contemplated arrangement, the remote signal device 880 could generate a 24V input signal at the neutral terminal 852. The remote signal device 880 may be a processor based, electronic device such as those described above or another device capable of providing the input signal. Using the remote signal device 880, the disconnect device 750 may be remotely tripped on demand in response to circuit events upstream or downstream of the device, to perform maintenance procedures, or for still other reasons.

The remote signal device 880 may be especially useful for coordinating different loads that may be connected to the control circuitry. In one such example, the load 794 may include a motor and a separately powered fan provided to cool the motor in use. If the device 750 is connected in series with the motor but not the fan, and if the device 750 operates to open the switch contacts to the motor, the signal device 880 can be used to switch the fan off. Likewise, if the fan ceases to operate, a signal can be sent with the remote signal device 880 to open the switch contacts in the device 750 and disconnect the motor in the load circuitry 794.

As further shown in FIGS. 33 and 34, an overvoltage module 890 may be provided and may be electrically connected in parallel to the load side circuitry 794. Specifically, the overvoltage module 890 may be connected to the load side connecting terminal 768 and electrical ground. The overvoltage module 890 in contemplated embodiments may include a voltage-dependent, nonlinear resistive element such as a metal oxide varistor element and may accordingly be configured as a transient voltage surge suppression device or surge suppression device. A varistor is characterized by having a relatively high resistance when exposed to a normal operating voltage, and a much lower resistance when exposed to a larger voltage, such as is associated with over-voltage conditions. The impedance of the current path through the varistor is substantially lower than the impedance of the circuitry being protected (i.e., the load side circuitry 890) when the device is operating in the low-impedance mode, and is otherwise substantially higher than the impedance of the protected circuitry. As over-voltage conditions arise, the varistor switches from the high impedance mode to the low impedance mode and shunt or divert over-voltage-induced current surges away from the protected circuitry and to electrical ground, and as over-voltage conditions subside, the varistor returns to a high impedance mode. The varistor may switch to the low impedance mode much more rapidly than the fuse module 754 could act to open the circuit through the device 150 to the load 794, and the over-voltage element 890 therefore protects the load side circuitry 794 from transient over-voltage events that the fuse itself may not protect against.

Figure 35:
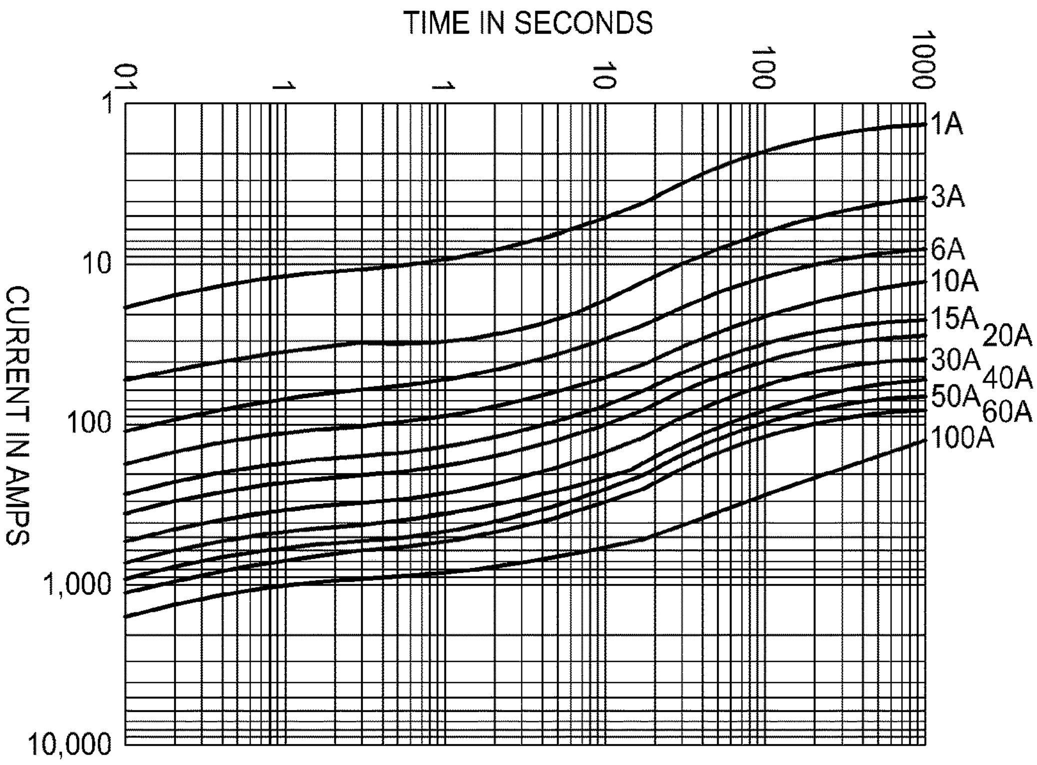
FIG. 35 is an exemplary time-current curve for exemplary fuses useable with the device shown in FIG. 30.

FIG. 35 is an exemplary time-current curve for exemplary fuse modules useable with the device 750 in various embodiments. The curve is plotted from or otherwise represents a multitude of data points for time and current values, and the corresponding time-current curve data can be programmed into the controller memory 864 in a look-up table, for example, and may therefore be used as a guideline comparison for actual current conditions detected with the element 830. As shown in FIG. 35, the time current curve is logarithmic and includes current magnitude values in amperes on the vertical axis, and time magnitude values in seconds on the horizontal axis. A number of fuse modules of different current ratings in amperes are plotted on the graph. The exemplary fuse modules plotted in FIG. 35 are Low-Peak® CUBEFuse® Finger Safe, Dual Element, Time Delay Class J performance fuses of Eaton's Bussmann Business, St. Louis, Missouri and having amperage ratings of 1-100 A. Such time-current curves are known and have been determined for many types of fuses, but to the extent not already determined such time-current curves could be empirically determined or theoretically established.

While multiple fuses are plotted in the example of FIG. 35, for any given base assembly for the device 750 (i.e., the disconnect housing 752 and its components) only one plot, or set of data corresponding to one of the plots, for the most appropriately rated fuse need be provided for the control circuitry 850 to operate. Of course, more than one set of data corresponding to different curves may be provided if desired, as long as the control circuitry utilizes the proper set of data for any fuse used with the device. Each set of data may represent an entire time-current curve as shown in the example of FIG. 35, or only a portion or range of one of the time-current curves depending on actual applications of the device of the field and electrical events of most interest.

It can be seen from the exemplary time-current curves of FIG. 35 that any of the fuses plotted can withstand substantially greater currents than the corresponding rated current for some period of time before opening. For example, considering the plotted curve for the 40 A rated fuse, the fuse module can withstand current magnitude levels approaching 500 A for approximately 1 second before opening. However, the same 40 A fuse module can withstand about 80 A of current for about 100 seconds before opening, or between 50 and 60 A for 1000 seconds before opening. Especially for longer duration overcurrent events, the plot can serve as a guide for the control circuitry to cause the trip mechanism 866 to operate in response to current conditions sustained for a period of time that is not yet sufficient to open the fuse element in the module, but is perhaps symptomatic of a problem in the electrical system.

By virtue of the detection element 830 providing a control input signal, the control circuitry 850 can compare not only the magnitude of actual current flowing through the device 750 (and hence flowing through the fuse module 754) at any given point in time, but can measure the duration of the current flow in order to make control decisions. That is, the control circuitry 850 is configured to make time-based and magnitude-based decisions by comparing elapsed duration of actual current conditions (i.e., actual levels of current) to the predetermined time-current curve expectation for the fuse in use with the device 750. Based on the magnitude and time duration of detected electrical current conditions, the control circuitry 850 can intelligently monitor and control operation of the device 750 in response to current conditions actually detected before the fuse module 754 permanently opens.

For example, default rules can be implemented with the processor 862 to determine one or more time-based and magnitude-based tripping points causing the circuitry 850 to operate the tripping mechanism 866 in response to detected electrical current conditions. In one exemplary scenario, if detected current conditions reach 150% of the rated current of the fuse module 754 actually used in the device 750 for a predetermined amount of time, which may be a predetermined percentage of the time indicated in the time-current curve at the detected current level, the trip mechanism may be actuated. As such, the trip mechanism 866 may be actuated in anticipation of the fuse module 754 opening. Alternatively, stated, the control circuitry 850 may open the switch contacts with the tripping mechanism 866, based on the time-current curve as compared to detected current durations, in less time than the fuse module 754 would otherwise take to operate and open the circuit through the device 750. The tripping of the mechanism 866 under such circumstances, which can be indicated with the indicator 870, may serve as a prompt to troubleshoot the electrical system to determine the cause of the overcurrent, if possible. Once the device 750 is tripped in such a fashion, the fuse module 754 may or may not need to be replaced, depending on how close the tripping points are to the actual opening points of the fuse based on the applicable time-current curve.

Likewise, tripping points can be set at a point higher than the time-current curve may otherwise indicate to ensure that the switch contacts in the device 750 are opened in the event that a fuse module 754 withstands a given current level for a duration longer than would be expected from the time-current curve. Thus, considering the exemplary time-current curve for the 40 A rated fuse in FIG. 35, if a 40 A rated fuse module withstands an actual 60 A current as detected with the element 830 for a duration of 300 seconds, the control circuitry can decide to operate the tripping mechanism 866 because according to the time-current curve, the fuse would have been expected to operate and open at about 200 seconds, well prior to expiration of the 300 second period. Such a scenario could represent a condition wherein a fuse having an inappropriately high current rating has been installed, or perhaps an atypical performance of the fuse of the proper rating. In any event, the control circuitry 850 could emulate the performance of the properly rated fuse, or a more typically performing fuse of the proper rating, in such circumstances.

In accordance with the foregoing examples, the control circuitry 850 can respond to threshold deviations between actual detected current and the baseline current from the time-current curve, either directly or indirectly utilizing tripping points offset from the time-current curve. By monitoring time and current conditions, and by comparing actual current conditions to the time-current curve, and also with some strategic selection of the threshold tripping points, the control circuitry 850 can be tailored to different sensitivities for different applications, and may even detect unusual or unexpected operating conditions and accordingly trip the device 750 to prevent any associated damage to the load side circuitry 794.

Of course, the comparison of detected time and current parameters to the predetermined time-current curve can confirm also an unremarkable or normal operating state of the fuse 754 and the device 750. For example, a 40 A rated fuse could operate at a 40 A current level or below indefinitely without opening, and the control circuitry 850 would in such circumstances take no action to operate the trip mechanism 866.

Having now described the control circuitry 850 functionally, it is believed those in the art could implement the functionality described with appropriate circuitry and appropriately programmed operating algorithms without further explanation.

Figure 36:
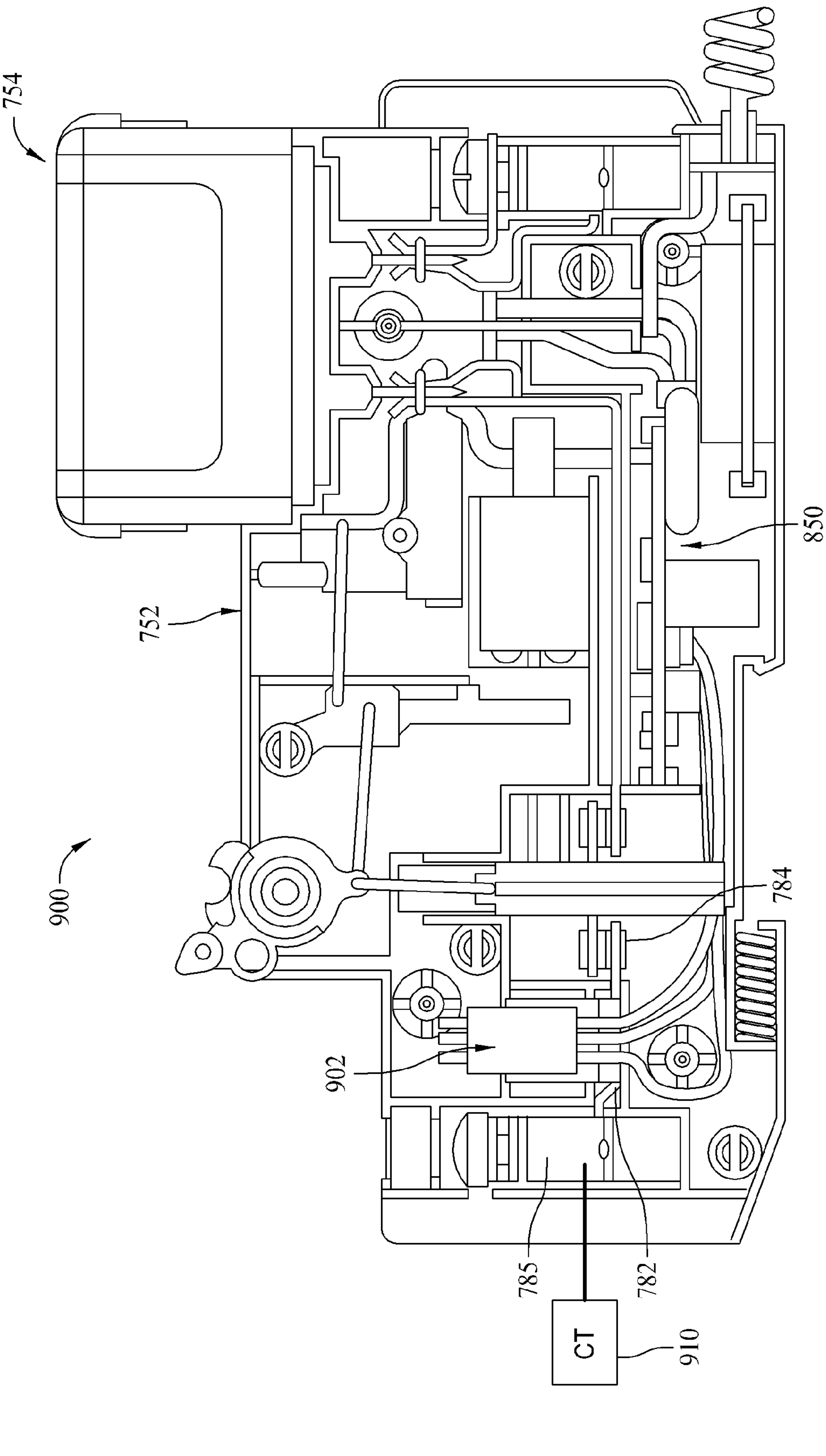
FIG. 36 is a side elevational view of a portion of a fifteenth embodiment of a fusible switching disconnect device.

FIG. 36 is a side elevational view of a portion of a fifteenth embodiment of a fusible switching disconnect device 900 that in many ways is similar to the device 750 described above, and hence like reference characters of the devices 750 and 900 are indicated with like reference characters in the Figures. Common features of the devices 750 and 900 will not be separately described herein, and the reader is referred back to the device 750 and the discussion above.

Figure 37:
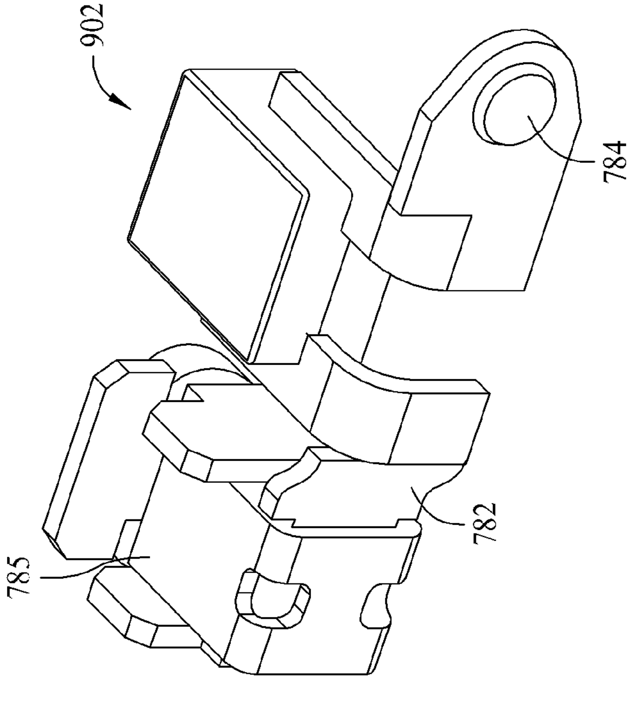
FIG. 37 illustrates a first terminal for the device shown in FIG. 36.

Unlike the device 750, the device 900 has a different detecting element 902. That is, the shunt element 830 is replaced with another and different type of detecting element 902 in the form of a Hall Effect sensor. As shown in FIG. 37, the Hall Effect sensor 902 is integrally provided in the line terminal 782 having the stationary contact 784. The Hall Effect sensor 902 may be used in lieu of the control element 830 to provide feedback to the control circuitry 850 described above to intelligently monitor and control the tripping mechanism 866 in a similar manner to that described above. An exemplary Hall Effect sensor suited for use as the detection element 902 includes an ACS758xCB Hall Effect-based sensor of Allegro MicroSystems, Inc., Worcester, Massachusetts.

As still another option, and as also shown in FIG. 36, a current transformer 910 could be provided in lieu of or in addition to the Hall Effect sensor 902 to detect current flow and provide feedback to the control circuitry 850. The current transformer 910 could be located interior or exterior to the device 900 in different embodiments. A suitable current transformer for use as the element 910 includes a CT1002 Current Transformer and a CT1281 Current Transformer available from Electroohms Pvt., Ltd., Banagalore, India.

While the control circuitry 850 described is responsive to current sensing using resistive shunts, Hall Effect sensors or current transformers providing control inputs to the circuitry 850, similar functionality could be provided using sensor or detection elements corresponding to other electrical circuit conditions. For example, because voltage and current are linearly related, voltage sensing inputs could be used and current values could be readily calculated therefrom for use by the control circuitry 850. Still further, voltage sensors could be used to make time-based and magnitude-based comparisons in a similar manner to those described above without first having to calculate current values. In such embodiments, time-current curves and data sets may be omitted in favor of other baseline curves or data sets, which may or may not be conversions of time-current curves, that may be used to directly or indirectly set time-based and magnitude-based threshold tripping points. As such, tripping points utilized by the control circuitry need not be derived from time-current curves, but can be established in light of other considerations for specific end uses or to meet different specifications.

The advantages and benefits of the invention are now believed to have been amply demonstrated in the exemplary embodiments disclosed.

An embodiment of a fusible switch disconnect device has been disclosed including: a disconnect housing adapted to receive and engage at least a portion of a removable electrical fuse, the fuse including first and second terminal elements and a fusible element electrically connected therebetween, the fusible element defining a circuit path and being configured to permanently open the circuit path in response to predetermined electrical current conditions experienced in the circuit path; line side and load side terminals in the disconnect housing and electrically connecting to the respective first and second terminal elements of the fuse when the fuse is received and engaged with the disconnect housing; at least one switchable contact in the disconnect housing, the at least one switchable contact provided between one of the line side terminal and load side terminal and a corresponding one of the first and second terminal elements of the fuse, the at least one switchable contact selectively positionable in an open position and a closed position to respectively connect or disconnect an electrical connection between the line side terminal and the load side terminal and through the circuit path of the fusible element; and a mechanism operable to automatically cause the at least one switchable contact to move to the open position in response to a predetermined electrical condition when the line side terminal is connected to energized line circuitry.

Optionally, the fusible switch disconnect device of claim may also include a detecting element configured to detect the predetermined electrical condition. The electrical condition may include one of a voltage condition and a current condition. In an embodiment wherein the electrical condition is a voltage condition, the detecting element may be configured to monitor one of an undervoltage condition and an overvoltage condition.

A microcontroller may be provided in communication with the detection element and the microcontroller may cause the mechanism to move the switchable contact in response to detection of the predetermined electrical condition. The microcontroller may be configured to compare an actual electrical condition as detected with the detection element to a baseline operating condition, and when the compared electrical condition deviates from the baseline electrical condition by a predetermined threshold, the microcontroller may operate the mechanism to move to the open position. The baseline operating condition may include a time-current curve.

As further options, the microcontroller may be provided on a first circuit board in the disconnect housing, with the fusible switch disconnect device further comprising a second circuit board in the disconnect housing, wherein the second circuit board supplies power to the first circuit board. The second circuit board may be connected to one of the line and load side terminals and may receive power therefrom. The second circuit board may be configured to receive AC power from one of the line and load side terminals and supply DC power to the first circuit board. The second circuit board may also be configured to step down the power supply from one of the line and load side terminals and supply the stepped down power to the first circuit board.

The mechanism may optionally include a solenoid, and the solenoid may be responsive to the microcontroller and cause displacement of the switchable contact from the closed position. The detecting element may be configured to sense current flow through the closed switchable contact, and may be one of a Hall Effect sensor, a current transformer, and a shunt. The detecting element may monitor a current path in the disconnect device at a location between the at least one switchable contact and one of the line and load side terminals.

A neutral connecting terminal may also be optionally provided in the fusible switch disconnect device, and the microcontroller may be electrically connected to the neutral terminal. An overvoltage detecting element may also optionally be provided, and the overvoltage detecting element may be connected between one of the line and load side terminals and the neutral terminal.

Also optionally, an indicator responsive to the microcontroller may further be provided to indicate the electrical condition. The indicator may be a light emitting diode. The indicator may further be operable in at least two distinct modes, including a continuous indication mode and an intermittent indication mode.

In an embodiment wherein the detecting element includes a resistive shunt, it may optionally be integrally provided in a conductive terminal element extending between the switchable contact and one of the line and load side terminals.

The at least one switchable contact in the fusible switch disconnect device may optionally include a pair of movable contacts, and the movable contacts may be biased to an open position. The fuse in the fusible switch disconnect device may include a rectangular fuse module having plug-in terminal blades engageable with the disconnect housing. The fuse may be directly receivable and engageable with the disconnect housing without utilizing a separately provided fuse carrier.

The mechanism in the fusible switch disconnect device may optionally include an electromagnetic coil including a cylinder extendable and retractable along an axis of the coil. A rotatable arm may be provided in the fusible switch disconnect device and may be positioned proximate the electromagnetic coil, wherein the rotatable arm may be displaced when the cylinder is extended.

Another embodiment of a fusible switch disconnect device has also been disclosed including: a disconnect housing adapted to receive and engage at least a portion of a removable electrical fuse, the fuse including first and second terminal elements and a fusible element electrically connected therebetween, the fusible element defining a circuit path and being configured to permanently open the circuit path in response to predetermined electrical current conditions experienced in the circuit path; at least a first terminal in the disconnect housing associated with the circuit path when the fuse when the fuse is received and engaged with the disconnect housing; at least one switchable contact in the disconnect housing and associated with the first terminal, the at least one switchable contact selectively positionable in an open position and a closed position to respectively connect or disconnect an electrical connection through the circuit path of the fusible element; and electronic circuitry configured to: monitor current flow through at least one of the first terminal and the circuit path of the fusible element; and compare the monitored current flow to a baseline operating condition, wherein the baseline operating condition comprises at least one set of time-current data associated with operation of the fuse.

Optionally, the disconnect housing may include a line side terminal and a load side terminal respectively engageable to the first and second terminal elements of the fuse, and the at least one switchable contact may include a first switchable contact provided on one of the line side and load side terminal. The fusible switch disconnect device may further include a line side connecting terminal and a load side connecting terminal respectively providing line side and load side connections to line and load electrical circuitry, and the at least one switchable contact may include a second switchable contact provided on one of the line and load side connecting terminals. A detecting element may be associated with one of the line and load side connecting terminals, and the detecting element may provide a signal input to the electronic circuitry, thereby allowing the current flow to be monitored. The detecting element may include at least one a resistive shunt, a current transformer, and a Hall Effect sensor.

Optionally, the fusible switch disconnect device of claim 29, may further include a mechanism, responsive to the electronic circuitry, to automatically cause the at least one switchable contact to move to the open position if the compared monitored current flow deviates from the baseline operating condition by a predetermined amount. The mechanism may include a solenoid responsive to the electronic circuitry. The electronic circuitry may include a power supply board and a processing board.

A local state indicator may also optionally be provided, and may be configured to visually indicate a deviation of the monitored current flow to a baseline operating condition while the at least one switchable contact is in the closed position. The local state indicator may include a light emitting diode, and the electronic circuitry may cause the light emitting diode to flash intermittently to indicate the deviation.

The fusible switch disconnect device of claim may optionally further include a neutral terminal and a remote signal device in communication with the neutral terminal. An over-voltage detecting element may be coupled to the electronic circuitry, and the over-voltage detecting element may include a varistor element. The electronic circuitry may optionally include a microcontroller, and the removable electrical fuse may include a rectangular fuse module having plug-in terminal blades.

Another embodiment of a fusible switch disconnect device has also been disclosed, including: housing means for receiving an overcurrent protection fuse; terminal means for establishing a circuit path through the overcurrent protection fuse; switching means for connecting and disconnecting the circuit path; overcurrent detecting means for sensing electrical current flow in the circuit path; and controller means for making a time-based and magnitude-based comparison of sensed current flow versus a predetermined time-based and magnitude-based baseline for the overcurrent protection fuse.

A means for operating the switching means in response to the time-based and magnitude based comparison may further be optionally provided. An over-voltage detecting means for detecting an over-voltage condition in the circuit path may also be provided, and so may a remote signaling means for over-riding the controller means. Local indication means may be provided for indicating a deviation in the time-based and magnitude-based comparison.

An embodiment of a fusible switch disconnect device has likewise been disclosed including: a housing configured to receive a removable overcurrent protection fuse; terminals establishing a circuit path through the housing and the fuse when the fuse is received; a detecting element configured to sense an electrical condition in the circuit path; and a processor-based control element configured to undertake a time-based and magnitude-based comparison of the sensed electrical condition in the current path and a predetermined time-based and magnitude-based electrical condition baseline.

Optionally, the fusible switch disconnect device may also include switch contacts for connecting and disconnecting a portion of the circuit path, and the control element may cause automatic positioning of the switch contacts to disconnect the circuit path in response to the time-based and magnitude based comparison. The detecting element may be configured to sense current in the circuit path. The electrical condition baseline may include a set of current magnitude values and time values for each current magnitude level. The set of current magnitude values and time values may be derived from a time-current curve for the overcurrent protection fuse.

Also optionally, the electrical condition baseline may include at least one set of electrical condition magnitude values and time values for each electrical condition magnitude level, and the controller may position the switch contacts based on both the electrical condition magnitude values and the time values in the set. The data set may define at least a portion of a curve in a predefined relationship of the electrical current condition and a state of the overcurrent protection fuse. The predefined relationship may be a time-current curve. The overcurrent protection fuse may be configured for plug in electrical connection to complete the current path.

While the invention has been described in terms of various specific embodiments, those skilled in the art will recognize that the invention can be practiced with modification within the spirit and scope of the claims.'

The invention claimed is:

1. A fusible switch disconnect device comprising:
- a housing;
- line side and load side terminals in the housing and configured to be electrically connected to first and second terminal elements of a removable overcurrent protection fuse;
- at least one movable switch contact in the housing, the at least one movable switch contact configured between the line side terminal and the first terminal element of the removable overcurrent protection fuse;
- a disconnect switch actuator coupled to the at least one movable switch contact via an actuator link and a sliding bar, wherein the disconnect switch actuator is configured for placing the at least one movable switch contact in either an open position or a closed position to respectively disconnect or connect an electrical connection between the line side terminal and the load side terminal and through the removable overcurrent protection fuse; and
- a trip mechanism in the housing and comprising:
  - a trip actuator;
  - an elongated pivot arm having a first end and a second end, the first end being rotatably mounted to the housing at a distance from the disconnect switch actuator, and the second end being positioned proximate the trip actuator; and
  - a first mechanical link having a first end and a second end, the first end being non-releasably connected to the elongated pivot arm and the second end being non-releasably connected to the disconnect switch actuator;
  - wherein when the second end of the elongated pivot arm is automatically displaced by the trip actuator in response to a predetermined electrical condition, the disconnect switch actuator is simultaneously displaced via the elongated pivot arm and the connected second end of the first mechanical link to place the at least one movable switch contact in the open position.

2. The fusible switch disconnect device of claim 1, wherein the disconnect switch actuator is rotatably movable relative to the housing.

3. The fusible switch disconnect device of claim 1, further comprising:
- a movable interlock element in the housing, the movable interlock element independently provided from the elongated pivot arm and preventing removal of the overcurrent protection fuse when the at least one movable switch contact is in the closed position; and
- wherein the trip mechanism further comprises a second mechanical link interconnecting the elongated pivot arm and the movable interlock element;
- wherein the movable interlock element and the elongated pivot arm are simultaneously displaced via the second mechanical link.

4. The fusible switch disconnect device of claim 1, wherein the disconnect switch actuator is rotatably mounted in the housing, and the device further comprises:
- a movable interlock element in the housing at a location spaced from each of the disconnect switch actuator and the elongated pivot arm, the movable interlock element locking the removable overcurrent protection fuse in place when the at least one movable switch contact is in the closed position;
- wherein the sliding bar carries the at least one movable switch contact;

wherein the actuator link mechanically interconnects the disconnect switch actuator and the sliding bar;

wherein the trip mechanism further comprises a second link mechanically interconnecting the elongated pivot arm and the movable interlock element;

wherein the disconnect switch actuator, the movable interlock element, and the sliding bar are simultaneously displaced when the trip actuator is displaced.

5. The fusible switch disconnect device of claim 1, wherein the device further comprises an interlock element preventing removal of the overcurrent protection fuse when the at least one movable switch contact is in the closed position;

wherein the sliding bar carries the at least one movable switch contact;

wherein displacement of the elongated pivot arm simultaneously displaces the disconnect switch actuator and at least one of the sliding bar and the interlock element.

6. The fusible switch disconnect device of claim 1, wherein the trip actuator comprises an electromagnetic coil and a cylinder extendable and retractable along a linear axis in the housing.

7. The fusible switch disconnect device of claim 1, further comprising:

an interlock element locking the removable overcurrent protection fuse in place when the at least one movable switch contact is in the closed position and releasing the removable overcurrent protection fuse when the at least one movable contact is in the open position; and wherein the trip mechanism further comprises a second mechanical link interconnecting the elongated pivot arm and the interlock element;

wherein via the second mechanical link a rotation of the elongated pivot arm simultaneously produces a linear motion of the interlock element to lock or unlock the removable overcurrent protection fuse.

8. The fusible switch disconnect device of claim 1, wherein the sliding bar carries the at least one movable switch contact, and wherein the actuator link extends between the disconnect switch actuator and the sliding bar, wherein via the actuator link a rotational motion of the disconnect switch actuator simultaneously produces a linear motion of the sliding bar.

9. The fusible switch disconnect device of claim 8, wherein an end of the first mechanical link and an end of the second mechanical link are attached to the disconnect switch actuator at a common location.

10. The fusible switch disconnect device of claim 1, further comprising a controller, a memory, and time-current curve data loaded in the memory, the trip actuator operable by the controller to displace the pivot arm as directed by the time-current curve data, the time-current data representing a baseline expectation of a permanent opening of the removable overcurrent protection fuse.

11. The fusible switch disconnect device of claim 1, further comprising:

an interlock element configured to lock and unlock the removable overcurrent protection fuse with respect to the housing, wherein the disconnect switch actuator and the interlock element are mechanically linked such that the interlock element and the disconnect switch actuator are simultaneously movable relative to the housing.

12. The fusible switch disconnect device of claim 1, further comprising:

an in-line detecting element configured to sense an actual operating condition of the removable overcurrent protection fuse; and a processor-based control element configured to undertake, in response to the sensed actual operating condition, a time-based and magnitude-based comparison of the sensed actual operating condition and a predetermined time-based and magnitude-based electrical operation baseline in order to assess an operating performance of the fuse.

13. The fusible switch disconnect device of claim 12, wherein the predetermined time-based and magnitude-based electrical condition baseline comprises a set of current magnitude values and time values for each current magnitude level.

14. The fusible switch disconnect device of claim 13, wherein the set of current magnitude values and time values is derived from a time-current curve for the removable overcurrent protection fuse.

15. A fusible switch disconnect device comprising:

a housing;

line side and load side terminals configured to be electrically connected to respective first and second terminal blades of a removable overcurrent protection fuse received in the housing, the removable overcurrent protection fuse including a fusible element defining a circuit path between the first and second terminal blades;

a pair of switchable contacts electrically connected in series to one another, the pair of switchable contacts configured between one of the line side terminal and load side terminal and a corresponding one of the first and second terminal blades of the overcurrent protection fuse;

a disconnect switch actuator coupled to the pair of switchable contacts via an actuator link and a sliding bar, wherein the disconnect switch actuator is configured for alternately locating the pair of switchable contacts relative to the housing along a first linear axis in either an open position or a closed position to respectively disconnect or connect an electrical connection between the line side terminal and the load side terminal and through the circuit path of the fusible element while the removable overcurrent protection fuse remains in place; and a trip mechanism comprising:

a trip actuator operable along a second linear axis oriented substantially perpendicular to the first linear axis;

an elongated pivot arm being automatically displaced by the trip actuator in response to a predetermined electrical condition; and a first mechanical link having a first end and a second end respectively interconnecting the pivot arm and the disconnect switch actuator and establishing a non-releasable mechanical connection therebetween;

wherein when the elongated pivot arm is displaced by the trip actuator, the disconnect switch actuator is simultaneously moved by the second end of the first mechanical link to locate the pair of switchable contacts in the open position.

16. The fusible switch disconnect device of claim 15, wherein the disconnect switch actuator is rotatable relative to the housing.

17. The fusible switch disconnect device of claim 15, further comprising a movable interlock element in the housing and movable to a locked position with respect to at least one of the first and second terminal blades, the movable interlock element independently provided from the elongated pivot arm, and the trip mechanism further comprising a second mechanical link interconnecting the pivot arm and the movable interlock element, wherein the movable interlock element and the elongated pivot arm are simultaneously displaced by the trip actuator.

18. The fusible switch disconnect device of claim 15, wherein the disconnect switch actuator is rotatably mounted at a location spaced from the elongated pivot arm, and the device further comprises:

a movable interlock element positionable to lockingly engage at least one of the first and second terminal blades at a location spaced from each of the disconnect switch actuator and the elongated pivot arm;

wherein the sliding bar carries the pair of switchable contacts;

wherein the actuator link mechanically interconnects the disconnect switch actuator and the sliding bar;

wherein the trip mechanism further comprises:

a second mechanical link establishing a non-releasable mechanical interconnection of the pivot arm and the movable interlock element;

wherein the disconnect switch actuator, the movable terminal interlock element, and the sliding bar are simultaneously displaced by the trip actuator acting upon the pivot arm.

19. The fusible switch disconnect device of claim 15, wherein the device further comprises an interlock element movable between locked and unlocked positions with respect to the overcurrent protection fuse;

wherein the sliding bar carries the pair of switchable contacts;

wherein displacement of the elongated pivot arm simultaneously displaces the disconnect switch actuator and at least one of the sliding bar and the interlock element.

20. The fusible switch disconnect device of claim 15, wherein the trip actuator comprises an electromagnetic coil and a cylinder.

21. The fusible switch disconnect device of claim 15, further comprising an interlock element and the trip mechanism further comprising a second mechanical link coupled to the elongated pivot arm and extending between the elongated pivot arm and the interlock element, wherein a rotation of the pivot arm simultaneously produces a linear motion of the interlock element to lock or unlock the removable overcurrent protection fuse.

22. The fusible switch disconnect device of claim 15, wherein the sliding bar carries the pair of switchable contacts, wherein the actuator link extends between the disconnect switch actuator and the sliding bar, wherein a rotational motion of the disconnect switch actuator simultaneously produces a linear motion of the sliding bar.

23. The fusible switch disconnect device of claim 22, wherein an end of the first mechanical link and an end of the second mechanical link are attached to the disconnect switch actuator at a common location.

24. The fusible switch disconnect device of claim 15, further comprising a controller, a memory, and time-current curve data loaded in the memory corresponding to time-current curve data for the removable overcurrent protection fuse, the trip actuator operable by the controller as operating performance of the fuse is assessed in comparison to the time-current curve data.

25. The fusible switch disconnect device of claim 15, further comprising:

an interlock element configured to lock and unlock the removable overcurrent protection fuse, wherein the disconnect switch actuator and the interlock element are mechanically linked such that the interlock element and the disconnect switch actuator are simultaneously movable.

26. The fusible switch disconnect device of claim 15, further comprising:

an in-line detecting element configured to sense an actual operating condition of the removable overcurrent protection fuse; and a processor-based control element configured to undertake, in response to the sensed actual operating condition, a time-based and magnitude-based comparison of the sensed actual operating condition and a predetermined time-based and magnitude-based electrical operation baseline in order to assess an operating performance of the fuse.

27. The fusible switch disconnect device of claim 26, wherein the predetermined time-based and magnitude-based electrical condition baseline comprises a set of current magnitude values and time values for each current magnitude level.

28. The fusible switch disconnect device of claim 27, wherein the set of current magnitude values and time values is derived from a time-current curve for the removable overcurrent protection fuse.

29. A fusible switch disconnect device comprising:

a housing adapted to receive and engage a removable overcurrent protection fuse including first and second terminal blades and a fusible circuit path electrically connected therebetween;

line side and load side terminals in the housing and electrically connecting to the respective first and second terminal blades of the removable overcurrent protection fuse when the removable overcurrent protection fuse is received and engaged with the housing;

a sliding bar movable along a linear axis in the housing;

a pair of switchable contacts coupled to the sliding bar and electrically connected in series to one another, the pair of switchable contacts provided between one of the line side terminal and load side terminal and a corresponding one of the first and second terminal blades of the overcurrent protection fuse;

a disconnect switch actuator being partly interior to the housing and partly exterior to the housing;

an actuator link mechanically coupling the disconnect switch actuator to the sliding bar, wherein a rotation of the disconnect switch actuator simultaneously causes the first mechanical link to move the sliding bar along the linear axis and selectively position the pair of switchable contacts in either an opened position or a closed position relative to one of the line side or load side terminals, thereby respectively effecting a disconnection or connection of an electrical connection through the circuit path while the removable overcurrent protection fuse remains received and engaged with the housing; and a trip mechanism comprising:

a trip actuator operable along an axis perpendicular to the linear axis of the sliding bar;

a pivot arm positioned proximate the trip actuator and being automatically displaced by the trip actuator when a predetermined electrical condition occurs; and a first mechanical link having a first end and a second end respectively establishing a non-releasable mechanical interconnection between the pivot arm and the disconnect switch actuator;

wherein the disconnect switch actuator, the actuator link, and the first mechanical link are simultaneously moved by the trip actuator when displacing the pivot arm while mechanical connection between the disconnect switch actuator and the pivot arm is maintained.

30. The fusible switch disconnect device of claim 29, further comprising a movable interlock element in the housing and movable to a locked position with respect to at least one of the first and second terminal blades, the interlock element independently provided from the pivot arm, and a second mechanical link interconnecting the pivot arm and the movable interlock element, wherein the movable interlock element is simultaneously displaced when the pivot arm is displaced.

31. The fusible switch disconnect device of claim 1, wherein the first and second terminal elements of the removable overcurrent protection fuse are each a terminal blade.

32. The fusible switch disconnect device of claim 31, wherein at least one of the terminal blades extends in a plane perpendicular to an axis of the trip actuator.

33. The fusible switch disconnect device of claim 32, further comprising a movable interlock element locking and unlocking one of the terminal blades.

34. The fusible switch disconnect device of claim 33, wherein the interlock element is movable along an axis parallel to the axis of the trip actuator.

35. The fusible switch disconnect device of claim 1, wherein the trip actuator is operable along a first linear axis, wherein the at least one movable switch contact is positionable along a second linear axis, and wherein the second linear axis extends substantially perpendicular to the first linear axis.

36. The fusible switch disconnect device of claim 1, wherein the at least one movable switch contact comprises a pair of coplanar switch contacts connected in series to one another, and wherein the trip actuator is movable in a direction parallel to a plane of the pair of coplanar switchable contacts.

37. The fusible switch disconnect device of claim 1, wherein when the disconnect switch actuator is manually moved by a user, the elongated pivot arm is simultaneously moved via the first mechanical link.

38. The fusible switch disconnect device of claim 6, wherein the cylinder mechanically contacts the pivot arm only when extended.

39. The fusible switch disconnect device of claim 1, further comprising at least one stationary switch contact, the at least one movable contact being positionable relative to the stationary switch contact in a space between the disconnect switch actuator and the at least one stationary switch contact to place the movable switch contact in the open position or closed positions.

40. The fusible switch disconnect device of claim 1, wherein the device is a compact device that occupies less space in a panelboard assembly that an in-line fuse and circuit breaker combination.

* * * * *